(12) United States Patent
Kim et al.

(10) Patent No.: US 12,528,798 B2
(45) Date of Patent: Jan. 20, 2026

(54) COMPOUND FOR CROP PROTECTANT

(71) Applicant: LG CHEM, LTD., Seoul (KR)

(72) Inventors: Kyung Hoon Kim, Daejeon (KR); Si Min Kim, Daejeon (KR); Hae Kwang Lee, Daejeon (KR); Hye Ran Moon, Daejeon (KR); Jin Il Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 561 days.

(21) Appl. No.: 17/768,043

(22) PCT Filed: Oct. 29, 2020

(86) PCT No.: PCT/KR2020/014897
§ 371 (c)(1),
(2) Date: Apr. 11, 2022

(87) PCT Pub. No.: WO2021/086044
PCT Pub. Date: May 6, 2021

(65) Prior Publication Data
US 2024/0246945 A1   Jul. 25, 2024

(30) Foreign Application Priority Data

Oct. 29, 2019  (KR) .......... 10-2019-0135235
Oct. 29, 2019  (KR) .......... 10-2019-0135258
Oct. 22, 2020  (KR) .......... 10-2020-0137689

(51) Int. Cl.
| | |
|---|---|
| *C07D 413/14* | (2006.01) |
| *A01N 43/82* | (2006.01) |
| *A01N 43/84* | (2006.01) |
| *A01N 43/90* | (2006.01) |
| *A01P 7/04* | (2006.01) |
| *C07D 417/14* | (2006.01) |
| *C07D 498/10* | (2006.01) |

(52) U.S. Cl.
CPC .......... *C07D 413/14* (2013.01); *A01N 43/82* (2013.01); *A01N 43/84* (2013.01); *A01N 43/90* (2013.01); *A01P 7/04* (2021.08); *C07D 417/14* (2013.01); *C07D 498/10* (2013.01)

(58) Field of Classification Search
CPC .. C07D 413/14; C07D 417/14; C07D 498/10; A01N 43/82; A01N 43/90; A01N 43/84; A01P 7/04
See application file for complete search history.

(56) References Cited

U.S. PATENT DOCUMENTS

| | | | |
|---|---|---|---|
| 4,871,753 A | 10/1989 | Rohr | |
| 10,017,499 B2* | 7/2018 | Qiu | ............ C07D 487/08 |
| 10,660,333 B2* | 5/2020 | Willot | ............ A01N 43/50 |
| 2011/0263610 A1* | 10/2011 | Wan | ............ A61P 17/04 |
| | | | 514/253.09 |
| 2018/0007900 A1 | 1/2018 | Fischer et al. | |
| 2019/0040042 A1 | 2/2019 | Jansen et al. | |
| 2019/0045783 A1 | 2/2019 | Heil et al. | |
| 2019/0047982 A1 | 2/2019 | Jansen et al. | |
| 2019/0047987 A1 | 2/2019 | Heil et al. | |
| 2019/0119250 A1 | 4/2019 | Willot et al. | |
| 2019/0166837 A1 | 6/2019 | Willot et al. | |
| 2020/0172511 A1 | 6/2020 | Mosrin et al. | |

FOREIGN PATENT DOCUMENTS

| | | |
|---|---|---|
| WO | 2009-029632 A1 | 3/2009 |
| WO | 2011-009804 A2 | 1/2011 |
| WO | 2016-128298 A1 | 8/2016 |
| WO | 2017-076739 A1 | 5/2017 |
| WO | 2017-137319 A1 | 8/2017 |
| WO | 2017-137337 A1 | 8/2017 |
| WO | 2017-137338 A1 | 8/2017 |
| WO | 2017-137339 A1 | 8/2017 |
| WO | 2017-186536 A1 | 11/2017 |
| WO | 2018-029102 A1 | 2/2018 |
| WO | 2018-037223 A1 | 3/2018 |
| WO | 2018-185191 A1 | 10/2018 |
| WO | 2018-210625 A1 | 11/2018 |

OTHER PUBLICATIONS

International Search Report issued for International Application No. PCT/KR2020/014897 on Jan. 29, 2021, 4 pages.

* cited by examiner

*Primary Examiner* — D Margaret M Seaman

(74) *Attorney, Agent, or Firm* — ROTHWELL, FIGG, ERNST & MANBECK, P.C.

(57) ABSTRACT

The present invention provides a compound represented by chemical formula I and a control composition comprising same.

20 Claims, No Drawings

COMPOUND FOR CROP PROTECTANT

This application is a 35 U.S.C. 371 National Phase Entry application from PCT/KR2020/014897, filed on Oct. 29, 2020, which claims the benefit of the filing dates of Korean Patent Applications Nos. 10-2019-0135235, 10-2019-0135258, and 10-2020-0137689, filed in the Korean Intellectual Property Office on Oct. 29, 2019, Oct. 29, 2019 and Oct. 22, 2020, respectively, all of the contents of which are incorporated herein in their entirety.

TECHNICAL FIELD

The present invention relates to a novel compound for crop protection.

BACKGROUND

Some insects are parasitic to animals and plants, and these insects, particularly, insects damaging crops are referred to as, so called, plant pests. Plant pests are causing great damage to crop cultivation by seizing nutrients from roots, stems or leaves of the crop or eating the crop itself.

Meanwhile, various types of control agents are used to remove pests. Nonetheless, as resistance to control agents is expressed in pests, it is difficult to effectively eradicate various pests. Therefore, it is considered to use a more highly toxic and high-concentration control agent, which may cause severe contamination of soil, as well as secondary damage to humans or animals eating the crop due to a control agent remaining in the crop.

Therefore, there is a need for a novel material that has an excellent control effect on pests at a relatively low concentration and can be safer for humans and livestock.

BRIEF SUMMARY

The present invention is directed to providing a novel insecticidal compound and a control composition including the same.

The compound according to the present invention may exhibit excellent mortality against pests, for example, aphids, with a relatively low concentration.

In one aspect, the present invention provides a compound represented by the following Formula I:

[Formula I]

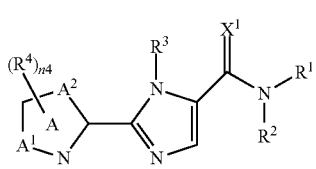

In this formula, $X^1$ is oxygen or sulfur, ring A is a substituted or unsubstituted, aliphatic or aromatic 5-membered heterocyclic group consisting of two carbon atoms and three hetero atoms, and $A^1$ and $A^2$ are each independently nitrogen, oxygen or sulfur, $R^1$, $R^2$ and $R^3$ are each independently selected from hydrogen and the following substituent group I, n4 is an integer of 1 to 3, $R^4$ is the same or different when n4 is 2 or more and each independently selected from hydrogen and the following substituent group I, and/or the selected $R^4$ is fused together to form a substituted or unsubstituted $C_{3-8}$ carbocyclic group or substituted or unsubstituted 3 to 8-membered heterocyclic group with carbon bonded thereto, wherein the substituent group I consists of a substituted or unsubstituted $C_{1-10}$ alkyl group, a substituted or unsubstituted $C_{2-10}$ alkenyl group, a substituted or unsubstituted $C_{3-20}$ carbocyclic group, a substituted or unsubstituted $C_{3-20}$ cycloalkyl group, a substituted or unsubstituted $C_{6-30}$ aryl group, a substituted or unsubstituted 3 to 30-membered heterocyclic group, a substituted or unsubstituted $C_{1-10}$ alkoxy group, a substituted or unsubstituted $C_{2-10}$ alkenyloxy group, a substituted or unsubstituted $C_{3-10}$ cycloalkyloxy group, a substituted or unsubstituted $C_{6-30}$ aryloxy group, a substituted or unsubstituted 3 to 30-membered heterocyclic oxy group, a substituted or unsubstituted $C_{1-10}$ alkylcarbonyl group, a substituted or unsubstituted $C_{2-10}$ alkenylcarbonyl group, a substituted or unsubstituted $C_{3-10}$ cycloalkylcarbonyl group, a substituted or unsubstituted $C_{6-30}$ arylcarbonyl group, a substituted or unsubstituted 3 to 30-membered heterocyclic carbonyl group, a substituted or unsubstituted $C_{1-10}$ alkylthio group, a substituted or unsubstituted $C_{2-10}$ alkenylthio group, a substituted or unsubstituted $C_{3-10}$ cyclo alkylthio group, a substituted or unsubstituted $C_{6-30}$ arylthio group, a substituted or unsubstituted 3 to 30-membered heterocyclic thio group, an aldehyde group, a carboxyl group, a halogen group, a $C_{1-10}$ haloalkyl group, a hydroxyl group, a substituted or unsubstituted amino group, an imine group, a cyano group, a nitro group, an amide group, a thiol group, a sulfone group, sulfonyl group, sulfinyl group and a phosphate group, the $C_{1-10}$ alkyl group is optionally introduced by a hetero atom group selected from —O—, —S—, —SO—, —SO$_2$—, —NR$^a$— (R$^a$ is hydrogen or substituted or unsubstituted $C_{1-10}$ alkyl), —N=, =N—, —POR$^a$— and —PO$_4$R$^a$—, and the heterocyclic group comprises at least one of sulfur, nitrogen, phosphorus and oxygen as a ring member.

In one aspect, the present invention provides an acceptable salt of the compound, an enantiomer, diastereomer, solvate, geometric isomer or tautomer thereof.

In one embodiment, the present invention provides a control composition which includes at least one of an acceptable salt, enantiomer, diastereomer, solvate, geometric isomer and tautomer thereof as an active ingredient.

This control composition may contain the active ingredient at 0.01 to 3,000 ppm, specifically 0.1 to 1,000 ppm, and more specifically 0.1 to 100 ppm. The control composition has a mortality rate against pests, specifically, hemiptera pests, and more specifically pests of the family Aphidoidea, of 30% or more, specifically, 50% or more, even more specifically, 70% or more, and most specifically, 99% or more even with a relatively low concentration as above.

DETAILED DESCRIPTION

Hereinafter, the intentions, actions and effects of the present invention will be described in detail with reference to embodiments of the present invention and specific examples thereof. However, the following examples are provided to help in understanding the present invention, and the scope of the present invention is not determined or limited thereby.

In the order of "compound" and "control composition" according to the present invention, aspects of the present invention will be described in detail.

Prior to this, terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

Therefore, since the configurations of the examples described herein are merely provided as the most preferable examples and do not represent all of the technical spirit of the present invention, it should be understood that there may be various equivalents and modifications that can replace them at the time of application.

In the specification, singular expressions include plural expressions unless clearly indicated otherwise in the context.

In the specification, when one component "includes" another component, this means that, unless specifically stated otherwise, other components may be further included, rather than excluded. Thus, for example, a compound including compound A may include compounds other than A. However, as a specific aspect of the present invention, the term "include" also includes "essentially/necessarily consisting of" and "comprising" in a more limited meaning, and for example, the "composition including compound A" may also (essentially/necessarily) consist of compound A.

In this regard, the term "include" or "have" used herein is for indicating the presence of implemented characteristics, numbers, steps, elements or a combination thereof, and does not preclude the possibility of the presence or addition of one or more other characteristics, numbers, steps, elements or a combination thereof.

In the specification, an enantiomer refers to two mirror-image stereoisomers of a compound, which do not overlap each other.

In the specification, a diastereomer refers to a stereoisomer which has two or more chiral centers, and its molecule is not a mirror image. Diastereomers have different physical properties, for example, a melting point, a boiling point, a spectral characteristic and reactivity. A diastereomer mixture may be separated through high resolution analysis procedures such as electrophoresis and chromatography.

In the specification, a geometric isomer refers to a cis type in which the same types of atoms or atom groups are located on the same side around a double bond, a trans type in which the same types of atoms or atom groups are located on opposite sides around a double bond, or an E or Z type according to CIP priorities.

In the specification, a tautomer or a tautomer form refers to a structural isomer with different energies compatible due to a low energy barrier. For example, proton tautomers (also known as protonated tautomers) include interconversion through the transfer of protons, for example, keto-enol and imine-enamine isomerization. Valence tautomers include interconversion due to remigration of some binding electrons.

In the specification, a solvate refers to an aggregate or complex of one or more solvent molecules and the compound of the present invention. Examples of solvents that form solvates include, but are not limited, water, isopropanol, ethanol, methanol, dimethyl sulfoxide, ethyl acetate, acetic acid and ethanol amine. A hydrate refers to a complex in which a solvent molecule is water.

The term "acceptable salt" used herein refers to a salt of an active compound prepared with an acid or base, which depends on a specific substituent based on the compounds disclosed herein. When the compound according to the present invention contains a relatively acidic functional group, the base addition salt can be obtained by contacting this compound in a neutral state with a sufficient amount of a desired base in a solvent-free or suitable inert solvent.

Acceptable salts include, for example, an alkali metal salt, for example, a sodium or potassium salt; an alkaline earth metal salt such as a calcium or magnesium salt; an ammonium salt; an aliphatic amine salt such as a trimethylamine, triethylamine, dicyclohexylamine, ethanolamine, diethanolamine, triethanolamine or procaine salt; an aralkylamine salt such as an N,N-dibenzylethylenediamine salt; a heterocyclic aromatic amine salt such as a pyridine salt, a picolino salt, a quinoline salt or an isoquinoline salt; a 4-membered ammonium salt such as a tetramethylammonium salt, a tetraethylammonium salt, a benzyltrimethylammonium salt, a benzyltriethylammonium salt, a benzyltributylammonium salt, a methyltrioctylammonium salt or a tetrabutylammonium salt; and a basic amino acid salt such as an arginine or lysine salt. Acidic salts include, for example, an inorganic acid salt such as a hydrochloride sulfate salt, a nitrate salt, a phosphate salt, a carbonate salt, a hydrogen carbonate or perchlorate; an organic acid salt such as acetate, propionate, lactate, malate, fumarate, tartaric acid salt, malate, fumarate, a citrate salt, ascorbate or formic acid; a sulfonate such as methane sulfonate, isothionate, benzene sulfonate or p-toluenesulfonate; and an acidic amino acid salt, for example, aspartate or glutamate. Solvates of the compound of the present invention include alcoholates and hydrates, but the present invention is not limited thereto.

In the specification, when an amount, concentration or another value or parameter is given as an enumeration of a range, a preferable range or preferable upper limit and lower limit, it should be understood that this specifically discloses all ranges that it can be formed in a pair of any upper range limit or preferable value and any lower range limit or preferable value regardless of whether the range is disclosed separately. When the range of numerical values is mentioned in the specification, unless stated otherwise, for example, unless there is a limiting term such as greater than or less than, the range is intended to include the endpoints and all integers and fractions within the prementioned range. It is intended that the scope of the present invention is not limited to specific values which are stated to define the range.

The term "pest" broadly means an invertebrate that is directly or indirectly harmful to humans, and narrowly an invertebrate that causes direct damage to at least one of animals and plants, and more specifically, plants.

Examples of pests intended in the present invention include, unlimitedly, pests of the order Lepidoptera, pests of the order Hemiptera, pests of the order Coleoptera, pests of the order Diptera, pests of the order Hymenoptera, pests of the order Orthoptera, pests of the order Thysanoptera, pests of Ixodida, pests of the order Blattodea, *Tuta absoluta* and Nematoda.

More specifically, the compound according to the present invention may have effective insecticidal activity against pests of the order Hemiptera and/or Nematoda, and exceptionally strong insecticidal activity against pests of the superfamily Aphidoidea in the order Hemiptera.

Examples of pests of the order Hemiptera may include, but are not limited to, *Nezara antennata, Stenotus rubrovittatus, Graphosoma rubrolineatum, Trigonotylus coelestialium, Aeschynteles maculatus, Creontiades pallidifer, Dysdercus cingulatus, Chrysomphalus ficus, Aonidiella aurantii, Graptopsaltria nigrofuscata, Blissusleucopterus, Icerya purchasi, Piezodorus hybneri, Lagynotomus elongatus, Thaia subrufa, Scotinophara lurida, Sitobion ibarae,*

*Stariodes iwasakii, Aspidiotus destructor, Taylorilygus pallidulus, Myzusmumecola, Pseudaulacaspis prunicola, Acyrthosiphon pisum, Anacanthocoris striicomis, Ectometopterus micantulus, Eysarcoris lewisi, Molipteryx fulginosa, Cicadella viridis, Rhopalosophum rufiabdominalis, Saissetia oleae, Trialeurodes vaporariorum, Aguriahana quercus, Lygus* spp., *Euceraphis punctipennis, Andaspis kashicola, Coccus pseudomagnoliarum, Cavelerius saccharivorus, Galeatus spinifrons, Macrosiphoniella sanbori, Aonidiella citrina, Halyomorpha mista, Stephanitis fasciicarina, Trioza camphorae, Leptocorisa chinensis, Trioza quercicola, Uhlerites latius, Erythroneura comes, Paromius exiguus, Duplaspidiotus claviger, Nephotettix nigropictus, Halticiellus insularis, Perkinsiella saccharicida, Psylla malivorella, Anomomeura mori, Pseudococcus longispinis, Pseudaulacaspis pentagona, Pulvinaria kuwacola, Apolygus lucorum, Togo hemipterus, Toxoptera aurantii, Saccharicoccus sacchari, Geoica lucifuga, Numata muiri, Comstockaspis perniciosa, Unaspis citri, Aulacorthum solani, Eysarcoris ventralis, Bemisia argentifolii, Cicadella spectra, Aspidiotus hederae, Liorhyssus hyalinus, Calophya nigridorsalis, Sogatella furcifera, Megoura crassicauda, Brevicoryne brassicae, Aphis glycines, Leptocorisa oratorius, Nephotettix virescens, Uroeucon formosanum, Cyrtopeltis tennuis, Bemisia tabaci, Lecanium persicae, Parlatoria theae, Pseudaonidia paeoniae, Empoasca onukii, Plautia stali, Dysaphis tulipae, Macrosiphum euphorbiae, Stephanitis pyrioides, Ceroplastes ceriferus, Parlatoria camelliae, Apolygus spinolai, Nephotettix cincticeps, Glaucias subpunctatus, Orthotylus flavosparsus, Rhopalosiphum maidis, Peregrinus maidis, Eysarcoris parvus, Cimex lectularius, Psylla abieti, Nilaparvata lugens, Psylla tobirae, Eurydema rugosum, Schizaphis piricola, Psylla pyricola, Parlatoreopsis pyri, Stephanitis nashi, Dysmicoccus wistariae, Lepholeucaspis japonica, Sappaphis pin, Lipaphis erysimi, Neotoxoptera formosana, Rhopalosophum nymphaeae, Edwardsianarosae, Pinnaspisaspidistrae, Psylla alni, Speusotettix subfusculus, Alnetoidia alneti, Sogatella panicicola, Adelphocoris lineolatus, Dysdercus poecilus, Parlatoria ziziphi, Uhlerites debile, Laodelphax striatella, Eurydema pulchrum, Cletus trigonus, Clovia punctata, Empoasca* sp., *Coccus hesperidum, Pachybrachius luridus, Planococcus kraunhiae, Stenotus binotatus, Arboridia apicalis, Macrosteles fascifrons, Dolycoris baccarum, Adelphocoris triannulatus, Viteus vitifolii, Acanthocoris sordidus, Leptocorisa acuta, Macropes obnubilus, Cletus punctiger, Riptortus clavatus, Paratrioza cockerelli, Aphrophora costalis, Lygus disponsi, Lygus saundersi, Crisicoccus pini, Empoasca abietis, Crisicoccus matsumotoi, Aphis craccivora, Megacopta punctatissimum, Eysarcoris guttiger, Lepidosaphes beckii, Diaphorina citri, Toxoptera citricidus, Planococcus citri, Dialeurodes citri, Aleurocanthus spiniferus, Pseudococcus citriculus, Zyginella citri, Pulvinaria citricola, Coccus discrepans, Pseudaonidia duplex, Pulvinaria aurantii, Lecanium comi, Nezara viridula, Stenodema calcaratum, Rhopalosiphum padi, Sitobion akebiae, Schizaphis graminum, Sorhoanus tritici, Brachycaudus helichrysi, Carpocoris purpureipennis, Myzus persicae, Hyalopterus pruni, Aphis farinose yanagicola, Metasalis populi, Unaspis yanonensis, Mesohomotoma camphorae, Aphis spiraecola, Aphis pomi, Lepidosaphes ulmi, Psylla mali, Heterocordylus flavipes, Myzus malisuctus, Aphidonuguis mali, Orientus ishidai, Ovatus malicolens, Eriosoma lanigerum, Ceroplastes rubens* and *Aphis gossypii*.

Nematoda may be classified into *Meloidogyne* spp., *Globodera* spp., *Anguina* spp., *Ditylenchus* spp., *Ditylenchus* spp., *Pratylenchus* spp., *Aphelenchoides* spp. and *Rotylenchulus* spp. according to their shape, attacking pattern and host, and examples of nematodes may include, but are not limited to, *Meloidogyne incognita, Meloidogyne incognita acrita, Meloidogyne javanica, Meloidogyne kikuyensis, Meloidogyne naasi, Meloidogyne paranaensis, Meloidogyne thamesi, Meloidogyne acronea, Meloidogyne africana, Meloidogyne arenaria, Meloidogyne arenariathamesi, Meloidogyne artiella, Meloidogyne chitwoodi, Meloidogyne coffeicola, Meloidogyne ethiopica, Meloidogyne exigua, Meloidogyne graminicola, Meloidogyne graminis* and *Meloidogyne hapla*.

The term "pest control" used herein refers to killing insects that are pests, prevention or inhibition of the generation, growth and reproduction of pests.

The term "insecticidal activity" used herein refers to a property or ability to help in controlling a target insect, including an action of paralyzing the nervous system of an insect to be controlled, suppressing the generation of the epidermis of an insect, or inhibiting the respiration of an insect.

The term "substitution" or "substituted" used herein may refer to bonding something to a compound or the substituent group by replacing a hydrogen atom bonding to each of the listed substituents with any substituent. Here, the position to be substituted is not limited as long as the position where a hydrogen atom bonding to each of the listed substituents exists in a compound or the substituent group, that is, the position where a hydrogen atom is capable of being substituted with a substituent. If two or more hydrogen atoms are substituted, two or more substituents may be the same or different. In contrast, the "unsubstition" or "unsubstituted" may mean that no hydrogen atom bonding to a carbon atom is substituted with a substituent.

A substituent applicable to the "substitution" or "substituted" may be suitably selected from the substituents listed in the description of the substituent groups in the specification, but the scope of available substituents is not limited to such substituent groups.

A preferably applicable substituent applied to the "substitution" or "substituted" may be selected from the group consisting of, specifically, a halogen group, a $C_{1-10}$ alkyl group, a $C_{2-10}$ alkenyl group, a $C_{2-10}$ alkynyl group, a $C_{3-10}$ carbocyclic group, a $C_{3-10}$ cycloalkyl group, a $C_{6-30}$ aryl group, a 3 to 30-membered heterocyclic group, a $C_{1-10}$ alkoxy group, a $C_{2-10}$ alkenyloxy group, a $C_{2-10}$ alkynyloxy group, a $C_{3-10}$ cyclo alkyloxy group, a $C_{6-30}$ aryloxy group, a 3 to 30-membered heterocyclic oxy group, a $C_{1-10}$ alkylcarbonyl group, a $C_{1-10}$ alkenylcarbonyl group, a $C_{1-10}$ alkylcarboxyl group, a $C_{1-10}$ alkenylcarboxyl group, a $C_{1-10}$ cycloalkylcarbonyl group, a $C_{6-30}$ arylcarbonyl group, a 3 to 30-membered heterocyclic carbonyl group, a $C_{1-10}$ alkylthio group, a $C_{1-10}$ alkenylthio group, a $C_{1-10}$ cyclo alkylthio group, a $C_{6-30}$ arylthio group, a 3 to 30-membered heterocyclic thio group, an aldehyde group, a carboxyl group, a hydroxyl group, an amino group, an imine group, a cyano group, a nitro group, an amide group, a thiol group, a sulfone group, sulfonyl group, sulfinyl group and a phosphate group.

Unless a substituent is separately described or stated in the formulas described herein, hydrogen may be considered to be bonded, and in some cases, a substituent may be absent depending on a ring member constituting a heterocycle.

The term "group" described herein may form the term "alkyl group" in combination with a preceding substituent, for example, an alkyl that is able to be bonded to any position of the compound or substituent.

In the specification, a halogen may include Cl, F, Br and I.

In the specification, unless stated otherwise, the alkyl is a linear or branched monovalent hydrocarbon having the number of carbon atoms (that is, $C_{1-10}$ refers to 1 to 10 carbon atoms) as it is or as a part of another substituent.

Examples of alkyl may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopropyl, cyclobutyl, cyclopentyl, 3-methyl cyclopentyl, 2,3-dimethyl cyclopentyl, cyclohexyl, 3-methyl cyclohexyl, 4-methyl cyclohexyl, 2,3-dimethyl cyclohexyl, 3,4,5-trimethyl cyclohexyl, 4-tert-butyl cyclohexyl, cycloheptyl, cyclooctyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl and 5-methylhexyl, but these are non-limiting examples and the scope of the present invention is not limited thereto.

In the specification, the alkenyl may be linear or branched. Examples of the alkenyl may include, for example, ethenyl, 1-propenyl, 2-propenyl, 1-methylethenyl, ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-I-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-I-methyl-2-propenyl, 1-ethyl-2-methyl-1-propenyl, 1-ethyl-2-methyl-2-propenyl, 1-heptenyl, 2-heptenyl, 3-heptenyl, 1-octenyl, 2-octenyl, 3-octenyl, 4-octenyl, 1-nonenyl, 2-nonenyl, 3-nonenyl, 4-nonenyl, 1-decenyl, 2-decenyl, 3-decenyl, 4-decenyl and 5-decenyl, but the present invention is not limited thereto.

In the specification, the alkynyl may be linear or branched, and for example, 1-propynyl, 2-propynyl, 1-butynyl, 2-butynyl, 3-butynyl, 1-methyl-2-propynyl, 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, 1-ethyl-I-methyl-2-propynyl, or 2,5-hexadiynyl, but the present invention is not limited thereto.

In the specification, the "haloalkyl" is synonymous with the "halogenated alkyl" and "halogen-substituted alkyl," and may refer to an alkyl in which any hydrogen atom is substituted with any halogen, for example, a halogen atom selected from Cl, F, Br and I. For example, $—CF_3$, $—CH_2Cl$, $—CH_2CF_3$, and $—C(Cl_2)CF_3$ are haloalkyl groups, but the scope of the present invention is not limited thereto.

In the specification, the alkoxy refers to a substituent in which oxygen binds to an alkyl group, and may be linear, branched or cyclic. Examples of alkoxy groups may include, specifically, methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and a monohalogenated or polyhalogenated variant thereof, but the scope of the present invention is not limited thereto.

In the specification, the amino is intended to encompass a monovalent primary amine, a monovalent secondary amine and a monovalent tertiary amine. That is, the amino group refers to both of a monovalent group in which two hydrogen atoms bond to a nitrogen atom and a monovalent group in which at least one hydrogen atom is substituted with another substituent. Here, the amino group in which two hydrogen atoms bond to a nitrogen atom may be an unsubstituted amino group, and the amino group in which at least one hydrogen atom is substituted with another substituent may be a substituted amino group. Meanwhile, in the amino group with two substituents, each substituent may be the same or different.

In the specification, the "carbocycle" and "carbocyclic" refers to a ring consisting of carbon as a ring member. The carbocycle may be an aliphatic or aromatic, saturated or unsaturated, and monocyclic or polycyclic ring. The polycyclic ring may be a fused, bridged, or spiro polycyclic ring. The monocyclic carbocycle may have 3 to 17 carbon atoms, specifically, 3 to 14 carbon atoms, more specifically, 3 to 10 carbon atoms, and most specifically, 3 to 7 carbon atoms.

In the specification, the cycloalkyl refers to a monovalent aliphatic carbocycle in which one hydrogen atom is removed at any site of a carbon atoms constituting the ring. Examples of the cycloalkyl may be cyclopropyl, cyclobutyl, cyclopentyl, 3-methyl cyclopentyl, 2,3-dimethyl cyclopentyl, cyclohexylene 3-methyl cyclohexyl, 4-methyl cyclohexyl, 2,3-dimethyl cyclohexyl, 3,4,5-trimethyl cyclohexyl, 4-tert-butyl cyclohexyl, cycloheptyl and cyclooctyl, but the present invention is not limited thereto.

In the specification, aryl refers to a ring which is a polyunsaturated, typically, aromatic hydrocarbon ring, and here, aryl may be a monocyclic or polycyclic ring. The polycyclic rings include a form in which an aromatic hydrocarbon ring is used and a form in which an aliphatic hydrocarbon ring is fused with an aromatic hydrocarbon. Examples of aryl may include, as a monocyclic aryl, a phenyl group, a non-phenyl group, a terphenyl group and a quarterphenyl group; and as polycyclic aryl, a naphthyl group, an anthracenyl group, a phenanthrenyl group, a pyrenyl group, and a benzopyrenyl group.

In the specification, the heterocycle refers to a ring including a non-carbon atom(s), that is, 1 to 5 hetero atoms selected from O, N, P and S as a ring member. Here, the heterocycle may be an aromatic, aliphatic, monocyclic or polycyclic ring, and unlimited examples of heterocycles may include a thiophenyl group, a furanyl group, a pyrrolyl group, an imidazolyl group, a thiazolyl group, an oxazolyl group, an oxadiazolyl group, a pyridinyl group, a non-pyridinyl group, a pyrimidinyl group, a triazynyl group, a triazolyl group, a pyridazinyl group, a pyrazinyl group, a pyrido pyrimidyl group, a pyrido pyrazinyl group, a pyrazino pyrazinyl group, an isooxazolyl group and a thiadiazolyl group, but the scope of the present invention is not limited thereto.

In the specification, the heteroaryl refers to an aromatic heterocycle, and a monocyclic or polycyclic group. The polycyclic rings include a form in which a plurality of aromatic rings are fused, as well as a form in which an aromatic ring and an aliphatic ring are fused. Examples of heteroaryl may include a pyridinyl group, a pyrrolyl group, a furanyl group, a thiophenyl group, an acridyl group, a quinolinyl group, a quinazolinyl group, a quinoxalinyl group, a phthalazinyl group, an isoquinolinyl group, an indolyl group, a carbazolyl group, a benzoxazolyl group, a benzimidazolyl group, a benzothiazolyl group, a benzocarbazolyl group, a benzothiophenyl group, a dibenzothiophenyl group, a benzofuranyl group, a phenanthrolinyl group, a phenothiazinyl group, a dibenzofuranyl group and a fluorenyl group, but the scope of the present invention is not limited thereto.

In the specification, the oxy is a substituent represented by "—OR$^{oxy}$", and here, R$^{oxy}$ may be substituted or unsubstituted, and may be C$_{1-10}$ alkyl, C$_{2-10}$ alkenyl, C$_{3-10}$ carbocyclic, C$_{3-10}$ cycloalkyl, C$_{6-30}$ aryl, 3 to 30-membered heterocyclic or C$_{1-10}$ haloalkyl, each of which has been defined as above.

In the specification, the carbonyl is a substituent that can be represented by "—C(=O)R$^{car}$", and here R$^{car}$ may be substituted or unsubstituted, and may be C$_{1-10}$ alkyl, C$_{2-10}$ alkenyl, substituted or unsubstituted C$_{3-10}$ carbocyclic, C$_{3-10}$ cycloalkyl, C$_{6-30}$ aryl, 3 to 30-membered heterocyclic or C$_{1-10}$ haloalkyl, each of which has been defined as above.

In the specification, the thio is a substituent that can be represented by "—SR$^{thio}$", and here, R$^{thio}$ may be substituted or unsubstituted, and may be C$_{1-10}$ alkyl, C$_{2-10}$ alkenyl, C$_{3-10}$ carbocyclic, C$_{3-10}$ cycloalkyl, C$_{6-30}$ aryl, 3 to 30-membered heterocyclic, or C$_{1-10}$ haloalkyl, each of which has been defined as above.

In the specification, the imine or imino is intended to include monovalent primary ketimine (—C(NH)R$^{i-1}$), secondary ketimine (—C(NR$^{i-2}$)R$^{i-1}$), primary aldimine (—C(NH)H) and secondary aldimine (—C(N R$^{i-1}$) H). Here, R$^{i-1}$ and R$^{i-2}$ are each independently C$_{1-10}$ alkyl, C$_{2-10}$ alkenyl, C$_{3-10}$ carbocyclic, C$_{3-10}$ cycloalkyl, C$_{6-30}$ aryl, 3 to 30-membered heterocyclic, or C$_{1-10}$ haloalkyl, each of which may be substituted or unsubstituted, and has been defined as above.

In the specification, the sulfone is a substituent that can be represented by "—S(=O)$_2$R$^s$", and here, R$^s$ may be substituted or unsubstituted, and may be a C$_{1-10}$ alkyl, C$_{2-10}$ alkenyl, C$_{3-10}$ carbocyclic, C$_{3-10}$ cycloalkyl, C$_{6-30}$ aryl, 3 to 30-membered heterocyclic or C$_{1-10}$ haloalkyl, each of which has been defined as above.

In the specification, the phosphate is a substituent that can be represented by "—OP(=O)(OH)$_2$" or "—OP(=O)(OH)(OR$^P$)", and here, R$^P$ may be substituted or unsubstituted, and may be a C$_{1-10}$ alkyl, C$_{2-10}$ alkenyl, C$_{3-10}$ carbocyclic, C$_{3-10}$ cycloalkyl, C$_{6-30}$ aryl, 3 to 30-membered heterocyclic or C$_{1-10}$ haloalkyl, each of which has been defined as above.

Compounds

A compound according to the present invention is a compound represented by the following Formula I:

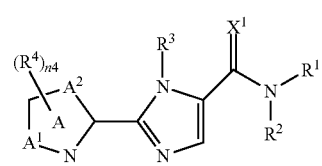

[Formula I]

wherein
X$^1$ is oxygen or sulfur,
ring A is a substituted or unsubstituted, aliphatic or aromatic 5-membered heterocyclic group consisting of two carbon atoms and three hetero atoms, and A$^1$ and A$^2$ are each independently nitrogen, oxygen or sulfur,
R$^1$, R$^2$ and R$^3$ are each independently selected from hydrogen and the following substituent group I,
n4 is an integer of 1 to 3, R$^4$ is the same or different when n4 is 2 or more and each independently selected from hydrogen and the following substituent group I, and/or the selected R$^4$ is fused together to form a substituted or unsubstituted C$_{3-8}$ carbocyclic group or substituted or unsubstituted 3 to 8-membered heterocyclic group with carbon bonded thereto,
wherein the substituent group I consists of a substituted or unsubstituted C$_{1-10}$ alkyl group, a substituted or unsubstituted C$_{2-10}$ alkenyl group, a substituted or unsubstituted C$_{3-20}$ carbocyclic group, a substituted or unsubstituted C$_{3-20}$ cycloalkyl group, a substituted or unsubstituted C$_{6-30}$ aryl group, a substituted or unsubstituted 3 to 30-membered heterocyclic group, a substituted or unsubstituted C$_{1-10}$ alkoxy group, a substituted or unsubstituted C$_{2-10}$ alkenyloxy group, a substituted or unsubstituted C$_{3-10}$ cycloalkyloxy group, a substituted or unsubstituted C$_{6-30}$ aryloxy group, a substituted or unsubstituted 3 to 30-membered heterocyclic oxy group, a substituted or unsubstituted C$_{1-10}$ alkylcarbonyl group, a substituted or unsubstituted C$_{2-10}$ alkenylcarbonyl group, a substituted or unsubstituted C$_{3-10}$ cycloalkylcarbonyl group, a substituted or unsubstituted C$_{6-30}$ arylcarbonyl group, a substituted or unsubstituted 3 to 30-membered heterocyclic carbonyl group, a substituted or unsubstituted C$_{1-10}$ alkylthio group, a substituted or unsubstituted C$_{2-10}$ alkenylthio group, a substituted or unsubstituted C$_{3-10}$ cyclo alkylthio group, a substituted or unsubstituted C$_{6-30}$ arylthio group, a substituted or unsubstituted 3 to 30-membered heterocyclic thio group, an aldehyde group, a carboxyl group, a halogen group, a C$_{1-10}$ haloalkyl group, a hydroxyl group, a substituted or unsubstituted amino group, an imine group, a cyano group, a nitro group, an amide group, a thiol group, a sulfone group, sulfonyl group, sulfinyl group and a phosphate group,
the C$_{1-10}$ alkyl group is optionally introduced by a hetero atom group selected from —O—, —S—, —SO—, —SO$_2$—, —NR$^a$— (R$^a$ is hydrogen or substituted or unsubstituted C$_{1-10}$ alkyl), —N=, =N—, —POR$^a$— and —PO$_4$R$^a$—, and the heterocyclic group comprises at least one of sulfur, nitrogen, phosphorus and oxygen as a ring member.

In one specific example, R$^2$ and R$^3$ are each independently a substituted or unsubstituted C$_{1-4}$ alkyl group.

In one specific example, X$^1$ may be oxygen.

In one specific example, in the ring A,
A$^1$ is oxygen and A$^2$ is nitrogen;
A$^1$ is sulfur and A$^2$ is nitrogen; or
A$^1$ is nitrogen and A$^2$ is oxygen.

In one specific example, $R^4$ may be selected from the following substituent group I-1, which is a subgroup of the substituent group I, and/or two of $R^4$ may be fused together to form a substituted or unsubstituted $C_{3-8}$ carbocyclic group or substituted or unsubstituted 3 to 8-membered heterocyclic group with carbon bonded thereto.

The substituent group I-1 consists of a halogen group, a substituted or unsubstituted $C_{1-10}$ alkyl group, $C_{1-10}$ haloalkyl group, a substituted or unsubstituted $C_{3-20}$ cycloalkyl group, a substituted or unsubstituted $C_{6-30}$ aryl group, a substituted or unsubstituted 3 to 30-membered heterocyclic group, a substituted or unsubstituted $C_{1-10}$ alkoxy group, a substituted or unsubstituted $C_{3-10}$ cycloalkylcarbonyl group and a substituted or unsubstituted amino group.

Here, when a substituent of the substituent group I-1 is substituted, it may be one or more substituted groups selected from the group consisting of oxygen, a halogen group, a $C_{1-6}$ alkyl group, a $C_{1-6}$ alkoxy group, a $C_{1-4}$ haloalkyl group, a $C_{1-10}$ alkylcarbonyl group, a $C_{3-10}$ cycloalkyl group, a $C_{1-4}$ alkylthio group, a sulfonyl group and a sulfino group, and/or two selected from the group may be fused to form a substituted or unsubstituted $C_{3-8}$ carbocyclic group or a substituted or unsubstituted 3 to 8-membered heterocyclic group with carbon bonded thereto.

In one specific example, $R^1$ may be a substituted or unsubstituted 3 to 30-membered heterocyclic group.

In one specific example, the compound of Formula I may be represented by the following Formula I-1.

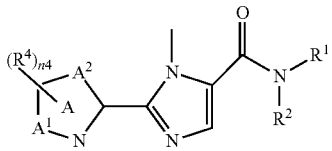

[Formula I-1]

wherein
$R^1$, $R^2$, $R^4$, n4, and ring A, $A^1$ and $A^2$ are defined as in Formula I.

In one specific example, the compound of Formula I may be represented by any one of the following Formulas I-1-1 to I-1-5:

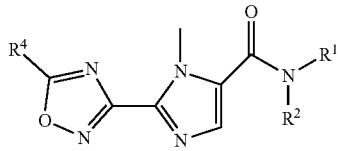

[Formula I-1-1]

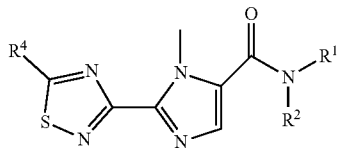

[Formula I-1-2]

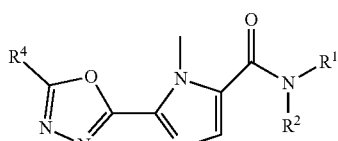

[Formula I-1-3]

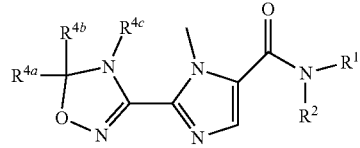

[Formula I-1-4]

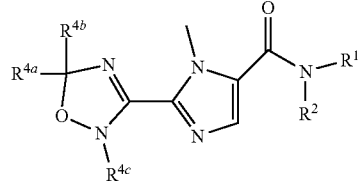

[Formula I-1-5]

wherein
$R^1$ is defined as in Formula I,
$R^2$ is a methyl group or an ethyl group,
$R^4$ is selected from hydrogen and the substituent group I,
$R^{4a}$ and $R^{4b}$ are independently selected from hydrogen and the substituent group I, and/or are fused together to form a substituted or unsubstituted $C_{3-8}$ carbocyclic group or a substituted or unsubstituted 3 to 8-membered heterocyclic group with carbon bonded thereto, however, $R^{4a}$ and $R^{4b}$ are not hydrogen at the same time, and
$R^{4c}$ is selected from hydrogen and the substituent group I.

In one specific example, the compound of Formula I may be represented by the following Formula Ia:

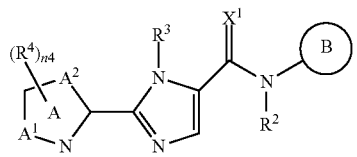

[Formula Ia]

wherein
ring B is a substituted or unsubstituted $C_{3-30}$ carbocyclic group or a substituted or unsubstituted 3 to 30-membered heterocyclic group including at least one of sulfur, nitrogen, phosphorus and oxygen as a ring member, and
ring A, $R^2$, $R^3$, $R^4$, n4, $X^1$, $A^1$ and $A^2$ are defined as in Formula I.

In one specific example, the compound of Formula Ia may be represented by the following Formula Ia-1:

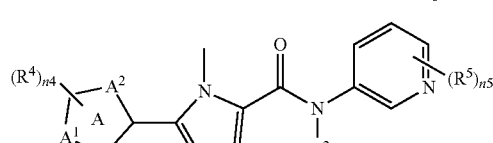

[Formula Ia-1]

wherein
$R^2$, $R^4$, $R^5$, ring A, $A^1$ and $A^2$, n4 and n5 are defined as in Formula I, n5 is an integer of 0 to 4, and $R^5$ is different or the same when n5 is 2 or more and each independently selected from the substituent group I.

In one specific example, the compound of Formula I may be represented by any one of the following Formulas Ia-1-1 to Ia-1-5:

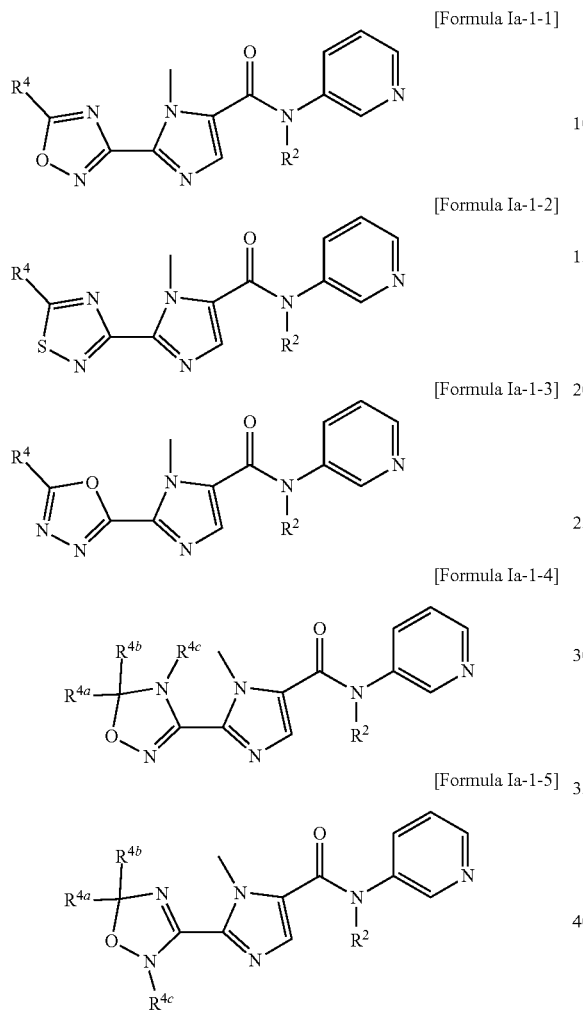

[Formula Ia-1-1]

[Formula Ia-1-2]

[Formula Ia-1-3]

[Formula Ia-1-4]

[Formula Ia-1-5]

wherein
$R^4$ is selected from hydrogen and the substituent group I,
$R^2$ is a methyl group or an ethyl group, and)
$R^{4a}$ and $R^{4b}$ are independently selected from hydrogen and the substituent group I, and/or fused together to form a substituted or unsubstituted $C_{3-8}$ carbocyclic group or substituted or unsubstituted 3 to 8-membered heterocyclic group with carbon bonded thereto, however, $R^{4a}$ and $R^{4b}$ are not hydrogen at the same time, and
$R^{4c}$ is selected from hydrogen and the substituent group I.

Hereinafter, methods of synthetizing compounds represented by Formulas Ia-1-1, Ia-1-2, Ia-1-3, Ia-1-4 and Ia-1-5 will be described. However, the description is to help in understanding of those of ordinary skill in the art, and the methods of synthesizing the compound of the present invention are not limited thereto. In addition, intermediate compounds used in the following description may be prepared by known methods, and methods of preparing the same may also be included in the scope of the present invention:

Synthesis Method 1: Synthesis of Compound Represented by Formula Ia-1-1

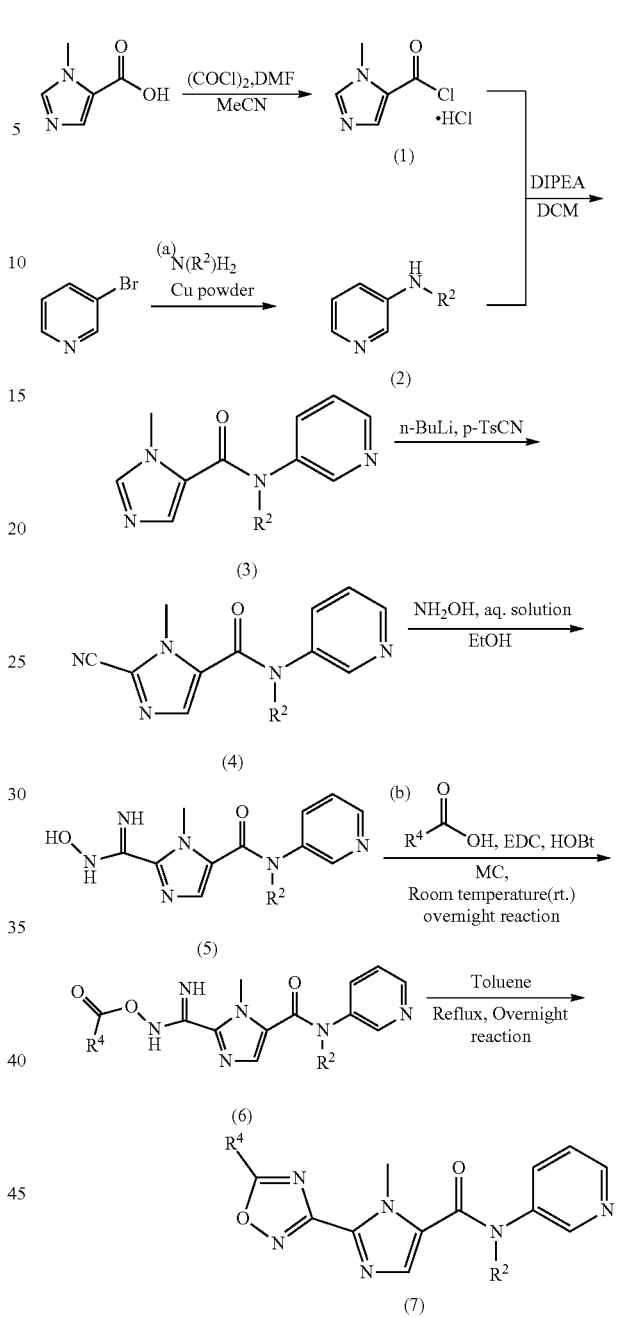

1-Methyl-1H-imidazole-5-carboxylic acid is added to and dissolved in acetonitrile at room temperature. Diethylformamide is added to the resulting solution, and cooled using ice water. Oxalyl chloride is slowly added dropwise to the cooled solution. Afterward, the temperature is raised to room temperature to allow a reaction at room temperature for 5 hours. After the reaction is completed, the resulting solution is concentrated under reduced pressure, and the concentrated residue is crystalized using isopropyl ether. The generated solid is filtered and dried, thereby obtaining a desired compound (i).

3-Bromopyridine, an amine compound (a) and Cu powder are added to a sealed tube, heated to approximately 100° C., and stirred overnight at 100° C. After the reaction, the resulting product is cooled to room temperature and extracted using ethyl acetate. An organic layer is dried with anhydrous MgSO₄, filtered and concentrated, thereby obtaining a desired compound (2).

The compound (1) is dissolved in dichloromethane (DCM; methylene chloride; MC). The resulting solution is cooled using ice water. A solution prepared by dissolving the compound (2) in DCM is slowly added dropwise to the corresponding solution. After further addition of N,N-diisopropylethylamine dropwise, the temperature is raised to room temperature to allow a reaction at room temperature for 30 minutes. The temperature is raised to 50° C. to allow a reaction for 3 hours, followed by cooling to room temperature. The reaction product is quenched and extracted with DCM. An organic layer is dried with anhydrous MgSO₄, filtered, concentrated and then purified by silica gel column chromatography, thereby obtaining a desired compound (3).

The compound (3) is dissolved in tetrahydrofuran (THF), and then toluene is added. After purging with N2 gas, the resulting solution is cooled to −78° C. using acetone and dry ice. n-BuLi is slowly added dropwise to the cooled solution. Afterward, the resulting solution is stirred at −78° C. for 40 minutes. A solution prepared by dissolving p-toluenesulfonyl cyanide in THF is slowly added dropwise. Subsequently, the resulting solution is stirred at −78° C. for 1 hour. The temperature is then raised to room temperature, and the solution was stirred for 4 hours. The resulting solution is quenched with methanol, and then concentrated under reduced pressure. The concentrate is purified by silica gel column chromatography, thereby obtaining a desired compound (4).

The compound (4) is dissolved in ethanol, and an NH₂OH aqueous solution is slowly added dropwise, followed by stirring at room temperature for 1 hour. After the reaction is completed, the resulting solution is concentrated under reduced pressure and purified by silica gel column chromatography, thereby obtaining a desired compound (5).

A carboxylic acid compound (b), 1-ethyl-3-(3-dimethylaminopropyl)carbodiimide hydrochloride (EDCI·HCl) and hydroxybenzotriazole (HOBt) are dissolved in DCM, and then reacted at room temperature for 1 hour. The DCM-dissolved solution is slowly added dropwise to the compound (5), and reacted overnight at room temperature. After the reaction is completed, the resulting product is washed with water and then extracted by adding DCM. After layer separation, an organic layer is dried with anhydrous MgSO₄, filtered, concentrated under reduced pressure and purified by silica gel column chromatography, thereby obtaining a desired compound (6).

The compound (6) is dissolved in toluene and allowed to reflux overnight. The completion of the reaction is confirmed, and then the resulting product is concentrated under reduced pressure and purified by silica gel column chromatography, thereby obtaining a desired compound (7).

Synthesis Method 2: Synthesis of Compound Represented by Formula Ia-1-2

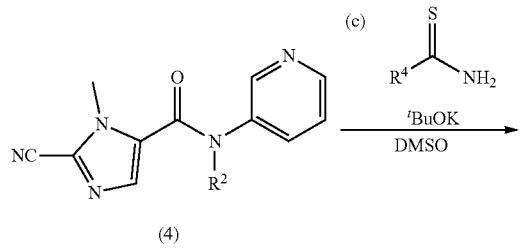

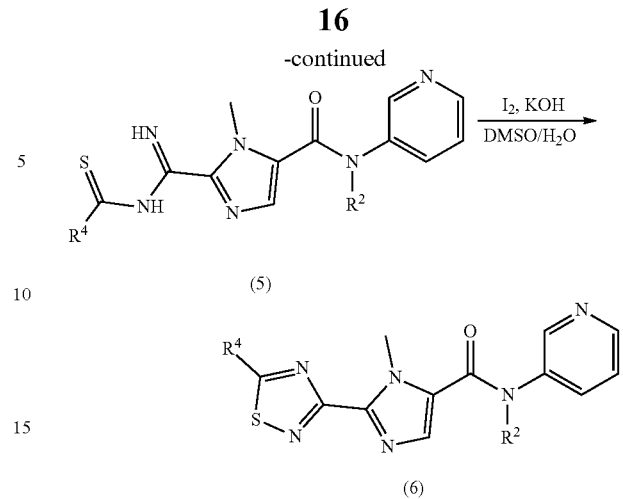

After a compound (4) is obtained by the same method as described in Synthesis Method 1, a thiourea compound (c) is dissolved in dimethyl sulfoxide, and potassium tert-butoxide is added and then stirred at room temperature for 5 minutes, followed by addition of the compound (4). The resulting solution is stirred at room temperature for 3 hours, and the reaction is terminated by adding H₂O, extraction is performed with ethyl acetate, and the resulting organic layer is dried with anhydrous MgSO₄ and filtered. The filtrate is concentrated under reduced pressure, thereby obtaining a desired compound (5), which is used for a subsequent reaction without additional filtration.

The compound (1) is dissolved in dimethyl sulfoxide, and then H₂O is added. Iodine and potassium hydroxide are added, and stirred at room temperature for 24 hours. After the reaction, a saturated Na₂S₂O₃ aqueous solution is added to terminate the reaction, and then extraction is performed with ethyl acetate. The combined organic layer is dried with anhydrous MgSO₄, filtered, concentrated under reduced pressure, and purified by silica gel column chromatography, thereby obtaining a desired compound (6).

Synthesis Method 3: Synthesis of Compound Represented by Formula Ia-1-3

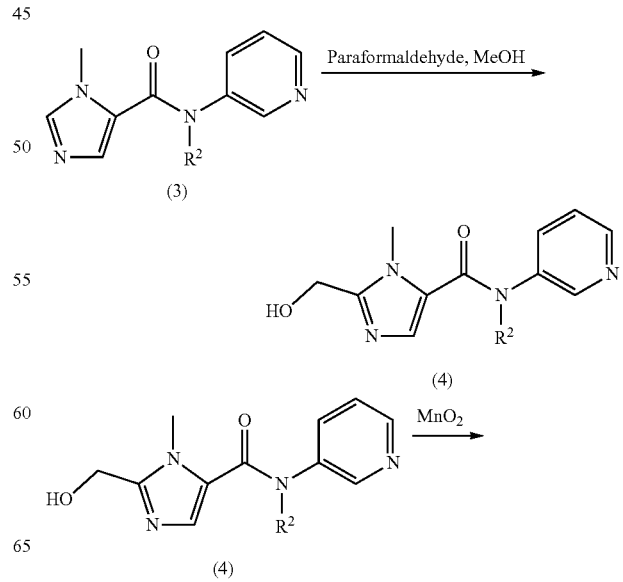

-continued

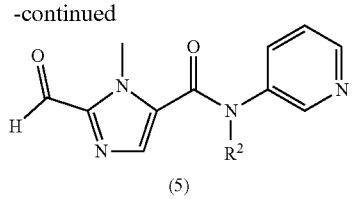

(5)

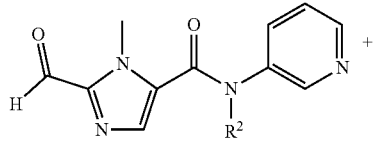

(5)

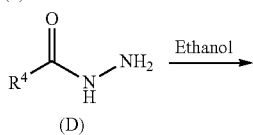

(D)

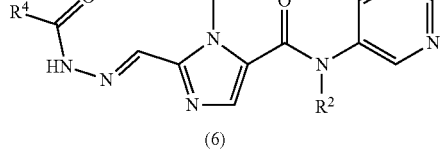

(6)

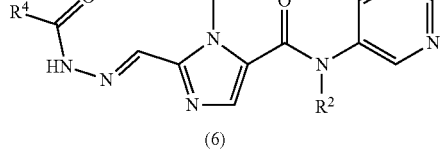

(6)

I₂ $\xrightarrow[\text{1,4-dioxane}]{\text{K}_2\text{CO}_3}$ (7)

Synthesis Method 4: Synthesis of Compounds Represented by Formulas Ia-1-4 and Ia-1-5

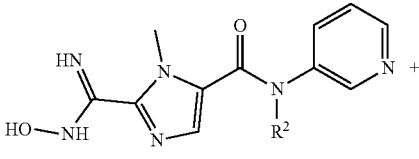

(5)

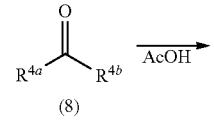 $\xrightarrow{\text{AcOH}}$ (8)

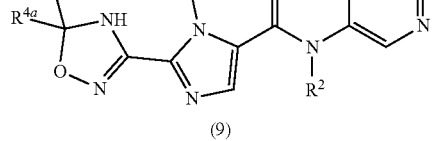

(9)

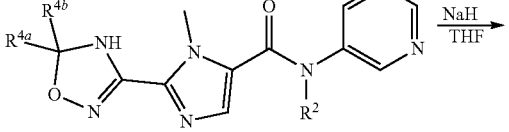 $\xrightarrow[\text{THF}]{\text{R}^{4c}-\text{Y} \atop \text{NaH}}$ (9)

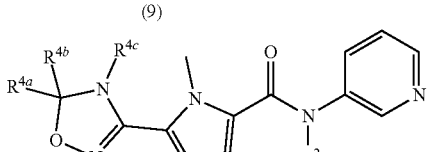

(10-1)

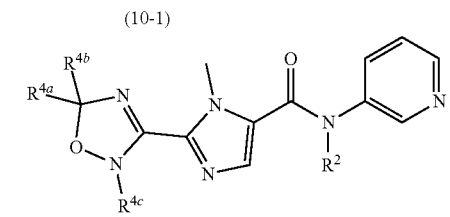

(10-2)

A compound (3) is obtained by the same method as described in Synthesis Method 1, and the compound (3) and paraformaldehyde are dissolved in methanol. The temperature is raised to 140° C. to allow a reaction for 3 days. After the reaction, the resulting product is cooled to room temperature, concentrated under reduced pressure, and purified by silica gel column chromatography, thereby obtaining a desired compound (4).

The compound (4) is dissolved in THF, MnO₂ is slowly added dropwise, followed by stirring at room temperature overnight. After the reaction, the resulting product is filtered, concentrated under reduced pressure and purified by silica gel column chromatography, thereby obtaining a desired compound (5).

The compound (5) and a carbohydrazine-based compound (D) are dissolved in ethanol, followed by performing a reaction at room temperature overnight. After the completion of the reaction is confirmed, the resulting product is concentrated under reduced pressure and purified by silica gel column chromatography, thereby obtaining a desired compound (6).

The compound (6), I₂, and K₂CO₃ are dissolved in 1,4-dioxane, followed by stirring at 80° C. overnight. After the reaction, a 5% NaS₂O₃ aqueous solution is added, and then extraction is performed with DCM. An organic layer is dried with anhydrous MgSO₄, filtered, concentrated under reduced pressure and purified by silica gel column chromatography, thereby obtaining a desired compound (7).

The compound (5) (30 mg, 0.1041 mmol) is dissolved in acetic acid (0.3 mL), the compound (8) (0.4683 mmol, 3.0 equiv.) is added, followed by stirring at room temperature for 5 days. After the reaction, a saturated NaHCO₃ aqueous solution is neutralized, followed by extraction with ethyl acetate (EtOAc) (5.0 mL×2). A combined organic layer is dried with anhydrous MgSO₄, filtered, concentrated under reduced pressure and purified by silica gel column chromatography, thereby obtaining a desired compound (9).

The compound (9) (0.1350 mmol) is dissolved in THF (0.5 mL), and stirred for 30 minutes after adding NaH (8 mg, 0.2025 mmol, 1.5 equiv.) under ice-bath cooling. R⁴ᶜ—Y (0.2025 mmol, 1.5 equiv.) is added, heated to room temperature, and stirred at room temperature for 24 hours. After the reaction, H₂O (5.0 mL) is added to terminate the reaction, and extraction is performed with ethyl acetate (5.0 mL×2). A combined organic layer is dried with anhydrous MgSO₄, filtered, concentrated under reduced pressure and purified by silica gel column chromatography, thereby obtaining a desired compound (10-1) and/or desired compound (10-2). To reiterate, in synthesis according to Synthesis Method 4, both of the compound (10-1) and the compound (10-2) may be obtained, and in some cases, any one of the compound (10-1) and compound (10-2) may be obtained.

In one specific example, the compound of Formula I may be represented by any one selected from the following Formula group:

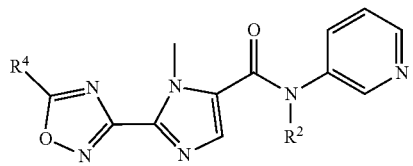

| Formula | R² | R⁴ |
|---|---|---|
| 1a-1-1-1 | Et | Me |
| 1a-1-1-2 | Et | CHF₂– |
| 1a-1-1-3 | Et | F₃C– |
| 1a-1-1-4 | Et | H |
| 1a-1-1-5 | Et | tert-butyl |
| 1a-1-1-6 | Et | isopropyl |
| 1a-1-1-7 | Et | n-propyl |
| 1a-1-1-8 | Et | isobutyl |
| 1a-1-1-9 | Et | n-butyl |
| 1a-1-1-10 | Et | sec-butyl |
| 1a-1-1-11 | Et | neopentyl |
| 1a-1-1-12 | Et | cyclopropyl |
| 1a-1-1-13 | Et | cyclopentyl |
| 1a-1-1-14 | Et | cyclohexyl |
| 1a-1-1-15 | Et | cyclohexylmethyl |
| 1a-1-1-16 | Et | cyclopropylmethyl |
| 1a-1-1-17 | Et | adamantyl |
| 1a-1-1-18 | Et | 3-oxocyclobutyl |
| 1a-1-1-19 | Et | cyclobutyl |
| 1a-1-1-20 | Et | Cl₃C– |
| 1a-1-1-21 | Et | phenyl |
| 1a-1-1-22 | Et | oxazolyl |

-continued

| Formula | R² | R⁴ |
|---|---|---|
| 1a-1-1-23 | Et | oxazol-5-yl |
| 1a-1-1-24 | Et | 2-fluorophenyl |
| 1a-1-1-25 | Et | tetrahydropyran-4-yl |
| 1a-1-1-26 | Et | piperidin-1-yl |
| 1a-1-1-27 | Et | pyrrolidin-1-yl |
| 1a-1-1-28 | Et | pyrimidin-5-yl |
| 1a-1-1-29 | Et | pyrimidin-5-yl |
| 1a-1-1-30 | Et | pyridin-3-yl |
| 1a-1-1-31 | Et | pyridin-4-yl |
| 1a-1-1-32 | Et | 1-(pyridin-3-yl)cyclopropyl |
| 1a-1-1-33 | Et | iPrNH- |
| 1a-1-1-34 | Et | cyclohexyl-NH- |
| 1a-1-1-35 | Et | EtNH- |

-continued

| Formula | R² | R⁴ |
|---|---|---|
| 1a-1-1-36 | Et | Me₂N- |
| 1a-1-1-37 | Et | morpholin-4-yl |
| 1a-1-1-38 | Et | N-isopropyl-acetamido |
| 1a-1-1-39 | Et | N-cyclohexyl-acetamido |
| 1a-1-1-40 | Et | 2-(ethylthio)pyridin-3-yl |
| 1a-1-1-41 | Et | N-isopropyl-pivalamido |
| 1a-1-1-42 | Et | N-isopropyl-ethoxycarbonylamino |
| 1a-1-1-43 | Et | 2-(ethylthio)phenyl |
| 1a-1-1-44 | Et | 2-(ethylsulfonyl)phenyl |

| Formula | R² | R⁴ |
|---|---|---|
| Ia-1-1-45 | Et | 4-(dimethylamino)phenyl |
| Ia-1-1-46 | Et | 2-ethoxyphenyl |
| Ia-1-1-47 | Et | 1-Boc-pyrrolidin-3-yl |
| Ia-1-1-48 | Et | pyrrolidin-3-yl |
| Ia-1-1-49 | Et | 1-Boc-piperidin-4-yl |
| Ia-1-1-50 | Et | piperidin-4-yl |
| Ia-1-1-51 | Et | 1-Boc-pyrrolidin-2-yl |
| Ia-1-1-52 | Et | pyrrolidin-2-yl |

In the Formula group, Me, Et and Boc respectively indicate a methyl group, an ethyl group, and a tert-butoxycarbonyl group.

The compounds of Formulas Ia-1-1-1 to Ia-1-1-52 will be named as follows:

TABLE 1

| Formula ID. | Name |
|---|---|
| Ia-1-1-1 | N-ethyl-1-methyl-2-(5-methyl-1,2,4-oxadiazol-3-yl)-N-(pyridin-3-yl)-1H-imidazole-5-carboxamide |
| Ia-1-1-2 | 2-(5-(difluoromethyl)-1,2,4-oxadiazol-3-yl)-N-ethyl-1-methyl-N-(pyridin-3-yl)-1H-imidazole-5-carboxamide |
| Ia-1-1-3 | N-ethyl-1-methyl-N-(pyridin-3-yl)-2-(5-(trifluoromethyl)-1,2,4-oxadiazol-3-yl)-1H-imidazole-5-carboxamide |
| Ia-1-1-4 | N-ethyl-1-methyl-2-(1,2,4-oxadiazol-3-yl)-N-(pyridin-3-yl)-1H-imidazole-5-carboxamide |
| Ia-1-1-5 | 2-(5-(tert-butyl)-1,2,4-oxadiazol-3-yl)-N-ethyl-1-methyl-N-(pyridin-3-yl)-1H-imidazole-5-carboxamide |
| Ia-1-1-6 | N-ethyl-2-(5-isopropyl-1,2,4-oxadiazol-3-yl)-1-methyl-N-(pyridin-3-yl)-1H-imidazole-5-carboxamide |
| Ia-1-1-7 | N-ethyl-1-methyl-2-(5-propyl-1,2,4-oxadiazol-3-yl)-N-(pyridin-3-yl)-1H-imidazole-5-carboxamide |
| Ia-1-1-8 | N-ethyl-2-(5-ethyl-1,2,4-oxadiazol-3-yl)-1-methyl-N-(pyridin-3-yl)-1H-imidazole-5-carboxamide |
| Ia-1-1-9 | 2-(5-butyl-1,2,4-oxadiazol-3-yl)-N-ethyl-1-methyl-N-(pyridin-3-yl)-1H-imidazole-5-carboxamide |
| Ia-1-1-10 | 2-(5-(sec-butyl)-1,2,4-oxadiazol-3-yl)-N-ethyl-1-methyl-N-(pyridin-3-yl)-1H-imidazole-5-carboxamide |
| Ia-1-1-11 | N-ethyl-1-methyl-2-(5-neopentyl-1,2,4-oxadiazol-3-yl)-N-(pyridin-3-yl)-1H-imidazole-5-carboxamide |
| Ia-1-1-12 | 2-(5-cyclopropyl-1,2,4-oxadiazol-3-yl)-N-ethyl-1-methyl-N-(pyridin-3-yl)-1H-imidazole-5-carboxamide |
| Ia-1-1-13 | 2-(5-cyclopentyl-1,2,4-oxadiazol-3-yl)-N-ethyl-1-methyl-N-(pyridin-3-yl)-1H-imidazole-5-carboxamide |
| Ia-1-1-14 | 2-(5-cyclohexyl-1,2,4-oxadiazol-3-yl)-N-ethyl-1-methyl-N-(pyridin-3-yl)-1H-imidazole-5-carboxamide |
| Ia-1-1-15 | 2-(5-(cyclohexylmethyl)-1,2,4-oxadiazol-3-yl)-N-ethyl-1-methyl-N-(pyridin-3-yl)-1H-imidazole-5-carboxamide |
| Ia-1-1-16 | 2-(5-(cyclopropylmethyl)-1,2,4-oxadiazol-3-yl)-N-ethyl-1-methyl-N-(pyridin-3-yl)-1H-imidazole-5-carboxamide |
| Ia-1-1-17 | 2-(5-((3r,5r,7r)-adamantan-1-yl)-1,2,4-oxadiazol-3-yl)-N-ethyl-1-methyl-N-(pyridin-3-yl)-1H-imidazole-5-carboxamide |
| Ia-1-1-18 | N-ethyl-1-methyl-2-(5-(3-oxocyclobutyl)-1,2,4-oxadiazol-3-yl)-N-(pyridin-3-yl)-1H-imidazole-5-carboxamide |
| Ia-1-1-19 | 2-(5-cyclobutyl-1,2,4-oxadiazol-3-yl)-N-ethyl-1-methyl-N-(pyridin-3-yl)-1H-imidazole-5-carboxamide |
| Ia-1-1-20 | N-ethyl-1-methyl-N-(pyridin-3-yl)-2-(5-(trichloromethyl)-1,2,4-oxadiazol-3-yl)-1H-imidazole-5-carboxamide |
| Ia-1-1-21 | N-ethyl-1-methyl-2-(5-phenyl-1,2,4-oxadiazol-3-yl)-N-(pyridin-3-yl)-1H-imidazole-5-carboxamide |

TABLE 1-continued

| Formula ID. | Name |
|---|---|
| Ia-1-1-22 | N-ethyl-1-methyl-2-(5-(oxazol-4-yl)-1,2,4-oxadiazol-3-yl)-N-(pyridin-3-yl)-1H-imidazole-5-carboxamide |
| Ia-1-1-23 | N-ethyl-1-methyl-2-(5-(oxazol-5-yl)-1,2,4-oxadiazol-3-yl)-N-(pyridin-3-yl)-1H-imidazole-5-carboxamide |
| Ia-1-1-24 | N-ethyl-1-methyl-2-(5-(2-fluorophenyl)-1,2,4-oxadiazol-3-yl)-N-(pyridin-3-yl)-1H-imidazole-5-carboxamide |
| Ia-1-1-25 | N-ethyl-1-methyl-N-(pyridin-3-yl)-2-(5-(tetrahydro-2H-pyran-4-yl)-1,2,4-oxadiazol-3-yl)-1H-imidazole-5-carboxamide |
| Ia-1-1-26 | N-ethyl-1-methyl-2-(5-(piperidin-1-yl)-1,2,4-oxadiazol-3-yl)-N-(pyridin-3-yl)-1H-imidazole-5-carboxamide |
| Ia-1-1-27 | N-ethyl-1-methyl-N-(pyridin-3-yl)-2-(5-(pyrrolidin-1-yl)-1,2,4-oxadiazol-3-yl)-1H-imidazole-5-carboxamide |
| Ia-1-1-28 | N-ethyl-1-methyl-N-(pyridin-3-yl)-2-(5-(pyrimidin-5-yl)-1,2,4-oxadiazol-3-yl)-1H-imidazole-5-carboxamide |
| Ia-1-1-29 | N-ethyl-1-methyl-2-(5-(pyridazin-4-yl)-1,2,4-oxadiazol-3-yl)-N-(pyridin-3-yl)-1H-imidazole-5-carboxamide |
| Ia-1-1-30 | N-ethyl-1-methyl-N-(pyridin-3-yl)-2-(5-(pyridin-3-yl)-1,2,4-oxadiazol-3-yl)-1H-imidazole-5-carboxamide |
| Ia-1-1-31 | N-ethyl-1-methyl-N-(pyridin-3-yl)-2-(5-(pyridin-4-yl)-1,2,4-oxadiazol-3-yl)-1H-imidazole-5-carboxamide |
| Ia-1-1-32 | N-ethyl-1-methyl-N-(pyridin-3-yl)-2-(5-(1-(pyridin-3-yl)cyclopropyl)-1,2,4-oxadiazol-3-yl)-1H-imidazole-5-carboxamide |
| Ia-1-1-33 | N-ethyl-2-(5-(isopropylamino)-1,2,4-oxadiazol-3-yl)-1-methyl-N-(pyridin-3-yl)-1H-imidazole-5-carboxamide |
| Ia-1-1-34 | 2-(5-(cyclohexylamino)-1,2,4-oxadiazol-3-yl)-N-ethyl-1-methyl-N-(pyridin-3-yl)-1H-imidazole-5-carboxamide |
| Ia-1-1-35 | N-ethyl-2-(5-(ethylamino)-1,2,4-oxadiazol-3-yl)-1-methyl-N-(pyridin-3-yl)-1H-imidazole-5-carboxamide |
| Ia-1-1-36 | 2-(5-(dimethylamino)-1,2,4-oxadiazol-3-yl)-N-ethyl-1-methyl-N-(pyridin-3-yl)-1H-imidazole-5-carboxamide |
| Ia-1-1-37 | N-ethyl-1-methyl-2-(5-morpholino-1,2,4-oxadiazol-3-yl)-N-(pyridin-3-yl)-1H-imidazole-5-carboxamide |
| Ia-1-1-38 | N-ethyl-2-(5-(N-isopropylacetamido)-1,2,4-oxadiazol-3-yl)-1-methyl-N-(pyridin-3-yl)-1H-imidazole-5-carboxamide |
| Ia-1-1-39 | 2-(5-(N-cyclohexylacetamido)-1,2,4-oxadiazol-3-yl)-N-ethyl-1-methyl-N-(pyridin-3-yl)-1H-imidazole-5-carboxamide |
| Ia-1-1-40 | N-ethyl-2-(5-(2-(ethylthio)pyridin-3-yl)-1,2,4-oxadiazol-3-yl)-1-methyl-N-(pyridin-3-yl)-1H-imidazole-5-carboxamide |
| Ia-1-1-41 | N-ethyl-2-(5-(N-isopropylpivalamido)-1,2,4-oxadiazol-3-yl)-1-methyl-N-(pyridin-3-yl)-1H-imidazole-5-carboxamide |
| Ia-1-1-42 | ethyl(3-(5-(ethyl(pyridin-3-yl)carbamoyl)-1-methyl-1H-imidazole-2-yl)-1,2,4-oxadiazol-5-yl)(isopropyl)carbamate |
| Ia-1-1-43 | N-ethyl-2-(5-(2-(ethylthio)phenyl)-1,2,4-oxadiazol-3-yl)-1-methyl-N-(pyridin-3-yl)-1H-imidazole-5-carboxamide |
| Ia-1-1-44 | N-ethyl-2-(5-(2-(ethylsulfonyl)phenyl)-1,2,4-oxadiazol-3-yl)-1-methyl-N-(pyridin-3-yl)-1H-imidazole-5-carboxamide |
| Ia-1-1-45 | 2-(5-(4-(dimethylamino)phenyl)-1,2,4-oxadiazol-3-yl)-N-ethyl-1-methyl-N-(pyridin-3-yl)-1H-imidazole-5-carboxamide |
| Ia-1-1-46 | 2-(5-(2-ethoxyphenyl)-1,2,4-oxadiazol-3-yl)-N-ethyl-1-methyl-N-(pyridin-3-yl)-1H-imidazole-5-carboxamide |
| Ia-1-1-47 | tert-butyl 3-(3-(5-(ethyl(pyridin-3-yl)carbamoyl)-1-methyl-1H-imidazole-2-yl)-1,2,4-oxadiazol-5-yl)pyrrolidin-1-carboxylate |
| Ia-1-1-48 | N-ethyl-1-methyl-N-(pyridin-3-yl)-2-(5-(pyrrolidin-3-yl)-1,2,4-oxadiazol-3-yl)-1H-imidazole-5-carboxamide |
| Ia-1-1-49 | tert-butyl 4-(3-(5-(ethyl(pyridin-3-yl)carbamoyl)-1-methyl-1H-imidazole-2-yl)-1,2,4-oxadiazol-5-yl)piperidin-1-carboxylate |
| Ia-1-1-50 | N-ethyl-1-methyl-2-(5-(piperidin-4-yl)-1,2,4-oxadiazol-3-yl)-N-(pyridin-3-yl)-1H-imidazole-5-carboxamide |
| Ia-1-1-51 | tert-butyl 2-(3-(5-(ethyl(pyridin-3-yl)carbamoyl)-1-methyl-1H-imidazole-2-yl)-1,2,4-oxadiazol-5-yl)pyrrolidin-1-carboxylate |
| Ia-1-1-52 | N-ethyl-1-methyl-N-(pyridin-3-yl)-2-(5-(pyrrolidin-2-yl)-1,2,4-oxadiazol-3-yl)-1H-imidazole-5-carboxamide |

In one specific example, the compound of Formula I may be represented by any one selected from the following Formula group:

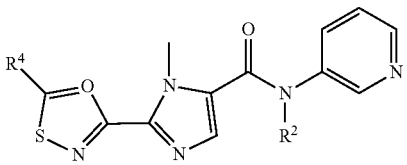

| Formula | $R^2$ | $R^4$ |
|---|---|---|
| Ia-1-2-1 | Et | (structure: HN-CH(CH3)-) |
| Ia-1-2-2 | Et | (structure: HN-CH2CH3) |
| Ia-1-2-3 | Et | (structure: HN-(2-bromophenyl)) |

In the Formula group, Et indicates an ethyl group.
The compounds of Formulas Ia-1-2-1 to Ia-1-2-3 may be named as follows:

TABLE 2

| Formula ID | Name |
|---|---|
| Ia-1-2-1 | N-ethyl-1-methyl-2-(5-(methylamino)-1,2,4-thiadiazol-3-yl)-N-(pyridin-3-yl)-1H-imidazole-5-carboxamide |
| Ia-1-2-2 | N-ethyl-2-(5-(ethylamino)-1,2,4-thiadiazol-3-yl)-1-methyl-N-(pyridin-3-yl)-1H-imidazole-5-carboxamide |
| Ia-1-2-3 | 2-(5-((2-bromophenyl)amino)-1,2,4-thiadiazol-3-yl)-N-ethyl-1-methyl-N-(pyridin-3-yl)-1H-imidazole-5-carboxamide |

In one specific example, the compound of Formula I may be represented by any one selected from the following Formula group:

| Formula | $R^2$ | $R^4$ |
|---|---|---|
| Ia-1-3-1 | Me | (cyclopropyl) |
| Ia-1-3-2 | Et | (cyclopropyl) |
| Ia-1-3-3 | Et | Me |

In the Formula group, Me and Et respectively indicate a methyl group and an ethyl group. The compounds of Formulas Ia-1-3-1 to Ia-1-3-3 may be named as follows:

TABLE 3

| Formula ID | Name |
|---|---|
| Ia-1-3-1 | 2-(5-cyclopropyl-1,3,4-oxadiazol-2-yl)-N,1-dimethyl-N-(pyridin-3-yl)-1H-imidazole-5-carboxamide |
| Ia-1-3-2 | 2-(5-cyclopropyl-1,3,4-oxadiazol-2-yl)-N-ethyl-1-methyl-N-(pyridin-3-yl)-1H-imidazole-5-carboxamide |
| Ia-1-3-3 | N-ethyl-1-methyl-2-(5-methyl-1,3,4-oxadiazol-2-yl)-N-(pyridin-3-yl)-1H-imidazole-5-carboxamide |

In one specific example, the compound of Formula I may be represented by any one selected from the following Formula group:

| Formula | $R^2$ | $R^{4a}$ | $R^{4b}$ | $R^{4c}$ |
|---|---|---|---|---|
| Ia-1-4-1 | Et | Me | Me | H |
| Ia-1-4-2 | Et | Me | Me | Me |
| Ia-1-4-3 | Et | Me | Me | (cyclopropylcarbonyl group) |
| Ia-1-4-4 | Et | Et | Et | H |
| Ia-1-4-5 | Et | Et | Et | Me |
| Ia-1-4-6 | Et | (cyclopentyl spiro) | | H |
| Ia-1-4-7 | Et | (cyclopentyl spiro) | | Me |
| Ia-1-4-8 | Et | (cyclohexyl spiro) | | H |

-continued

| Formula | R² | R⁴ᵃ | R⁴ᵇ | R⁴ᶜ |
|---|---|---|---|---|
| 1a-1-4-9 | Et | cyclohexyl | | Me |
| 1a-1-4-10 | Et | tetrahydropyran-4-yl | | H |
| 1a-1-4-11 | Et | tetrahydropyran-4-yl | | Me |
| 1a-1-4-12 | Et | tetrahydropyran-4-yl | | cyclopropyl-C(O)-C(CH₃)- |
| 1a-1-4-13 | Et | tetrahydropyran-4-yl | | PhCH₂CH(CH₃)- |
| 1a-1-4-14 | Et | N-methylpiperazin-4-yl | | H |
| 1a-1-4-15 | Et | N-methylpiperazin-4-yl (cis) | | Me |
| 1a-1-4-16 | Et | N-methylpiperazin-4-yl (trans) | | Me |
| 1a1-4-17 | Et | N-Boc-piperazin-4-yl | | H |
| 1a-1-4-18 | Et | N-Boc-piperazin-4-yl | | Me |

-continued

| Formula | R² | R⁴ᵃ | R⁴ᵇ | R⁴ᶜ |
|---|---|---|---|---|
| 1a-1-4-19 | Et | piperazin-4-yl (NH) | | H |
| 1a-1-4-20 | Et | piperazin-4-yl (NH) | | Me |
| 1a-1-4-21 | Et | thian-4-yl | | H |
| 1a-1-4-22 | Et | thian-4-yl | | Me |
| 1a-1-4-23 | Et | thian-4-yl | | cyclopropyl-C(O)-C(CH₃)- |
| 1a-1-4-24 | Et | 4-(trifluoromethyl)cyclohexyl | | H |
| 1a-1-4-25 | Et | 4-(trifluoromethyl)cyclohexyl | | Me |
| 1a-1-4-26 | Et | 4-(trifluoromethyl)cyclohexyl | | cyclopropyl-C(O)-C(CH₃)- |
| 1a-1-4-27 | Et | 4-oxocyclohexyl | | H |
| 1a-1-4-28 | Et | 4-oxocyclohexyl | | Me |
| 1a-1-4-29 | Et | 1,4-dioxaspiro[4.5]decan-8-yl | | H |

-continued

| Formula | R² | R⁴ᵃ | R⁴ᵇ | R⁴ᶜ |
|---|---|---|---|---|
| Ia-1-4-30 | Et | (4,4-difluorocyclohexyl, spiro-C) | | H |
| Ia-1-4-31 | Et | (4-tert-butylcyclohexyl, spiro-C) | | H |
| Ia-1-4-32 | Et | (4-tert-butylcyclohexyl, spiro-C) | | Me |
| Ia-1-4-33 | Et | (2-fluorophenyl) | H | H |
| Ia-1-4-34 | Et | (2-fluoropyridin-3-yl) | H | H |
| Ia-1-4-35 | Et | (2-fluoropyridin-3-yl) | H | Me |
| Ia-1-4-36 | Et | (2-fluoropyridin-4-yl) | H | H |

-continued

| Formula | R² | R⁴ᵃ | R⁴ᵇ | R⁴ᶜ |
|---|---|---|---|---|
| Ia-1-4-37 | Et | (phenyl) | H | H |
| Ia-1-4-38 | Et | (pyridin-3-yl) | H | H |
| Ia-1-4-39 | Et | (pyridin-4-yl) | H | H |
| Ia-1-4-40 | Et | (2-ethoxypyridin-3-yl) | H | H |
| Ia-1-4-41 | Et | (cyclopropyl) | H | H |
| Ia-1-4-42 | Et | (2-ethylthiopyridin-3-yl) | H | H |
| Ia-1-4-43 | Et | Me | H | H |
| Ia-1-4-44 | Et | Et | H | H |

In the Formula group, Me, Et and Boc respectively indicate a methyl group, an ethyl group and a tert-butoxycarbonyl group, and C shown as a ring member is carbon shared with ring A in the formation of a spiro ring by fusing R⁴ᵃ and R⁴ᵇ.

The compounds of Formulas Ia-1-4-1 to Ia-1-4-44 may be named as follows:

TABLE 4

| Formula ID | Name |
|---|---|
| Ia-1-4-1 | 2-(5,5-dimethyl-4,5-dihydro-1,2,4-oxadiazol-3-yl)-N-ethyl-1-methyl-N-(pyridin-3-yl)-1H-imidazole-5-carboxamide |
| Ia-1-4-2 | N-ethyl-1-methyl-N-(pyridin-3-yl)-2-(4,5,5-trimethyl-4,5-dihydro-1,2,4-oxadiazol-3-yl)-1H-imidazole-5-carboxamide |
| Ia-1-4-3 | 2-(4-(cyclopropanecarbonyl)-5,5-dimethyl-4,5-dihydro-1,2,4-oxadiazol-3-yl)-N-ethyl-1-methyl-N-(pyridin-3-yl)-1H-imidazole-5-carboxamide |
| Ia-1-4-4 | 2-(5,5-diethyl-4,5-dihydro-1,2,4-oxadiazol-3-yl)-N-ethyl-1-methyl-N-(pyridin-3-yl)-1H-imidazole-5-carboxamide |
| Ia-1-4-5 | 2-(5,5-diethyl-4-methyl-4,5-dihydro-1,2,4-oxadiazol-3-yl)-N-ethyl-1-methyl-N-(pyridin-3-yl)-1H-imidazole-5-carboxamide |
| Ia-1-4-6 | N-ethyl-1-methyl-N-(pyridin-3-yl)-2-(1-oxa-2,4-diazaspiro[4.4]non-2-en-3-yl)-1H-imidazole-5-carboxamide |

TABLE 4-continued

| Formula ID | Name |
| --- | --- |
| Ia-1-4-7 | N-ethyl-1-methyl-2-(4-methyl-1-oxa-2,4-diazaspiro[4.4]non-2-en-3-yl)-N-(pyridin-3-yl)-1H-imidazole-5-carboxamide |
| Ia-1-4-8 | N-ethyl-1-methyl-N-(pyridin-3-yl)-2-(1-oxa-2,4-diazaspiro[4.5]dec-2-en-3-yl)-1H-imidazole-5-carboxamide |
| Ia-1-4-9 | N-ethyl-1-methyl-2-(4-methyl-1-oxa-2,4-diazaspiro[4.5]dec-2-en-3-yl)-N-(pyridin-3-yl)-1H-imidazole-5-carboxamide |
| Ia-1-4-10 | N-ethyl-1-methyl-N-(pyridin-3-yl)-2-(1,8-dioxa-2,4-diazaspiro[4.5]dec-2-en-3-yl)-1H-imidazole-5-carboxamide |
| Ia-1-4-11 | N-ethyl-1-methyl-2-(4-methyl-1,8-dioxa-2,4-diazaspiro[4.5]dec-2-en-3-yl)-N-(pyridin-3-yl)-1H-imidazole-5-carboxamide |
| Ia-1-4-12 | 2-(4-(cyclopropanecarbonyl)-1,8-dioxa-2,4-diazaspiro[4.5]dec-2-en-3-yl)-N-ethyl-1-methyl-N-(pyridin-3-yl)-1H-imidazole-5-carboxamide |
| Ia-1-4-13 | 2-(4-benzyl-1,8-dioxa-2,4-diazaspiro[4.5]dec-2-en-3-yl)-N-ethyl-1-methyl-N-(pyridin-3-yl)-1H-imidazole-5-carboxamide |
| Ia-1-4-14 | N-ethyl-1-methyl-2-(8-methyl-1-oxa-2,4,8-triazaspiro[4.5]dec-2-en-3-yl)-N-(pyridin-3-yl)-1H-imidazole-5-carboxamide |
| Ia-1-4-15 | 2-(4,8-dimethyl-1-oxa-2,4,8-triazaspiro[4.5]dec-2-en-3-yl)-N-ethyl-1-methyl-N-(pyridin-3-yl)-1H-imidazole-5-carboxamide |
| Ia-1-4-16 | 2-(4,8-dimethyl-1-oxa-2,4,8-triazaspiro[4.5]dec-2-en-3-yl)-N-ethyl-1-methyl-N-(pyridin-3-yl)-1H-imidazole-5-carboxamide |
| Ia-1-4-17 | tert-butyl 3-(5-(ethyl(pyridin-3-yl)carbamoyl)-1-methyl-1H-imidazole-2-yl)-1-oxa-2,4,8-triazaspiro[4.5]dec-2-en-8-carboxylate |
| Ia-1-4-18 | tert-butyl 3-(5-(ethyl(pyridin-3-yl)carbamoyl)-1-methyl-1H-imidazole-2-yl)-4-methyl-1-oxa-2,4,8-triazaspiro[4.5]dec-2-en-8-carboxylate |
| Ia-1-4-19 | N-ethyl-1-methyl-N-(pyridin-3-yl)-2-(1-oxa-2,4,8-triazaspiro[4.5]dec-2-en-3-yl)-1H-imidazole-5-carboxamide |
| Ia-1-4-20 | N-ethyl-1-methyl-2-(4-methyl-1-oxa-2,4,8-triazaspiro[4.5]dec-2-en-3-yl)-N-(pyridin-3-yl)-1H-imidazole-5-carboxamide |
| Ia-1-4-21 | N-ethyl-1-methyl-N-(pyridin-3-yl)-2-(1-oxa-8-thia-2,4-diazaspiro[4.5]dec-2-en-3-yl)-1H-imidazole-5-carboxamide |
| Ia-1-4-22 | N-ethyl-1-methyl-2-(4-methyl-1-oxa-8-thia-2,4-diazaspiro[4.5]dec-2-en-3-yl)-N-(pyridin-3-yl)-1H-imidazole-5-carboxamide |
| Ia-1-4-23 | 2-(4-(cyclopropanecarbonyl)-1-oxa-8-thia-2,4-diazaspiro[4.5]dec-2-en-3-yl)-N-ethyl-1-methyl-N-(pyridin-3-yl)-1H-imidazole-5-carboxamide |
| Ia-1-4-24 | N-ethyl-1-methyl-N-(pyridin-3-yl)-2-(8-(trifluoromethyl)-1-oxa-2,4-diazaspiro[4.5]dec-2-en-3-yl)-1H-imidazole-5-carboxamide |
| Ia-1-4-25 | N-ethyl-1-methyl-2-(4-methyl-8-(trifluoromethyl)-1-oxa-2,4-diazaspiro[4.5]dec-2-en-3-yl)-N-(pyridin-3-yl)-1H-imidazole-5-carboxamide |
| Ia-1-4-26 | 2-(4-(cyclopropanecarbonyl)-8-(trifluoromethyl)-1-oxa-2,4-diazaspiro[4.5]dec-2-en-3-yl)-N-ethyl-1-methyl-N-(pyridin-3-yl)-1H-imidazole-5-carboxamide |
| Ia-1-4-27 | N-ethyl-1-methyl-2-(8-oxa-1-oxa-2,4-diazaspiro[4.5]dec-2-en-3-yl)-N-(pyridin-3-yl)-1H-imidazole-5-carboxamide |
| Ia-1-4-28 | N-ethyl-1-methyl-2-(4-methyl-8-oxo-1-oxa-2,4-diazaspiro[4.5]dec-2-en-3-yl)-N-(pyridin-3-yl)-1H-imidazole-5-carboxamide |
| Ia-1-4-29 | 2-(1,9,12-trioxa-2,4-diazadispiro[4.2.4⁸.2⁵]tetradec-2-en-3-yl)-N-ethyl-1-methyl-N-(pyridin-3-yl)-1H-imidazole-5-carboxamide |
| Ia-1-4-30 | 2-(8,8-difluoro-1-oxa-2,4-diazaspiro[4.5]dec-2-en-3-yl)-N-ethyl-1-methyl-N-(pyridin-3-yl)-1H-imidazole-5-carboxamide |
| Ia-1-4-31 | 2-(8-(tert-butyl)-1-oxa-2,4-diazaspiro[4.5]dec-2-en-3-yl)-N-ethyl-1-methyl-N-(pyridin-3-yl)-1H-imidazole-5-carboxamide |
| Ia-1-4-32 | 2-(8-(tert-butyl)-4-methyl-1-oxa-2,4-diazaspiro[4.5]dec-2-en-3-yl)-N-ethyl-1-methyl-N-(pyridin-3-yl)-1H-imidazole-5-carboxamide |
| Ia-1-4-33 | N-ethyl-2-(5-(2-fluorophenyl)-4,5-dihydro-1,2,4-oxadiazol-3-yl)-1-methyl-N-(pyridin-3-yl)-1H-imidazole-5-carboxamide |
| Ia-1-4-34 | N-ethyl-2-(5-(2-fluoropyridin-3-yl)-4,5-dihydro-1,2,4-oxadiazol-3-yl)-1-methyl-N-(pyridin-3-yl)-1H-imidazole-5-carboxamide |
| Ia-1-4-35 | N-ethyl-2-(5-(2-fluoropyridin-3-yl)-4-methyl-4,5-dihydro-1,2,4-oxadiazol-3-yl)-1-methyl-N-(pyridin-3-yl)-1H-imidazole-5-carboxamide |
| Ia-1-4-36 | N-ethyl-2-(5-(3-fluoropyridin-4-yl)-4,5-dihydro-1,2,4-oxadiazol-3-yl)-1-methyl-N-(pyridin-3-yl)-1H-imidazole-5-carboxamide |
| Ia-1-4-37 | N-ethyl-1-methyl-2-(5-phenyl-4,5-dihydro-1,2,4-oxadiazol-3-yl)-N-(pyridin-3-yl)-1H-imidazole-5-carboxamide |
| Ia-1-4-38 | N-ethyl-1-methyl-N-(pyridin-3-yl)-2-(5-(pyridin-3-yl)-4,5-dihydro-1,2,4-oxadiazol-3-yl)-1H-imidazole-5-carboxamide |
| Ia-1-4-39 | N-ethyl-1-methyl-N-(pyridin-3-yl)-2-(5-(pyridin-4-yl)-4,5-dihydro-1,2,4-oxadiazol-3-yl)-1H-imidazole-5-carboxamide |
| Ia-1-4-40 | 2-(5-(2-ethoxypyridin-3-yl)-4,5-dihydro-1,2,4-oxadiazol-3-yl)-N-ethyl-1-methyl-N-(pyridin-3-yl)-1H-imidazole-5-carboxamide |
| Ia-1-4-41 | 2-(5-cyclopropyl-4,5-dihydro-1,2,4-oxadiazol-3-yl)-N-ethyl-1-methyl-N-(pyridin-3-yl)-1H-imidazole-5-carboxamide |
| Ia-1-4-42 | N-ethyl-2-(5-(2-(ethylthio)pyridin-3-yl)-4,5-dihydro-1,2,4-oxadiazol-3-yl)-1-methyl-N-(pyridin-3-yl)-1H-imidazole-5-carboxamide |
| Ia-1-4-43 | N-ethyl-1-methyl-2-(5-methyl-4,5-dihydro-1,2,4-oxadiazol-3-yl)-N-(pyridin-3-yl)-1H-imidazole-5-carboxamide |
| Ia-1-4-44 | N-ethyl-2-(5-ethyl-4,5-dihydro-1,2,4-oxadiazol-3-yl)-1-methyl-N-(pyridin-3-yl)-1H-imidazole-5-carboxamide |

In one specific example, the compound of Formula I may be represented by any one selected from the following Formula group:

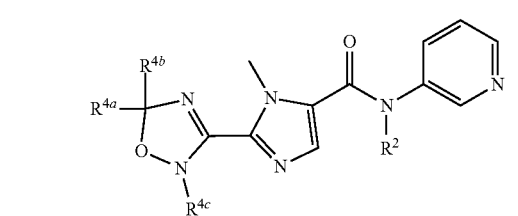

| Formula | R² | R⁴ᵃ | R⁴ᵇ | R⁴ᶜ |
|---|---|---|---|---|
| Ia-1-5-1 | Et | Me | Me | Me |
| Ia-1-5-2 | Et |  | | Me |
| Ia-1-5-3 | Et | 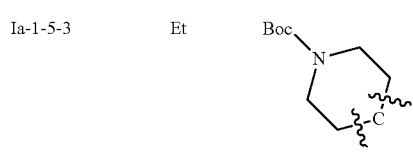 | | Me |
| Ia-1-5-4 | Et |  | | Me |
| Ia-1-5-5 | Et |  | | Me |
| Ia-1-5-6 | Et | 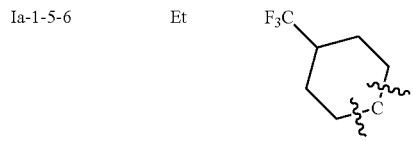 | | Me |
| Ia-1-5-7 | Et | | | Me |
| Ia-1-5-8 | Et | | H | Me |
| Ia-1-5-9 | Et | | H | Me |
| Ia-1-5-10 | Et | | H | Me |
| Ia-1-5-11 | Et | | | Me |

In the Formula group, Me, Et and Boc respectively indicate a methyl group, an ethyl group and a tert-butoxycarbonyl group, and C shown as a ring member is carbon shared with ring A in the formation of a spiro ring by fusing $R^{4a}$ and $R^{4b}$.

The compounds of Formulas Ia-1-5-1 to Ia-1-5-11 may be named as follows:

TABLE 5

| Formula ID | Name |
|---|---|
| Ia-1-5-1 | N-ethyl-1-methyl-N-(pyridin-3-yl)-2-(2,5,5-trimethyl-2,5-dihydro-1,2,4-oxadiazol-3-yl)-1H-imidazole-5-carboxamide |
| Ia-1-5-2 | N-ethyl-1-methyl-2-(2-methyl-1,8-dioxa-2,4-diazaspiro[4.5]dec-3-en-3-yl)-N-(pyridin-3-yl)-1H-imidazole-5-carboxamide |
| Ia-1-5-3 | tert-butyl 3-(5-(ethyl(pyridin-3-yl)carbamoyl)-1-methyl-1H-imidazol-2-yl)-2-methyl-1-oxa-2,4,8-triazaspiro[4.5]dec-3-en-8-carboxylate |
| Ia-1-5-4 | N-ethyl-1-methyl-2-(2-methyl-1-oxa-2,4,8-triazaspiro[4.5]dec-3-en-3-yl)-N-(pyridin-3-yl)-1H-imidazole-5-carboxamide |
| Ia-1-5-5 | N-ethyl-1-methyl-2-(2-methyl-1-oxa-8-thia-2,4-diazaspiro[4.5]dec-3-en-3-yl)-N-(pyridin-3-yl)-1H-imidazole-5-carboxamide |
| Ia-1-5-6 | N-ethyl-1-methyl-2-(2-methyl-8-(trifluoromethyl)-1-oxa-2,4-diazaspiro[4.5]dec-3-en-3-yl)-N-(pyridin-3-yl)-1H-imidazole-5-carboxamide |
| Ia-1-5-7 | 2-(8-(tert-butyl)-2-methyl-1-oxa-2,4-diazaspiro[4.5]dec-3-en-3-yl)-N-ethyl-1-methyl-N-(pyridin-3-yl)-1H-imidazole-5-carboxamide |
| Ia-1-5-8 | N-ethyl-2-(5-(2-fluorophenyl)-2-methyl-2,5-dihydro-1,2,4-oxadiazol-3-yl)-1-methyl-N-(pyridin-3-yl)-1H-imidazole-5-carboxamide |

TABLE 5-continued

| Formula ID | Name |
|---|---|
| Ia-1-5-9 | N-ethyl-2-(5-(2-fluoropyridin-3-yl)-2-methyl-2,5-dihydro-1,2,4-oxadiazol-3-yl)-1-methyl-N-(pyridin-3-yl)-1H-imidazole-5-carboxamide |
| Ia-1-5-10 | N-ethyl-2-(5-(3-fluoropyridin-4-yl)-2-methyl-2,5-dihydro-1,2,4-oxadiazol-3-yl)-1-methyl-N-(pyridin-3-yl)-1H-imidazole-5-carboxamide |
| Ia-1-5-11 | N-ethyl-1-methyl-2-(2-methyl-1-oxa-2,4-diazaspiro[4.4]non-3-en-3-yl)-N-(pyridin-3-yl)-1H-imidazole-5-carboxamide |

Control Composition

A control composition according to the present invention may include at least one of the compounds according to the present invention, an acceptable salt thereof, an enantiomer thereof, a diastereomer thereof, a solvate thereof, a geometric isomer thereof and a tautomer thereof as an active ingredient.

The control composition of the present invention may be expected to have a significant control effect on pests causing damage to lowland crops, field crops, fruit trees, vegetables, other crops, ornamental flowering plants and the like by application to seedling facilities, paddy fields, fields, fruit trees, vegetables, other crops, ornamental flowering plants and the like, their seeds, and cultivation media such as paddy water, foliage or soil before or at the time of confirmation of pest infestation according to the expected time of pest infestation.

Examples of useful plants to which the control composition of the present invention can be applied may be, but are not particularly limited to, for example, cereals (rice, barley, wheat, rye, oats, corn, etc.), legumes (soybeans, red beans, broad beans, green peas, kidney beans, peanuts, etc.), fruit trees and fruits (apples, citrus fruits, pears, grapes, peaches, plums, cherries, walnuts, chestnuts, almonds, bananas, etc.), leaf and fruit vegetables (cabbages, tomatoes, spinach, broccoli, lettuce, onions, green onions (chives and Welsh onions), green peppers, eggplants, strawberries, pepper crops, okra, Chinese chives, etc.), root vegetables (carrots, potatoes, sweet potatoes, taro, Japanese radishes, turnips, lotus roots, burdock roots, garlic, Chinese scallions, etc.), crops for processing (cotton, hemp, beet, hops, sugarcane, sugar beet, olives, rubber, coffee, tobacco, tea, etc.), gourds (Japanese pumpkins, cucumbers, watermelons, oriental sweet melons, melons, etc.), pasture grass (orchard grass, sorghum, timothy, clover, alfalfa, etc.), lawn grass (Korean lawn grass, bentgrass, etc.), spice and aromatic crops (lavender, rosemary, thyme, parsley, pepper, ginger, etc.), ornamental flowering plants (Chrysanthemum, rose, carnation, orchid, tulip, lily, etc.), garden trees (ginkgo trees, cherry trees, Japanese Aucuba, etc.) and forest trees (*Abies sachalinensis*, *Picea jezoensis*, pine, yellow cedar, Japanese cedar, hinoki cypress, Eucalyptus, etc.).

The "plants" also include plants provided with resistance, by a classical breeding technique or a gene recombination technique, to HPPD inhibitors such as isoxaflutole, ALS inhibitors such as imazethaphyl, thifensulfouron-methyl, EPSP synthase inhibitors such as glyphosate, glutamine synthase inhibitors such as glufosinate, acetyl-CoA carboxylase inhibitors such as sethoxydim, or other herbicides such as bromoxynil, dicamba and 2-4-D.

To control various types of pests, the control composition of the present invention is applied to plants predicted to be infested with the pests or nematodes at an effective amount for the control of the pests or nematodes, with or without appropriate dilution or suspension in water or the like. For example, the control composition of the present invention may be applied to pests and nematodes infesting fruit trees, cereals and vegetables by foliar spraying (foliage treatment), seed treatment such as dipping in a drug, dust coating or calper treatment, or absorption from the root through soil treatment such as whole soil incorporation, planting row treatment, bed soil incorporation, plug seedling treatment, planting hole treatment, plant foot treatment, top-dressing, treatment of nursery boxes or submerged application. In addition, application to culture media in hydroponics, smoking treatment or trunk injection may also be performed.

The control composition of the present invention may be used by being prepared in a formulation convenient for use according to a conventional method for preparation. That is, at least one of the compounds according to the present invention, an acceptable salt thereof, an enantiomer thereof, a diastereomer thereof, a solvate thereof, a geometric isomer thereof and a tautomer thereof is mixed with a suitable inert carrier, or if necessary, along with excipients, in an appropriate ratio, and then subjected to dissolution, separation, suspension, mixing, impregnation, adsorption or adhesion to be formulated in a suitable form, for example, a suspension concentrate, an emulsifiable concentrate, a soluble concentrate, a wettable powder, a granular wettable powder, granules, powder, a tablet or a pack. Disinfestation using the control composition of the present invention may be performed by a method, for example, pouring, spraying, atomizing, dispersion or broadcasting.

The control composition of the present invention may contain additive ingredients commonly used in preparations or animal parasitic biocontrol agent, if needed, in addition to the compound according to the present invention, an acceptable salt thereof, an enantiomer thereof, a diastereomer thereof, a solvate thereof, a geometric isomer thereof and a tautomer thereof as an active ingredient. Examples of additive ingredients may include carriers such as a solid carrier, a liquid carrier, etc., surfactants, pigment dispersants, wetting agents, binders, tackifiers, thickening agents, coloring agents, photoelectric agents, spreaders, anti-freezing agents, anti-caking agents, disintegrants and anti-decomposition agents. In addition, if needed, preservatives or plant fragments may be used as additive ingredients. These additive ingredients may be used alone or in combination with two or more thereof.

Examples of the solid carriers include natural minerals, such as quartz, clay, kaolinite, pyrophyllite, sericite, talc, bentonite, acid clay, attapulgite, zeolite and diatomite; inorganic salts, such as calcium carbonate, ammonium sulfate, sodium sulfate and potassium chloride; organic solid carriers, such as synthetic silicic acid, synthetic silicates, starch, cellulose and plant powders (for example, sawdust, coconut husks, corn cobs, tobacco stalks, etc.); plastic carriers, such as polyethylene, polypropylene and polyvinylidene chloride; urea; hollow inorganic materials; hollow plastic materials; and fumed silica (white carbon). These may be used alone or in combination with two or more thereof.

Examples of the liquid carriers include monohydric alcohols such as methanol, ethanol, propanol, isopropanol and butanol; polyhydric alcohols such as ethylene glycol, diethylene glycol, propylene glycol, hexylene glycol, polyethylene glycol, polypropylene glycol and glycerin; polyol compounds such as propylene glycol ether; ketones such as acetone, methyl ethyl ketone, methyl isobutyl ketone, diisobutyl ketone and cyclohexanone; ethers such as ethyl ether, dioxane, ethylene glycol monoethyl ether, dipropyl ether and tetrahydrofuran; aliphatic hydrocarbons such as normal paraffin, naphthene, isoparaffin, kerosene and mineral oil; aromatic hydrocarbons such as benzene, toluene, xylene, solvent naphtha and alkyl naphthalene; halogenated hydrocarbons such as dichloromethane, chloroform and carbon tetrachloride; esters such as ethyl acetate, diisopropyl phthalate, dibutyl phthalate, dioctyl phthalate and dimethyl adipate; lactones such as gamma-butyrolactone; amides such as dimethylformamide, diethylformamide, dimethylacetamide and N-alkyl pyrrolidinone; nitriles such as acetonitrile; sulfur-containing compounds such as dimethyl sulfoxide; vegetable oils such as soybean oil, rapeseed oil, cotton seed oil and castor oil; and water. These may be used alone or in combination with two or more thereof.

Examples of the surfactants used as a dispersant or wetting agent include non-ionic surfactants such as sorbitan fatty acid ester, polyoxyethylene sorbitan fatty acid ester, sucrose fatty acid ester, polyoxyethylene fatty acid ester, polyoxyethylene resin acid ester, polyoxyethylene fatty acid diester, polyoxyethylenealkylether, polyoxyethylenealkylarylether, polyoxyethylenealkylphenylether, polyoxyethylene dialkylphenylether, polyoxyethylenealkylphenylether-formaldehyde condensates, polyoxyethylene-polyoxypropylene block copolymers, polystyrene polyoxyethylene block polymers, alkyl polyoxyethylene-polypropylene block copolymer ether, polyoxyethylene alkylamine, polyoxyethylene fatty acid amide, polyoxyethylene fatty acid bisphenylether, polyalkylenebenzylphenylether, polyoxyalkylenestyrylphenylether, acetylenediol, polyoxy alkylene-added acetylene diol, polyoxyethylene ether-type silicone, ether-type silicone, fluorosurfactants, polyoxyethylene castor oil and polyoxyethylene hydrogenated castor oil; anionic surfactants such as alkyl sulfates, polyoxyethylenealkylether sulfates, polyoxyethylenealkylphenylether sulfates, polyoxyethylenestyrylphenylether sulfates, alkylbenzene sulfonates, alkylaryl sulfonates, lignosulfonates, alkyl sulfosuccinates, naphthalene sulfonates, alkylnaphthalene sulfonates, salts of naphthalenesulfonic acid-formaldehyde condensate, salts of alkylnaphthalenesulconic acid-formaldehyde condensate, fatty acid salts, polycarboxylic acid salts, polyacrylates, N-methyl-fatty acid sarcosinates, resinates, polyoxyethylenealkyletyher phosphates and polyoxyethylene alkylphenylether phosphates; cationic surfactants including alkyl amine salts such as lauryl amine hydrochloride, stearyl amine hydrochloride, oleyl amine hydrochloride, stearyl amine acetate, stearyl aminopropyl amine acetate, alkyl trimethyl ammonium chloride and alkyldimethyl benzalkonium chloride; and amphoteric surfactants such as amino acid-type and betaine-type surfactants. These surfactants may be used alone or in combination with two or more thereof.

Examples of the binders or tackifiers include carboxymethyl cellulose or salts thereof, dextrin, soluble starch, xanthan gum, guar gum, sucrose, polyvinylpyrrolidone, gum arabic, polyvinyl alcohol, polyvinyl acetate, sodium polyacrylate, polyethylene glycol having an average molecular weight of 6,000 to 20,000, polyethylene oxide having an average molecular weight of 100,000 to 5,000,000, phospholipids (e.g., cephalin, lecithin, etc.), cellulose powder, dextrin, modified starch, polyaminocarboxylic acid chelating compounds, cross-linked polyvinyl pyrrolidone, maleic acid-styrene copolymers, (meth)acrylic acid copolymers, half esters of polyhydric alcohol polymers and dicarboxylic anhydrides, water-soluble salts of polystyrenesulfonates, paraffin, terpene, polyamide resins, polyacrylates, polyoxyethylene, wax, polyvinyl alkylether, alkylphenol-formaldehyde condensates and synthetic resin emulsions.

Examples of the thickening agents include water-soluble polymers such as xanthan gum, guar gum, diutan gum, carboxymethyl cellulose, polyvinyl pyrrolidone, carboxyvinyl polymers, acrylic polymers, starch compounds and polysaccharides; and inorganic fine powders such as high-grade bentonite, fumed silica (white carbon).

Examples of the coloring agents include inorganic pigments such as iron oxide, titanium oxide and Prussian blue; and organic pigments such as alizarin dyes, azo dyes and metal phthalocyanine dyes.

Examples of anti-freezing agents include polyhydric alcohols such as ethylene glycol, diethylene glycol, propylene glycol and glycerin.

Examples of the excipients for preventing caking or facilitating disintegration include polysaccharides such as starch, alginic acid, mannose and galactose; polyvinyl pyrrolidone, fumed silica (white carbon), ester gum, petroleum resin, sodium tripolyphosphate, sodium hexametaphosphate, metal stearates, cellulose powder, dextrin, methacrylate copolymers, polyvinyl pyrrolidone, polyaminocarboxylic acid chelating compounds, sulfonated styrene-isobutylene-maleic anhydride copolymers, and starch-polyacrylonitrile graft copolymers.

Examples of the decomposition inhibitors include desiccants such as zeolite, quicklime and magnesium oxide; antioxidants such as phenolic compounds, amine compounds, sulfur compounds and phosphoric acid compounds; and UV absorbers such as salicylic acid compounds and benzophenone compounds.

Examples of the preservatives include potassium sorbate and 1,2-benzothiazolin-3-one.

In addition, other excipients including functional spreading agents, activity enhancers such as metabolic decomposition inhibitors (piperonyl butoxide, etc.), anti-freezing agents such as propylene glycol, antioxidants such as BHT, and UV absorbers may also be used if needed.

The mixing ratio of an active ingredient compound may be adjusted as needed, and may be suitably selected in the range of $10^{-6}$ to 90 parts by weight relative to 100 parts by weight of the control compound of the present invention, and for example, in the formation as a powder, a granule, an emulsifiable concentrate or wettable powder, 0.01 to 50 parts by weight (0.01 to 50 wt % with respect to the total weight of the control composition) of the active ingredient compound may be used.

The application amount of the control composition of the present invention may vary according to various factors, for example, purposes, target pests, the cultivation conditions of crops, the tendency of pest infestation, weather, environmental conditions, a dosage form, an application method, an application place, an application timing, etc., but the application amount of the active ingredient compound is appropriately selected from the range of 0.00001 g to 10 kg, and preferably, 0.0001 g to 1 kg per 10 are depending on the purpose.

For the expansion of target pests and appropriate time of pest control or dose reduction, the control composition of the present invention may be used after being mixed with other control compositions, acaricides, nematicides, microbicides, agricultural biopesticides or the like, and further, the control composition of the present invention can be used after mixed with herbicides, plant growth regulators, fertilizers or the like depending on the situation.

Examples of other control compositions, acaricides and/or nematicides that can be mixed with the control composition of the present invention may be as follows:

3,5-xylyl methylcarbamate (XMC), crystalline protein toxins produced by *Bacillus thuringiensis aizawai, Bacillus thuringiensis israelensis, Bacillus thuringiensis japonensis, Bacillus thuringiensis kurstaki, Bacillus thuringiensis tenebrionis* and *Bacillus thuringiensis*; BPMC, Bt toxin-derived insecticidal compounds, CPCBS (chlorfenson), DCIP (dichlorodiisopropyl ether), D-D (1,3-Dichloropropene), DDT, NAC, O-4-dimethylsulfamoylphenyl O,O-diethyl phosphorothioate (DSP), O-ethyl O-4-nitrophenyl phenylphosphonothioate (EPN), tripropylisocyanurate (TPIC), acrinathrin, azadirachtin, azinphos-methyl, acequinocyl, acetamiprid, acetoprole, acephate, abamectin, avermectin-B, amidoflumet, amitraz, alanycarb, aldicarb, aldoxycarb, aldrin, alpha-endosulfan, alpha-cypermethrin, albendazole, allethrin, isazofos, isamidofos, isoamidofos, isoxathion, isofenphos, isoprocarb (MIPC), ivermectin, imicyafos, imidacloprid, imiprothrin, indoxacarb, esfenvalerate, ethiofencarb, ethion, ethiprole, etoxazole, ethofenprox, ethoprophos, etrimfos, emamectin, emamectin-benzoate, endosulfan, empenthrin, oxamyl, oxydemeton-methyl, oxydeprofos (ESP), oxibendazole, oxfendazole, potassium oleate, sodium oleate, cadusafos, cartap, carbaryl, carbosulfan, carbofuran, gamma-cyhalothrin, xylylcarb, quinalphos, kinoprene, chinomethionat, cloethocarb, clothianidin, clofentezine, chromafenozide, chlorantraniliprole, chlorethoxyfos, chlordimeform, chlordane, chlorpyrifos, chlorpyrifos-methyl, chlorphenapyr, chlorfenson, chlorfenvinphos, chlorfluazuron, chlorobenzilate, chlorobenzoate, kelthane (dicofol), salithion, cyanophos (CYAP), diafenthiuron, diamidafos, cyantraniliprole, theta-cypermethrin, dienochlor, cyenopyrafen, dioxabenzofos, diofenolan, sigma-cypermethrin, dichlofenthion (ECP), cycloprothrin, dichlorvos (DDVP), disulfoton, dinotefuran, cyhalothrin, cyphenothrin, cyfluthrin, diflubenzuron, cyflumetofen, diflovidazin, cyhexatin, cypermethrin, dimethylvinphos, dimethoate, dimefluthrin, silafluofen, cyromazine, spinetoram, spinosad, spirodiclofen, spirotetramat, spiromesifen, sulfluramid, sulprofos, sulfoxaflor, zeta-cypermethrin, diazinon, tau-fluvalinate, dazomet, thiacloprid, thiamethoxam, thiodicarb, thiocyclam, thiosultap, thiosultap-sodium, thionazin, thiometon, deet, dieldrin, tetrachlorvinphos, tetradifon, tetramethylfluthrin, tetramethrin, tebupirimfos, tebufenozide, tebufenpyrad, tefluthrin, teflubenzuron, demeton-S-methyl, temephos, deltamethrin, terbufos, tralopyril, tralomethrin, transfluthrin, triazamate, triazuron, trichlamide, trichlorphon (DEP), triflumuron, tolfenpyrad, naled (BRP), nithiazine, nitenpyram, novaluron, noviflumuron, hydroprene, vaniliprole, vamidothion, parathion, parathion-methyl, halfenprox, halofenozide, bistrifluron, bisultap, hydramethylnon, hydroxy propyl starch, binapacryl, bifenazate, bifenthrin, pymetrozine, pyraclofos, pyrafluprole, pyridafenthion, pyridaben, pyridalyl, pyrifluquinazon, pyriprole, pyriproxyfen, pirimicarb, pyrimidifen, pirimiphos-methyl, pyrethrins, fipronil, fenazaquin, fenamiphos, bromopropylate, fenitrothion (MEP), fenoxycarb, fenothiocarb, phenothrin, fenobucarb, fensulfothion, fenthion (MPP), phenthoate (PAP), fenvalerate, fenpyroximate, fenpropathrin, fenbendazole, fosthiazate, formetanate, butathiofos, buprofezin, furathiocarb, prallethrin, fluacrypyrim, fluazinam, fluazuron, fluensulfone, flucycloxuron, flucythrinate, fluvalinate, flupyrazofos, flufenerim, flufenoxuron, flufenzine, flufenprox, fluproxyfen, flubrocythrinate, flubendiamide, flumethrin, flurimfen, prothiofos, protrifenbute, flonicamid, propaphos, propargite (BPPS), profenofos, profluthrin, propoxur (PHC), bromopropylate, beta-cyfluthrin, hexaflumuron, hexythiazox, heptenophos, permethrin, benclothiaz, bendiocarb, bensultap, benzoximate, benfuracarb, phoxim, phosalone, fosthiazate, fosthietan, phosphamidon, phosphocarb, phosmet (PMP), polynactins, formetanate, formothion, phorate, machine oil, malathion, milbemycin, milbemycin-A, milbemectin, mecarbam, mesulfenfos, methomyl, metaldehyde, metaflumizone, methamidophos, metam-ammonium, metam-sodium, methiocarb, methidathion (DMTP), methylisothiocyanate, methylneodecanamide, methylparathion, metoxadiazone, methoxychlor, methoxyfenozide, metofluthrin, methoprene, metolcarb, meperfluthrin, mevinphos, monocrotophos, monosultap, lambda-cyhalothrin, ryanodine, lufenuron, resmethrin, lepimectin, rotenone, levamisole hydrochloride, fenbutatin oxide, morantel tartarate, methyl bromide, tricyclohexyltin hydroxide (cyhexatin), calcium cyanamide, calcium polysulfide, sulfur and nicotine-sulfate.

Exemplary microbicides used in combination with the control composition of the present invention may be as follows:

aureofungin, azaconazole, azithiram, acypetacs, acibenzolar, acibenzolar-S-methyl, azoxystrobin, anilazine, amisulbrom, ampropylfos, ametoctradin, allyl alcohol, aldimorph, amobam, isotianil, isovaledione, isopyrazam, isoprothiolane, ipconazole, iprodione, iprovalicarb, iprobenfos, imazalil, iminoctadine, iminoctadine-albesilate, iminoctadine-triacetate, imibenconazole, uniconazole, uniconazole-P, echlomezole, edifenphos, etaconazole, ethaboxam, ethirimol, etem, ethoxyquin, etridiazole, enestroburin, epoxiconazole, oxadixyl, oxycarboxin, copper-8-quinolinolate, oxytetracycline, copper-oxinate, oxpoconazole, oxpoconazole-fumarate, oxolinic acid, octhilinone, ofurace, orysastrobin, metam-sodium, kasugamycin, carbamorph, carpropamid, carbendazim, carboxin, carvone, quinazamid, quinacetol, quinoxyfen, quinomethionate, captafol, captan, kiralaxyl, quinconazole, quintozene, guazatine, cufraneb, cuprobam, glyodin, griseofulvin, climbazole, cresol, kresoxim-methyl, chlozolinate, clotrimazole, chlobenthiazone, chloraniformethan, chloranil, chlorquinox, chloropicrin, chlorfenazole, chlorodinitronaphthalene, chlorothalonil, chloroneb, zarilamid, salicylanilide, cyazofamid, diethyl pyrocarbonate, diethofencarb, cyclafuramid, diclocymet, dichlozoline, diclobutrazol, dichlofluanid, cycloheximide, diclomezine, dicloran, dichlorophen, dichlone, disulfiram, ditalimfos, dithianon, diniconazole, diniconazole-M, zineb, dinocap, dinocton, dinosulfon, dinoterbon, dinobuton, dinopenton, dipyrithione, diphenylamine, difenoconazole, cyflufenamid, diflumetorim, cyproconazole, cyprodinil, cyprofuram, cypendazole, simeconazole, dimethirimol, dimethomorph, cymoxanil, dimoxystrobin, methyl bromide, ziram, silthiofam, streptomycin, spiroxamine, sultropen, sedaxane, zoxamide, dazomet, thiadiazin, tiadinil, thiadifluor, thiabendazole, tioxymid, thiochlorfenphim, thiophanate, thiophanate-methyl, thicyofen, thioquinox, chinomethionat, thifluzamide, thiram, decafentin, tecnazene, tecloftalam, tecoram, tetraconazole, debacarb, dehydroacetic acid, tebuconazole, tebufloquin, dodicin, dodine, dodecyl benzensulfonate bis-ethylene diamine copper(II) (DBEDC), dodemorph, drazoxolon, triadimenol, triadimefon, triazbutil, triazoxide, triamiphos, triarimol, trichlamide, tricyclazole, triticonazole, tridemorph, tributyltin oxide, triflumizole, trifloxystrobin, triforine, tolylfluanid, tolclofos-methyl, natamycin, nabam, nitrothal-isopropyl, nitrostyrene, nuarimol, copper nonylphenol sulfonate, halacrinate, validamycin, valifenalate, harpin protein, bixafen, picoxystrobin, picobenzamide, bithionol, bitertanol, hydroxyisoxazole, hydroxyisoxazole-potassium, binapacryl, biphenyl, piperalin, hymexazol, pyraoxystrobin, pyracarbolid, pyraclostrobin, pyrazophos, pyrametostrobin, pyriofenone, pyridinitril, pyrifenox, pyribencarb, pyrimethanil, pyroxychlor, pyroxyfur, pyroquilon, vinclozolin, famoxadone, fenapanil, fenamidone, fenaminosulf, fenarimol, fenitropan, fenoxanil, ferimzone, ferbam, fentin, fenpiclonil, fenpyrazamine, fenbuconazole, fenfuram, fenpropidin, fenpropimorph, fenhexamid, phthalide, buthiobate, butylamine, bupirimate, fuberidazole, blasticidin-S, urametpyr, furalaxyl, fluacrypyrim, fluazinam, fluoxastrobin, fluotrimazole, fluopicolide, fluopyram, fluoroimide, furcarbanil, fluxapyroxad, fluquinconazole, furconazole, furconazole-cis, fludioxonil, flusilazole, flusulfamide, flutianil, flutolanil, flutriafol, furfural, furmecyclox, flumetover, flumorph, proquinazid, prochloraz, procymidone, prothiocarb, prothioconazole, propamocarb, propiconazole, propineb, furophanate, probenazole, bromuconazole, hexachlorobutadiene, hexaconazole, hexylthiofos, bethoxazin, benalaxyl, benalaxyl-M, benodanil, benomyl, pefurazoate, benquinox, penconazole, benzamorf, pencycuron, benzohydroxamic acid, bentaluron, benthiazole, benthiavalicarb-isopropyl, penthiopyrad, penflufen, boscalid, phosdiphen, fosetyl, fosetyl-Al, polyoxins, polyoxorim, polycarbamate, folpet, formaldehyde, machine oil, maneb, mancozeb, mandipropamid, myclozolin, myclobutanil, mildiomycin, milneb, mecarbinzid, methasulfocarb, metazoxolon, metam, metam-sodium, metalaxyl, metalaxyl-M, metiram, methyl isothiocyanate, meptyldinocap, metconazole, metsulfovax, methfuroxam, metominostrobin, metrafenone, mepanipyrim, mefenoxam, meptyldinocap, mepronil, mebenil, iodomethane, rabenzazole, benzalkonium chloride, basic copper chloride, basic copper sulfate, inorganic microbicides such as silver, sodium hypochlorite, cupric hydroxide, wettable sulfur, calcium polysulfide, potassium hydrogen carbonate, sodium hydrogen carbonate, sulfur, copper sulfate anhydride, nickel dimethyldithiocarbamate, copper compounds such as copper-8-quinolinolate (oxine copper), zinc sulfate and copper sulfate pentahydrate.

Exemplary herbicides used in combination with the control composition of the present invention may be as follows:
1-naphthylacetamide, 2,4-PA, 2,3,6-TBA, 2,4,5-T, 2,4,5-TB, 2,4-D, 2,4-DB, 2,4-DEB, 2,4-DEP, 3,4-DA, 3,4-DB, 3,4-DP, 4-CPA, 4-CPB, 4-CPP, MCP, MCPA, MCPA-thioethyl, MCPB, ioxynil, aclonifen, azafenidin, acifluorfen, aziprotryne, azimsulfuron, asulam, acetochlor, atrazine, atraton, anisuron, anilofos, aviglycine, abscisic acid, amicarbazone, amidosulfuron, amitrole, aminocyclopyrachlor, aminopyralid, amibuzin, amiprophos-methyl, ametridione, ametryn, alachlor, allidochlor, alloxydim, alorac, isouron, isocarbamid, isoxachlortole, isoxapyrifop, isoxaflutole, isoxaben, isocil, isonoruron, isoproturon, isopropalin, isopolinate, isomethiozin, inabenfide, ipazine, ipfencarbazone, iprymidam, imazaquin, imazapic, imazapyr, imazamethapyr, imazamethabenz, imazamethabenz-methyl, imazamox, imazethapyr, imazosulfuron, indaziflam, indanofan, indolebutyric acid, uniconazole-P, eglinazine, esprocarb, ethametsulfuron, ethametsulfuron-methyl, ethalfluralin, ethiolate, ethychlozate-ethyl, ethidimuron, etinofen, ethephon, ethoxysulfuron, ethoxyfen, etnipromid, ethofumesate, etobenzanid, epronaz, erbon, endothal, oxadiazon, oxadiargyl, oxaziclomefone, oxasulfuron, oxapyrazon, oxyfluorfen, oryzalin, orthosulfamuron, orbencarb, cafenstrole, cambendichlor, carbasulam, carfentrazone, carfentrazone-ethyl, karbutilate, carbetamide, carboxazole, quizalofop, quizalofop-P, quizalofop-ethyl, xylachlor, quinoclamine, quinonamid, quinclorac, quinmerac, cumyluron, cliodinate, glyphosate, glufosinate, glufosinate-P, credazine, clethodim, cloxyfonac, clodinafop, clodinafop-propargyl, chlorotoluron, clopyralid, cloproxydim, cloprop, chlorbromuron, clofop, clomazone, chlomethoxynil, chlomethoxyfen, clomeprop, chlorazifop, chlorazine, cloransulam, chloranocryl, chloramben, cloransulam-methyl, chloridazon, chlorimuron, chlorimuron-ethyl, chlorsulfuron, chlorthal, chlorthiamid, chlortoluron, chlornitrofen, chlorfenac, chlorfenprop, chlorbufam, chlorflurazole, chlorflurenol, chlorprocarb, chlorpropham, chlormequat, chloreturon, chloroxynil, chloroxuron, chloropon, saflufenacil, cyanazine, cyanatryn, di-allate, diuron, diethamquat, dicamba, cycluron, cycloate, cycloxydim, diclosulam, cyclosulfamuron, dichlorprop, dichlorprop-P, dichlobenil, diclofop, diclofop-methyl, dichlormate, dichloralurea, diquat, cisanilide, disul, siduron, dithiopyr, dinitramine, cinidon-ethyl, dinosam, cinosulfuron, dinoseb, dinoterb, dinofenate, dinoprop, cyhalofop-butyl, diphenamid, difenoxuron, difenopenten, difenzoquat, cybutryne, cyprazine, cyprazole, diflufenican, diflufenzopyr, dipropetryn, cypromid, cyperquat, gibberellin, simazine, dimexano, dimethachlor, dimidazon, dimethametryn, dimethenamid, simetryn, simeton, dimepiperate, dimefuron, cinmethylin, swep, sulglycapin, sulcotrione, sulfallate, sulfentrazone, sulfosulfuron, sulfometuron, sulfometuron-methyl, secbumeton, sethoxydim, sebuthylazine, terbacil, daimuron, dazomet, dalapon, thiazafluron, thiazopyr, thiencarbazone, thiencarbazone-methyl, tiocarbazil, tioclorim, thiobencarb, thidiazimin, thidiazuron, thifensulfuron, thifensulfuron-methyl, desmedipham, desmetryn, tetrafluron, thenylchlor, tebutam, tebuthiuron, terbumeton, tepraloxydim, tefuryltrione, tembotrione, delachlor, terbacil, terbucarb, terbuchlor, terbuthylazine, terbutryn, topramezone, tralkoxydim, triaziflam, triasulfuron, tri-allate, trietazine, tricamba, triclopyr, tridiphane, tritac, tritosulfuron, triflusulfuron, triflusulfuron-methyl, trifluralin, trifloxysulfuron, tripropindan, tribenuron-methyl, tribenuron, trifop, trifopsime, trimeturon, naptalam, naproanilide, napropamide, nicosulfuron, nitralin, nitrofen, nitrofluorfen, nipyraclofen, neburon, norflurazon, noruron, barban, paclobutrazol, paraquat, parafluron, haloxydine, haloxyfop, haloxyfop-P, haloxyfop-methyl, halosafen, halosulfuron, halosulfuron-methyl, picloram, picolinafen, bicyclopyrone, bispyribac, bispyribac-sodium, pydanon, pinoxaden, bifenox, piperophos, hymexazol, pyraclonil, pyrasulfotole, pyrazoxyfen, pyrazosulfuron, pyrazosulfuron-ethyl, pyrazolate, bilanafos, pyraflufen-ethyl, pyriclor, pyridafol, pyrithiobac, pyrithiobac-sodium, pyridate, pyriftalid, pyributicarb, pyribenzoxim, pyrimisulfan, primisulfuron, pyriminobac-methyl, pyroxasulfone, pyroxsulam, fenasulam, phenisopham, fenuron, fenoxasulfone, fenoxaprop, fenoxaprop-P, fenoxaprop-ethyl, phenothiol, fenoprop, phenobenzuron, fenthiaprop, fenteracol, fentrazamide, phenmedipham, phenmedipham-ethyl, butachlor, butafenacil, butamifos, buthiuron, buthidazole, butylate, buturon, butenachlor, butroxydim, butralin, flazasulfuron, flamprop, furyloxyfen, prynachlor, primisulfuron-methyl, fluazifop, fluazifop-P, fluazifop-butyl, fluazolate, fluroxypyr, fluothiuron, fluometuron, fluoroglycofen, flurochloridone, fluorodifen, fluoronitrofen, fluoromidine, flucarbazone, flucarbazone-sodium, fluchloralin, flucetosulfuron, fluthiacet, fluthiacet-methyl, flupyrsulfuron, flufenacet, flufenican, flufenpyr, flupropacil, flupropanate, flupoxam, flumioxazin, flumiclorac, flumiclorac-pentyl, flumipropyn, flumezin, fluometuron, flumetsulam, fluridone, flurtamone, fluroxypyr, pretilachlor, proxan, proglinazine, procyazine, prodiamine, prosulfalin, prosulfuron, prosulfocarb, propaquizafop, propachlor, propazine, propanil, propyzamide, propisochlor, prohydrojasmon, propyrisulfuron, propham, profluazol, profluralin, prohexadione-calcium, propoxycarbazone, propoxycarbazone-sodium, profoxydim, bromacil, brompyrazon, prometryn, prometon, bromoxynil, bromofenoxim, bromobutide, bromobonil, florasulam, hexachloroacetone, hexazinone, pethoxamid, benazolin, penoxsulam, pebulate, beflubutamid, vemolate, perfluidone, bencarbazone, benzadox, benzipram, benzylaminopurine, benzthiazuron, benzfendizone, bensulide, bensulfuron-methyl, benzoylprop, benzobicyclon, benzofenap, benzofluor, bentazone, pentanochlor, benthiocarb, pendimethalin, pentoxazone, benfluralin, benfuresate, fosamine, fomesafen, foramsulfuron, forchlorfenuron, maleic hydrazide, mecoprop, mecoprop-P, medinoterb, mesosulfuron, mesosulfuron-methyl, mesotrione, mesoprazine, methoprotryne, metazachlor, methazole, metazosulfuron, methabenzthiazuron, metamitron, metamifop, metam, methalpropalin, methiuron, methiozolin, methiobencarb, methyldymron, metoxuron, metosulam, metsulfuron, metsulfuron-methyl, metflurazon, metobromuron, metobenzuron, methometon, metolachlor, metribuzin, mepiquat-chloride, mefenacet, mefluidide, monalide, monisouron, monuron, monochloroacetic acid, monolinuron, molinate, morfamquat, iodosulfuron, iodosulfuron-methyl-sodium, iodobonil, iodomethane, lactofen, linuron, rimsulfuron, lenacil, rhodethanil, calcium peroxide and methyl bromide.

Exemplary agricultural biopesticides used in combination with the control composition of the present invention may be as follows:

the control composition of the present invention may be expected to have the same effect in combination with any of viral formulations such as nuclear polyhedrosis virus (NPV), granulosis virus (GV), cytoplasmic polyhedrosis virus (CPV) and Entomopoxi virus (EPV); microbial pesticides used as an insecticide or a nematicide, such as *Monacrosporium phymatophagum, Steinemema carpocapsae, Steinernema kushidai* and *Pasteuria penetrans*; microbial pesticides used as a microbicide, such as *Trichoderma lignorum, Agrobacterium radiobactor, Erwinia carotovora* and *Bacillus subtilis*; biopesticides used as a herbicide, such as *Xanthomonas campestris*. The control composition of the present invention can also be used together with an agricultural biopesticide, for example, a natural enemy such as *Encarsia formosa, Aphidius colemani, Aphidoletes aphidimyza, Diglyphus isaea, Dacnusa sibirica, Phytoseiulus persimilis, Amblyseius cucumeris* or *Orius sauteri*, an agricultural microbial pesticide such as *Beauveria brongniartii*, or a pheromone such as (Z)-10-tetradecenyl acetate, (E,Z)-4,10-tetradecadienyl acetate, (Z)-8-dodecenyl acetate, (Z)-11-tetradecenyl acetate, (Z)-13-icosen-10-one, or 14-methyl-1-octadecene.

Meanwhile, hereinafter, in order to specifically describe the disclosure of the present invention as described above and the actions and effects intended by the present invention, the present invention will be described in detail with reference to examples. However, the examples may be modified into various other forms, and the scope of the specification is not to be construed as being limited only to the examples. It is emphasized that the examples are provided to describe the present invention in further detail to those of ordinary skill in the art.

Example 1

Synthesis of Compound of Formula Ia-1-1-1

Step 1: 1-Methyl-1H-imidazole-5-carboxylic acid (38.81 g, 307.7 mmol) was added to acetonitrile (160 mL) at room temperature and dissolved. Dimethylformamide (0.5 mL) was added to the resulting solution, and then cooled using ice water. Oxalyl chloride (31.25 mL, 369.2 mmol, 1.2 equiv.) was slowly added dropwise to the cooled solution. Afterward, the temperature was raised to room temperature to allow a reaction at room temperature for 5 hours. After the reaction, the resulting solution was concentrated under reduced pressure, and the concentrated residue was crystallized with isopropyl ether. The generated solid was filtered and dried, thereby obtaining a desired compound (62.47 g, quant., ivory solid).

Step 2: 3-Bromopyridine (35.00 g, 221.5 mmol), ethyl amine (66.0 to 72.0% $H_2O$ solution, 93.4 mL, 1107.6 mmol, 5.0 equiv.) and Cu powder (0.71 g, 11.1 mmol, 0.05 equiv.) were added to a sealed tube, heated to approximately 100° C., and stirred overnight at 100° C. After the reaction, the resulting product was cooled to room temperature and extracted using ethyl acetate. An organic layer was dried with anhydrous $MgSO_4$, filtered and concentrated, thereby obtaining a desired compound (23.3 g, 86%, brown oil).

Step 3: 1-Methyl-1H-imidazole-5-carbonyl chloride HCl salt (55.7 g, 307.7 mmol, 1.6 equiv.) was dissolved in dichloromethane (DCM, 300 mL). The resulting solution was cooled using ice water. A solution prepared by dissolving N-methylpyrridine-3-amine (23.3 g, 191.3 mmol) in DCM (100 mL) was slowly added dropwise to the corresponding solution. After further addition of N,N-diisopropylethylamine (133.0 mL, 765.2, 4.0 equiv.) dropwise, the temperature was raised to room temperature to allow a reaction at room temperature for 30 minutes. The temperature was raised to 50° C. to allow a reaction for 3 hours, followed by cooling to room temperature. The reaction product was quenched and extracted with DCM. An organic layer was dried with anhydrous $MgSO_4$, filtered, concentrated and then purified by silica gel column chromatography, thereby obtaining a desired compound (43.89 g, 99%, brown oil).

Step 4: N-ethyl-1-methyl-N-(pyridin-3-yl)-1H-imidazole-5-carboxamide (10.0 g, 43.4 mmol) was dissolved in tetrahydrofuran (THF, 100 mL), and then toluene (150 mL) was added. After purging with N2 gas, the resulting solution was cooled to −78° C. using acetone and dry ice. n-BuLi (2.5M in a hexane solution, 17.7 mL, 44.2 mmol, 1.02 equiv.) was slowly added dropwise to the cooled solution. Afterward, the resulting solution was stirred at −78° C. for 40 minutes. A solution prepared by dissolving p-toluenesulfonyl cyanide (9.44 g, 52.1 mmol, 1.2 equiv.) in THF (50 mL) was slowly added dropwise. Afterward, the resulting solution was stirred at −78° C. for 1 hour. The temperature was then raised to room temperature, followed by additional stirring for 4 hours. The resulting solution was quenched with methanol, and then concentrated under reduced pressure. The concentrate was purified by silica gel column chromatography, thereby obtaining a desired compound (4.29 g, 39%, light brown oil).

Step 5: 2-Cyano-N-ethyl-1-methyl-N-(pyridin-3-yl)-1H-imidazole-5-carboxamide (4.29 g, 16.8 mmol) was dissolved in ethanol (30 mL), and an $NH_2OH$ (50% in $H_2O$, 2.06 mL, 33.6 mmol, 2.0 equiv.) aqueous solution was slowly added dropwise, followed by stirring at room temperature for 1 hour. After the reaction was completed, the resulting solution was concentrated under reduced pressure and purified by silica gel column chromatography, thereby obtaining a desired compound (3.87 g, 80%, pale yellow solid).

Step 6: Acetic acid (0.315 mmol), EDCI·HCl (72.85 mg, 0.380 mmol, 1.2 equiv.) and hydroxybenzotriazole (HOBt, 58.0 mg, 0.380 mmol, 1.2 equiv.) were dissolved in DCM (2 mL) and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. After the reaction, the resulting product was washed with water, followed by extraction with DCM. After layer separation, an organic layer was dried with anhydrous $MgSO_4$, filtered, concentrated under reduced pressure and purified by silica gel column chromatography, thereby obtaining a desired compound (83.2 mg, 80%, colorless oil).

Step 7: The compound obtained in Step 6 was dissolved in toluene (1 mL), and allowed to reflux overnight. The completion of the reaction was confirmed, and then the resulting product was concentrated under reduced pressure and purified by silica gel column chromatography, thereby obtaining a compound represented by Formula Ia-1-1-1 (63.9 mg, 66%, brown oil).

$^1$H-NMR (500 MHz): $CDCl_3$ (δ) 8.54 (d, 1H), 8.42 (s, 1H), 7.54 (d, 1H), 7.36 (q, 1H), 6.49 (s, 1H), 4.22 (s, 3H), 3.97 (q, 2H), 2.65 (s, 3H), 1.25 (t, 3H).

Example 2

Synthesis of Compound of Formula Ia-1-1-2

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (0.173 mmol) and 1,1,5,5-tetrafluoropentane-2,4-dione (15 mL) were added and allowed to reflux overnight. The completion of the reaction was confirmed, and then the resulting solution was concentrated under reduced pressure and purified by silica gel column chromatography, thereby obtaining a compound represented by Formula Ia-1-1-2 (27.2 mg, 45.0%, yellow liquid).

$^1$H-NMR (500 MHz): $CDCl_3$ (δ) 8.54 (d, 1H), 8.40 (s, 1H), 7.53 (d, 1H), 7.35 (q, 1H), 6.86 (t, 1H), 6.50 (s, 1H), 4.24 (s, 3H), 3.97 (q, 2H), 1.25 (t, 3H).

Example 3

Synthesis of Compound of Formula Ia-1-1-3

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (0.173 mmol) and 1,1,1,5,5,5-hexafluoropentane-2,4-dione (15 mL) were added and allowed to reflux overnight. The completion of the reaction was confirmed, and then the resulting solution was concentrated under reduced pressure and purified by silica gel column chromatography, thereby obtaining a compound represented by Formula Ia-1-1-2 (78.1 mg, 87.2%, yellow liquid).

$^1$H-NMR (500 MHz): $CDCl_3$ (δ) 8.56 (d, 1H), 8.41 (s, 1H), 7.56 (d, 1H), 7.37 (q, 1H), 6.52 (s, 1H), 4.25 (s, 3H), 3.98 (q, 2H), 1.26 (t, 7H).

Example 4

Synthesis of Compound of Formula Ia-1-1-4

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (0.173 mmol), p-toluenesulfonic acid (0.82 mg, 0.004 mmol, 0.025 equiv.) and triethyl orthoformate (0.22 mL, 1.318 mmol, 7.6 equiv.) were added and allowed to reflux for 2.5 hours. The completion of the reaction was confirmed, and then the resulting solution was concentrated under reduced pressure and purified by silica gel column chromatography, thereby obtaining a compound represented by Formula Ia-1-1-4 (11.4 mg, 22%, yellow liquid).

$^1$H-NMR (500 MHz): $CDCl_3$ (δ) 8.82 (s, 1H), 8.54 (d, 1H), 8.40 (s, 1H), 7.53 (d, 1H), 7.34 (q, 1H), 6.49 (s, 1H), 4.25 (s, 3H), 3.97 (q, 2H), 1.26 (t, 3H).

Example 5

Synthesis of Compound of Formula Ia-1-1-5

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (0.173 mmol) and 2,2,6,6-tetramethylheptane-3,5-dione (15 mL) were added and allowed to reflux overnight. The completion of the reaction was confirmed, and then the resulting solution was concentrated under reduced pressure and purified by silica gel column chromatography, thereby obtaining a compound represented by Formula Ia-1-1-5 (57.8 mg, 94.1%, yellow liquid).

$^1$H-NMR (500 MHz): $CDCl_3$ (δ) 8.51 (d, 1H), 8.39 (s, 1H), 8.51 (d, 1H), 7.31 (q, 1H), 6.45 (s, 1H), 4.20 (s, 3H), 3.94 (q, 2H), 1.45 (s, 9H), 1.23 (t, 3H)

Example 6

Synthesis of Compound of Formula Ia-1-1-6

Synthesis was performed by the same method as described in Example 1, except that Step 6 and Step 7 were modified as follows.

Step 6: Isobutyric acid (0.315 mmol), EDCI·HCl (72.85 mg, 0.380 mmol, 1.2 equiv.) and hydroxybenzotriazole (HOBt, 58.0 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. After the completion of the reaction was confirmed, the resulting product was washed with water, and subjected to extraction with DCM. After layer separation, an organic layer was dried with anhydrous $MgSO_4$, filtered, concentrated under reduced pressure and purified by silica gel column chromatography, thereby obtaining a desired compound (102.1 m g, 90.4%, colorless liquid).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-6 (30.6 mg, 40.3%, yellow liquid).

$^1$H-NMR (500 MHz): $CDCl_3$ (δ) 8.52 (d, 1H), 8.40 (s, 1H), 7.50 (d, 1H), 7.31 (q, 1H), 6.46 (s, 1H), 4.22 (s, 3H), 3.96 (q, 2H), 3.31-3.26 (m, 1H), 1.45-1.43 (m, 6H), 1.25 (t, 3H)

Example 7

Synthesis of Compound of Formula Ia-1-1-7

Synthesis was performed by the same method as described in Example 1, except that Step 6 and Step 7 were modified as follows.

Step 6: Butyric acid (0.315 mmol), EDCI·HCl (72.85 mg, 0.380 mmol, 1.2 equiv.) and hydroxybenzotriazole (HOBt, 58.0 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous $MgSO_4$, filtered, concentrated under reduced pressure and purified by silica gel column chromatography, thereby obtaining a desired compound (105.3 mg, 93.3%, colorless liquid).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-7 (52.6 mg, 69.2%, yellow liquid).

$^1$H-NMR (500 MHz): $CDCl_3$ (δ) 8.52 (d, 1H), 8.40 (s, 1H), 7.50 (d, 1H), 7.32 (q, 1H), 6.45 (s, 1H), 4.21 (s, 3H), 3.95 (q, 2H), 2.91 (t, 2H), 1.91-1.86 (m, 2H), 1.24 (t, 3H), 1.01 (t, 3H)

Example 8

Synthesis of Compound of Formula Ia-1-1-8

Synthesis was performed by the same method as described in Example 1, except that Step 6 and Step 7 were modified as follows.

Step 6: Propionic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous $MgSO_4$, filtered, concentrated under reduced pressure and purified by silica gel column chromatography, thereby obtaining a desired compound (107.4 mg, 99%, yellow liquid).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-8 (56.5 mg, 55.0%, yellow liquid).

$^1$H-NMR (500 MHz): $CDCl_3$ (δ) 8.51-8.50 (m, 1H), 8.38 (d, 1H), 7.51-7.48 (m, 1H), 7.32-7.29 (m, 1H), 6.44 (s, 1H), 4.20 (s, 3H), 3.94 (q, 2H), 2.94 (q, 2H), 1.40 (t, 3H), 1.23 (t, 3H)

Example 9

Synthesis of Compound of Formula Ia-1-1-9

Synthesis was performed by the same method as described in Example 1, except that Step 6 and Step 7 were modified as follows.

Step 6: Valeric acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous $MgSO_4$, filtered, concentrated under reduced pressure and purified by silica gel column chromatography, thereby obtaining a desired compound (87.2 mg, 74.3%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-9 (30.5 mg, 27.3%, yellow liquid).

$^1$H-NMR (500 MHz): $CDCl_3$ (δ) 8.51-8.50 (m, 1H), 8.38 (d, 1H), 7.50-7.48 (m, 1H), 7.32-7.29 (m, 1H), 6.44 (s, 1H), 4.20 (s, 3H), 3.94 (q, 2H), 2.92 (t, 2H), 1.85-1.79 (m, 2H), 1.42-1.36 (m, 2H), 1.23 (t, 3H), 0.91 (t, 3H)

Example 10

Synthesis of Compound of Formula Ia-1-1-10

Synthesis was performed by the same method as described in Example 1, except that Step 6 and Step 7 were modified as follows.

Step 6: 2-Methyl butyric acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous $MgSO_4$, filtered, concentrated under reduced pressure and purified by silica gel column chromatography, thereby obtaining a desired compound (112.6 mg, 96%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-10 (63.8 mg, 57.2%, yellow liquid).

$^1$H-NMR (500 MHz): CDCl$_3$ (δ) 8.50-8.498 (m, 1H), 8.37 (d, 1H), 7.49-7.47 (m, 1H), 7.30-7.27 (m, 1H), 6.43 (s, 1H), 4.19 (s, 3H), 3.93 (q, 2H), 3.12-3.05 (m, 1H), 1.92-1.83 (m, 1H), 1.76-1.67 (m, 1H), 1.37 (d, 3H), 1.21 (t, 3H), 0.89 (t, 3H)

Example 11

Synthesis of Compound of Formula Ia-1-1-11

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (100 mg, 0.347 mmol), 3,3-dimethyl butyryl chloride (0.051 mL, 0.364 mmol, 1.05 equiv.) and TEA (0.053 mL, 0.382 mmol, 1.1 equiv.) were dissolved in DMF (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-11 (17.2 mg, 13.5% yellow liquid).

$^1$H-NMR (500 MHz): CDCl$_3$ (δ) 8.54-8.53 (m, 1H), 8.40 (d, 1H), 7.53-7.50 (m, 1H), 7.34-7.31 (m, 1H), 6.47 (s, 1H), 4.23 (s, 3H), 3.96 (q, 2H), 2.85 (s, 2H), 1.25 (t, 3H), 1.06 (s, 9H)

Example 12

Synthesis of Compound of Formula Ia-1-1-12

Synthesis was performed by the same method as described in Example 1, except that Step 6 and Step 7 were modified as follows.

Step 6: Cyclopropane carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO$_4$, filtered, concentrated under reduced pressure and purified by silica gel column chromatography, thereby obtaining a desired compound (111.1 mg, 99.1%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-12 (68.1 mg, 63.9%, brown liquid).

$^1$H-NMR (500 MHz): CDCl$_3$ (δ) 8.56 (d, 1H), 8.44 (s, 1H), 7.55 (d, 1H), 7.37 (q, 1H), 6.49 (s, 1H), 4.23 (s, 3H), 3.99 (q, 2H), 2.27 (m, 1H), 1.27 (m, 7H)

Example 13

Synthesis of Compound of Formula Ia-1-1-13

Synthesis was performed by the same method as described in Example 1, except that Step 6 and Step 7 were modified as follows.

Step 6: Cyclopentane carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO$_4$, filtered, concentrated under reduced pressure and purified by silica gel column chromatography, thereby obtaining a desired compound (118.7 g, 98%, yellow liquid).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-13 (43.4 mg, 37.6%, yellow liquid).

$^1$H-NMR (500 MHz): CDCl$_3$ (δ) 8.52-8.51 (m, 1H), 8.40 (d, 1H), 7.52-7.49 (m, 1H), 7.33-7.31 (m, 1H), 6.46 (s, 1H), 4.21 (s, 3H), 3.95 (q, 2H), 3.41-3.35 (m, 1H), 2.15-2.12 (m, 2H), 2.01-1.997 (m, 2H), 1.84-1.79 (m, 2H), 1.70-1.67 (m, 2H), 1.24 (t, 3H)

Example 14

Synthesis of Compound of Formula Ia-1-1-14

Synthesis was performed by the same method as described in Example 1, except that Step 6 and Step 7 were modified as follows.

Step 6: Cyclohexane carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO$_4$, filtered, concentrated under reduced pressure and purified by silica gel column chromatography, thereby obtaining a desired compound (121.7 g, 97%, light yellow solid).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-14 (38.4 mg, 32.0%, yellow liquid).

¹H-NMR (500 MHz): CDCl₃ (δ) 8.53-8.51 (m, 1H), 8.40 (d, 1H), 7.52-7.49 (m, 1H), 7.33-7.30 (m, 1H), 6.46 (s, 1H), 4.21 (s, 3H), 3.95 (q, 2H), 3.02-2.97 (m, 1H), 2.11-2.08 (m, 2H), 1.84-1.80 (m, 2H), 1.72-1.65 (m, 2H), 1.45-1.34 (m, 2H), 1.33-1.21 (m, 5H)

Example 15

Synthesis of Compound of Formula Ia-1-1-15
Synthesis was performed by the same method as described in Example 1, except that Step 6 and Step 7 were modified as follows.
Step 6: Cyclohexane acetic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (121.1 g, 93.2%, yellow oil).
Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-15 (24.5 mg, 19.7%, yellow liquid).
¹H-NMR (500 MHz): CDCl₃ (δ) 8.52 (d, 1H), 8.40 (s, 1H), 7.50 (d, 1H), 7.31 (q, 1H), 6.46 (s, 1H), 4.21 (s, 3H), 3.95 (q, 2H), 2.81 (d, 2H), 1.97-1.84 (m, 1H), 1.74-1.62 (m, 5H), 1.25-1.02 (m, 8H)

Example 16

Synthesis of Compound of Formula Ia-1-1-16
Synthesis was performed by the same method as described in Example 1, except that Step 6 and Step 7 were modified as follows.
Step 6: Cyclopropylacetic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (107.3 g, 92%, yellow oil).
Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-16 (44.8 mg, 40.4%, yellow liquid).

¹H-NMR (500 MHz): CDCl₃ (δ) 8.52-8.51 (m, 1H), 8.40 (d, 1H), 7.52-7.50 (m, 1H), 7.33-7.31 (m, 1H), 6.46 (s, 1H), 4.21 (s, 3H), 3.95 (q, 2H), 2.83 (d, 2H), 1.25-1.17 (m, 4H), 0.62-0.59 (m, 2H), 0.31-0.28 (m, 2H)

Example 17

Synthesis of Compound of Formula Ia-1-1-17
Synthesis was performed by the same method as described in Example 1, except that Step 6 and Step 7 were modified as follows.
Step 6: Adamantane-2-carboxylic acid (0.315 mmol), EDCI·HCl (72.85 mg, 0.380 mmol, 1.2 equiv.), HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (88.5 m g, 62.4%, brown oil).
Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-17 (56.1 mg, 41.2%, brown liquid).
¹H-NMR (500 MHz): CDCl₃ (δ) 8.54-8.52 (m, 1H), 8.41 (d, 1H), 7.52-7.50 (m, 1H), 7.34-7.27 (m, 1H), 6.46 (s, 1H), 4.22 (s, 3H), 3.96 (q, 2H), 2.12-2.01 (m, 8H), 1.81-1.71 (m, 7H), 1.25 (t, 3H)

Example 18

Synthesis of Compound of Formula Ia-1-1-18
Synthesis was performed by the same method as described in Example 1, except that Step 6 and Step 7 were modified as follows.
Step 6: 3-Oxocyclobutane-1-carboxylic acid (0.315 mmol), EDCI·HCl (72.85 mg, 0.380 mmol, 1.2 equiv.) and hydroxybenzotriazole (HOBt, 58.0 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-i-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (120 mg, 99%, colorless oil).
Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-18 (13.2 mg, 11.4%, light yellow liquid).

¹H-NMR (500 MHz): CDCl₃ (δ) 8.53-8.52 (m, 1H), 8.39 (d, 1H), 7.53-7.51 (m, 1H), 7.34-7.32 (m, 1H), 6.47 (s, 1H), 4.23 (s, 3H), 3.98-3.89 (m, 3H), 3.72-3.66 (m, 2H), 3.62-3.57 (m, 2H), 1.25 (t, 3H)

Example 19

Synthesis of Compound of Formula Ia-1-1-19

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (100 mg, 0.347 mmol), cyclobutanecarbonyl chloride (0.042 mL, 0.364 mmol, 1.05 equiv.) and TEA (0.053 mL, 0.382 mmol, 1.1 equiv.) were dissolved in DMF (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-19 (28.8 mg, 23.6% yellow liquid).

¹H-NMR (500 MHz): CDCl₃ (δ) 8.53-8.52 (m, 1H), 8.40 (d, 1H), 7.52-7.50 (m, 1H), 7.33-7.31 (m, 1H), 6.46 (s, 1H), 4.21 (s, 3H), 3.95 (q, 2H), 3.83-3.76 (m, 1H), 2.57-2.41 (m, 4H), 2.15-2.03 (m, 2H), 1.24 (t, 3H)

Example 20

Synthesis of Compound of Formula Ia-1-1-20

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (0.173 mmol) and trichloroacetaic acid (0.032 mL, 0.173 mmol, 1.0 equiv.) were dissolved in toluene (1 mL), and allowed to reflux for 2.5 hours. The completion of the reaction was confirmed, and then the resulting solution was concentrated under reduced pressure and purified by silica gel column chromatography, thereby obtaining a compound represented by Formula Ia-1-1-20 (52.3 mg, 72.6%, yellow liquid).

¹H-NMR (500 MHz): CDCl₃ (δ) 8.63-8.59 (m, 2H), 7.98-7.95 (m, 1H), 7.71-7.68 (m, 1H), 6.72 (s, 1H), 4.26 (s, 3H), 4.04 (q, 2H), 1.28 (t, 3H)

Example 21

Synthesis of Compound of Formula Ia-1-1-21

Synthesis was performed by the same method as described in Example 1, except that Step 6 and Step 7 were modified as follows.

Step 6: Benzoic acid (0.315 mmol), EDCI·HCl (72.85 mg, 0.380 mmol, 1.2 equiv.) and hydroxybenzotriazole (HOBt, 58.0 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and reacted overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (107.3 g, 78.8%, colorless oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-21 (10.0 mg, 10.5%, yellow liquid).

¹H-NMR (500 MHz): CDCl₃ (δ) 8.55 (d, 1H), 8.44 (s, 1H), 8.24 (d, 2H), 7.58 (q, 4H), 7.35 (q, 1H), 6.52 (s, 1H), 4.29 (s, 3H), 3.99 (q, 2H), 1.27 (t, 3H)

Example 22

Synthesis of Compound of Formula Ia-1-1-22

Synthesis was performed by the same method as described in Example 1, except that Step 6 and Step 7 were modified as follows.

Step 6: Oxazole-4-carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (82.1 mg, 68%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-22 (10.0 mg, 8.7%, yellow liquid).

¹H-NMR (500 MHz): CDCl₃ (δ) 8.58 (d, 1H), 8.55-8.54 (m, 1H), 8.43 (d, 1H), 8.08 (d, 1H), 7.54-7.51 (m, 1H), 7.35-7.33 (m, 1H), 6.50 (s, 1H), 4.29 (s, 3H), 3.98 (q, 2H), 1.27 (t, 3H)

Example 23

Synthesis of Compound of Formula Ia-1-1-23

Synthesis was performed by the same method as described in Example 1, except that Step 6 and Step 7 were modified as follows.

Step 6: Oxazole-5-carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (86.9 g, 72%, brown oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-23 (29.5 mg, 25.6%, brown liquid).

$^1$H-NMR (500 MHz): CDCl$_3$ (δ) 8.56-8.54 (m, 1H), 8.42 (d, 1H), 8.17 (s, 1H), 8.06 (s, 1H), 7.55-7.53 (m, 1H), 7.36-7.28 (m, 1H), 6.51 (s, 1H), 4.28 (s, 3H), 3.98 (q, 2H), 1.26 (t, 3H)

Example 24

Synthesis of Compound of Formula Ia-1-1-24

Synthesis was performed by the same method as described in Example 1, except that Step 6 and Step 7 were modified as follows.

Step 6: 3-Fluorobenzoic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO$_4$, filtered and concentrated under reduced pressure, thereby obtaining an intermediate compound (110 mg), which was used for a subsequent reaction without additional purification.

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-24 (78.1 mg, 63.0%, yellow liquid).

$^1$H-NMR (500 MHz): CDCl$_3$ (δ) 8.56-8.54 (m, 1H), 8.44 (d, 1H), 8.29-8.26 (m, 1H), 7.64-7.59 (m, 1H), 7.54-7.52 (m, 1H), 7.36-7.32 (m, 2H), 7.31-7.28 (m, 1H), 6.51 (s, 1H), 4.30 (s, 3H), 3.99 (q, 2H), 1.27 (t, 3H)

Example 25

Synthesis of Compound of Formula Ia-1-1-25

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (100 mg, 0.347 mmol), tetrahydro-2H-pyran-4-carbonyl chloride (54.1 mg, 0.364 mmol, 1.05 equiv.) and TEA (0.053 mL, 0.382 mmol, 1.1 equiv.) were dissolved in DMF (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-25 (19.4 mg, 14.6% yellow liquid).

$^1$H-NMR (500 MHz): CDCl$_3$ (δ) 8.54-8.53 (m, 1H), 8.40 (d, 1H), 7.53-7.51 (m, 1H), 7.35-7.32 (m, 1H), 6.47 (s, 1H), 4.22 (s, 3H), 4.05-4.01 (m, 2H), 3.96 (q, 2H), 3.57-3.52 (m, 2H), 3.28-3.24 (m, 1H), 2.07-2.02 (m, 4H), 1.26-1.24 (t, 3H)

Example 26

Synthesis of Compound of Formula Ia-1-1-26

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (100 mg, 0.347 mmol), piperidine-1-carbonyl chloride (0.046 mL, 0.364 mmol, 1.05 equiv.) and TEA (0.053 mL, 0.382 mmol, 1.1 equiv.) were dissolved in DMF (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-26 (25.3 mg, 18.2% brown liquid).

$^1$H-NMR (500 MHz): CDCl$_3$ (δ) 8.62-8.61 (m, 1H), 8.40 (d, 1H), 7.54-7.51 (m, 1H), 7.40-7.38 (m, 1H), 6.23 (s, 1H), 4.07 (s, 3H), 3.94 (q, 2H), 3.17-3.15 (m, 2H), 1.57-1.54 (m, 4H), 1.26-1.23 (m, 7H)

Example 27

Synthesis of Compound of Formula Ia-1-1-27

Synthesis was performed by the same method as described in Example 1, except that Step 6 and Step 7 were modified as follows.

N-ethyl-2-(N'-hydroxycarbamimidoyl)-1-methyl-N-(pyridin-3-yl)-1H-imidazole-5-carboxamide (100 mg, 0.347 mmol), pyrrolidine-1-carbonyl chloride (0.041 mL, 0.364 mmol, 1.05 equiv.) and TEA (0.053 mL, 0.382 mmol, 1.1 equiv.) were dissolved in DMF (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-27 (58.2 mg, 43.5% yellow liquid).

$^1$H-NMR (500 MHz): CDCl$_3$ (δ) 8.59-8.58 (m, 1H), 8.37 (d, 1H), 7.52-7.50 (m, 1H), 7.38-7.35 (m, 1H), 6.21 (s, 1H), 4.04 (s, 3H), 3.91 (q, 2H), 3.35-3.33 (m, 4H), 1.81-1.78 (m, 4H), 1.22 (t, 3H)

Example 28

Synthesis of Compound of Formula Ia-1-1-28

Synthesis was performed by the same method as described in Example 1, except that Step 6 and Step 7 were modified as follows.

Step 6: Pyrimidine-5-carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO$_4$, filtered, concentrated under reduced pressure and purified by silica gel column chromatography, thereby obtaining a desired compound (89.4 mg, 72%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-28 (15.1 mg, 12.7%, yellow liquid).

¹H-NMR (500 MHz): CDCl₃ (δ) 9.52 (s, H), 9.43 (s, 1H), 8.55-8.54 (m, 1H), 8.41 (d, 1H), 7.56-7.53 (m, 1H), 7.36-7.34 (m, 1H), 6.51 (s, 1H), 4.29 (s, 3H), 3.98 (q, 2H), 1.26 (t, 3H)

Example 29

Synthesis of Compound of Formula Ia-1-1-29

Synthesis was performed by the same method as described in Example 1, except that Step 6 and Step 7 were modified as follows.

Step 6: Pyridazine-4-carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 1.1 mmol) in DCM (2 mL) was slowly added, and reacted overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (86.9 g, 70%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-29 (5.6 mg, 4.7%, yellow liquid).

¹H-NMR (500 MHz): CDCl₃ (δ) 9.94-9.93 (m, 1H), 9.53-9.52 (m, 1H), 8.57-8.56 (m, 1H), 8.41 (d, 1H), 8.22-8.20 (m, 1H), 7.57-7.55 (m, 1H), 7.38-7.35 (m, 1H), 6.53 (s, 1H), 4.31 (s, 3H), 4.00 (q, 2H), 1.28 (t, 3H)

Example 30

Synthesis of Compound of Formula Ia-1-1-30

Synthesis was performed by the same method as described in Example 1, except that Step 6 and Step 7 were modified as follows.

Step 6: Nicotinic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (102.9 g, 83%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-30 (35.0 mg, 30%, yellow liquid).

¹H-NMR (500 MHz): CDCl₃ (δ) 9.42 (d, 1H), 8.83-8.81 (m, 1H), 8.53-8.52 (m, 1H), 8.49-8.47 (m 1H), 8.41 (d, 1H), 7.54-7.47 (m, 2H), 7.34-7.32 (m, 1H), 6.50 (s, 1H), 4.27 (s, 3H), 3.96 (q, 2H), 1.25 (t, 3H)

Example 31

Synthesis of Compound of Formula Ia-1-1-31

Synthesis was performed by the same method as described in Example 1, except that Step 6 and Step 7 were modified as follows.

Step 6: Isonicotinic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 1.1 mmol) in DCM (1 mL) was slowly added, and reacted overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (101.61 g, 82%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-31 (38.1 mg, 32.2%, yellow liquid).

¹H-NMR (500 MHz): CDCl₃ (δ) 8.86-8.85 (m, 2H), 8.53-8.52 (m, 2H), 8.40 (d, 2H), 8.05-8.03 (m, 2H), 7.54-7.51 (m, 1H), 7.34-7.32 (m, 1H), 6.49 (s, 1H), 4.27 (s, 3H) 3.96 (q, 2H), 1.25 (t, 3H)

Example 32

Synthesis of Compound of Formula Ia-1-1-32

Synthesis was performed by the same method as described in Example 1, except that Step 6 and Step 7 were modified as follows.

Step 6: 1-(Pyridin-3-yl)cyclopropane-1-carboxylic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO₄, filtered, concentrated under reduced pressure and purified by silica gel column chromatography, thereby obtaining a desired compound (116.1 g, 85%, yellow oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-32 (27.1 mg, 20.7%, yellow liquid).

¹H-NMR (500 MHz): CDCl₃ (δ) 8.70 (d, 1H), 8.58-8.57 (m, 1H), 8.52-8.51 (m, 1H), 8.37 (d, 1H), 7.80-7.77 (m, 1H), 7.50-7.48 (m, 1H), 7.32-7.29 (m, 2H), 6.43 (s, 1H), 4.15 (s, 3H), 3.94 (q, 2H), 1.96 (q, 2H), 1.58 (q, 2H), 1.23 (t, 3H)

Example 33

Synthesis of Compound of Formula Ia-1-1-33
Synthesis was performed by the same method as described in Example 1, except that Step 6 and Step 7 were modified as follows.
N-ethyl-2-(N'-hydroxycarbamimidoyl)-1-methyl-N-(pyridin-3-yl)-1H-imidazole-5-carboxamide (0.347 mmol) and diisopropylmethanediimine (DIC, 0.11 mL, 0.728 mmol, 2.1 equiv.) were dissolved in toluene (1 mL), and allowed to reflux for 4 hours. The completion of the reaction was confirmed, and then the resulting solution was concentrated under reduced pressure and purified by silica gel column chromatography, thereby obtaining a compound represented by Formula Ia-1-1-33 (82.3 mg, 66.8%, yellow oil).
¹H-NMR (500 MHz): CDCl₃ (δ) 8.50-8.48 (m, 1H), 8.38 (d, 1H), 7.49-7.47 (m, 1H), 7.31-7.28 (m, 1H), 6.40 (s, 1H), 5.93 (d, 1H), 4.15 (s, 3H), 4.03-3.98 (m, 1H), 3.93 (q, 2H), 1.23-1.20 (m, 9H)

Example 34

Synthesis of Compound of Formula Ia-1-1-34
Synthesis was performed by the same method as described in Example 1, except that Step 6 and Step 7 were modified as follows.
N-ethyl-2-(N'-hydroxycarbamimidoyl)-1-methyl-N-(pyridin-3-yl)-1H-imidazole-5-carboxamide (0.347 mmol) and dicyclohexylmethanediimine (DCC, 150.29 mg. 0.728 mmol, 2.1 equiv.) were dissolved in toluene (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-34 (84.8 mg, 61.8%, yellow oil).
¹H-NMR (500 MHz): CDCl₃ (δ) 8.50-8.49 (m, 1H), 8.38 (d, 1H), 7.49-7.47 (m, 1H), 7.31-7.28 (m, 1H), 6.41 (s, 1H), 5.82 (d, 1H), 4.15 (s, 3H), 3.93 (q, 2H), 2.02-1.99 (m, 2H), 1.71-1.67 (m, 2H), 1.36-1.09 (m, 9H)

Example 35

Synthesis of Compound of Formula Ia-1-1-35
Synthesis was performed by the same method as described in Example 1, except that Step 6 and Step 7 were modified as follows.
N-ethyl-2-(N'-hydroxycarbamimidoyl)-1-methyl-N-(pyridin-3-yl)-1H-imidazole-5-carboxamide (0.432 mmol) and 1-ethyl-3-(3-dimethylaminopropyl)carbodiimide (EDCI, 0.2 mL) were dissolved in toluene (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-35 (68.2 mg, 41.7%, white solid).
¹H-NMR (500 MHz): CDCl₃ (δ) 8.51-8.50 (m, 1H), 8.40 (d, 1H), 7.49-7.47 (m, 1H), 7.32-7.29 (m, 1H), 6.90 (br s, 1H), 6.39 (s, 1H), 4.17 (s, 3H), 3.94 (q, 2H), 3.48-3.42 (m, 2H), 1.23 (t, 3H), 1.18 (t, 3H)

Example 36

Synthesis of Compound of Formula Ia-1-1-36
Synthesis was performed by the same method as described in Example 1, except that Step 6 and Step 7 were modified as follows.
N-ethyl-2-(N'-hydroxycarbamimidoyl)-1-methyl-N-(pyridin-3-yl)-1H-imidazole-5-carboxamide (100 mg, 0.347 mmol), 2-(1H-benzotriazole-1-yl)1,1,3,3-tetramethylaminium tetrafluoroborate (TBTU; 122.5 mg, 0.382 mmol. 1.1 equiv.) and DIPEA (0.121 mL, 0.694 mmol, 2.0 equiv.) were dissolved in DCM (1 mL), and reacted for 3.5 hours at room temperature. The completion of the reaction was confirmed, and then the resulting solution was concentrated under reduced pressure and purified by silica gel column chromatography, thereby obtaining a compound represented by Formula Ia-1-1-36 (95.0 mg, 80.2%, white solid).
¹H-NMR (500 MHz): CDCl₃ (δ) 8.49-8.47 (m, 1H), 8.37 (d, 1H), 7.47-7.45 (m, 1H), 7.29-7.26 (m, 1H), 6.39 (s, 1H), 4.14 (s, 3H), 3.92 (q, 2H), 3.15 (s, 6H), 1.20 (t, 3H)

Example 37

Synthesis of Compound of Formula Ia-1-1-37
Synthesis was performed by the same method as described in Example 1, except that Step 6 and Step 7 were modified as follows.
N-ethyl-2-(N'-hydroxycarbamimidoyl)-1-methyl-N-(pyridin-3-yl)-1H-imidazole-5-carboxamide (100 mg, 0.347 mmol) and morpholine-4-carboxyl chloride (0.061 mL, 0.520 mmol, 1.5 equiv.) were dissolved in pyridine (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-37 (3.0 mg, 2.3%, colorless oil).
¹H-NMR (500 MHz): CDCl₃ (δ) 8.53-8.52 (m, 1H), 8.41 (d, 1H), 7.51-7.48 (m, 1H), 7.33-7.27 (m, 1H), 6.44 (s, 1H), 4.19 (s, 3H), 3.96 (q, 2H), 3.79-3.77 (m, 4H), 3.71-3.69 (m, 4H), 1.25 (t, 3H)

Example 38

Synthesis of Compound of Formula Ia-1-1-38
Synthesis was performed by the same method as described in Example 1, except that Step 6 and Step 7 were modified as follows.
N-ethyl-2-(5-(isopropylamino)-1,2,4-oxadiazole-3-yl)-1-methyl-N-(pyridin-3-yl)-1H-imidazole-5-carboxamide (0.137 mmol), N,N-dimethyl-cyclohexylamine (0.05 mL, 0.343 mmol, 2.5 equiv.), dimethylaminopyridine (DMAP, 1.71 mg, 0.014 mmol, 0.1 equiv.) and acetic anhydride (0.03 mL, 0.274 mmol, 2.0 equiv.) were dissolved in DMF (0.5 mL), and allowed to reflux. The completion of the reaction was confirmed, and then the resulting solution was concentrated under reduced pressure and purified by silica gel column chromatography, thereby obtaining a compound represented by Formula Ia-1-1-38 (46.4 mg, 85.2%, yellow liquid).
¹H-NMR (500 MHz): CDCl₃ (δ) 8.55-8.54 (m, 1H), 8.39 (d, 1H), 7.56-7.54 (m, 1H), 7.37-7.34 (m, 1H), 6.49 (s, 1H), 5.08-5.02 (m, 1H), 4.24 (s, 3H), 3.97 (q, 2H), 2.38 (s, 3H), 1.36 (s, 3H), 1.35 (s, 3H), 1.26 (t, 3H)

Example 39

Synthesis of Compound of Formula Ia-1-1-39

Synthesis was performed by the same method as described in Example 1, except that Step 6 and Step 7 were modified as follows. 2-(5-(cyclohexylamino)-1,2,4-oxadiazole-3-yl)-N-ethyl-1-methyl-N-(pyridin-3-yl)-1H-imidazole-5-carboxamide (0.101 mmol), N,N-dimethyl-cyclohexylamine (0.04 mL, 0.253 mmol, 2.5 equiv.), DMAP (1.22 mg, 0.010 mmol, 0.1 equiv.) and acetic anhydride (0.02 mL, 0.202 mmol, 2.0 equiv.) were dissolved in DMF (0.5 mL), and allowed to reflux. The completion of the reaction was confirmed, and then the resulting solution was concentrated under reduced pressure and purified by silica gel column chromatography, thereby obtaining a compound represented by Formula Ia-1-1-39 (38.4 mg, 86.8%, yellow liquid).

$^1$H-NMR (500 MHz): CDCl$_3$ (δ) 8.54-8.52 (m, 1H), 8.38 (d, 1H), 7.55-7.53 (m, 1H), 7.36-7.33 (m, 1H), 6.48 (s, 1H), 4.61-4.56 (m, 1H), 4.22 (q, 2H), 3.96 (q, 2H), 2.29 (s, 3H), 1.78 (d, 4H), 1.71-1.61 (m, 3H), 1.37-1.34 (m, 2H), 1.25 (t, 3H), 1.13-1.10 (m, 1H)

Example 40

Synthesis of Compound of Formula Ia-1-1-40

Synthesis was performed by the same method as described in Example 1, except that Step 6 and Step 7 were modified as follows.

Step 6: 2-(ethylthio)nicotinic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO$_4$, filtered and concentrated under reduced pressure, thereby obtaining an intermediate compound, which was used for a subsequent reaction without additional purification.

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-40 (98.8 mg, 72%, colorless oil).

$^1$H-NMR (500 MHz): CDCl$_3$ (δ) 8.63-8.62 (m, 1H), 8.56-8.55 (m, 1H), 8.44-8.41 (m, 2H), 7.54-7.52 (m, 1H), 7.36-7.33 (m, 1H), 7.17-7.14 (m, 1H), 6.53 (s, 1H), 4.33 (s, 3H), 3.99 (q, 2H), 3.29 (q, 2H), 1.40 (t, 3H), 1.27 (t, 3H)

Example 41

Synthesis of Compound of Formula Ia-1-1-41

Synthesis was performed by the same method as described in Example 1, except that Step 6 and Step 7 were modified as follows.

N-ethyl-2-(5-(isopropylamino)-1,2,4-oxadiazole-3-yl)-1-methyl-N-(pyridin-3-yl)-1H-imidazole-5-carboxamide (0.312 mmol), N,N-dimethyl-cyclohexylamine (0.12 mL, 0.781 mmol, 2.5 equiv.), DMAP (3.82 mg, 0.031 mmol, 0.1 equiv.) and pivaloyl chloride (0.08 mL, 0.625 mmol, 2.0 equiv.) were dissolved in DMF (0.5 mL), and allowed to reflux. The completion of the reaction was confirmed, and then the resulting solution was concentrated under reduced pressure and purified by silica gel column chromatography, thereby obtaining a compound represented by Formula Ia-1-1-41 (82.5 mg, 60.1%, yellow liquid).

$^1$H-NMR (500 MHz): CDCl$_3$ (δ) 8.53-8.51 (m, 1H), 8.37 (d, 1H), 7.55-7.53 (m, 1H), 7.34-7.32 (m, 1H), 6.46 (s, 1H), 4.84-4.79 (m, 1H), 4.22 (s, 3H), 3.95 (q, 2H), 1.25-1.19 (m, 9H), 1.12 (s, 9H)

Example 42

Synthesis of Compound of Formula Ia-1-1-42

Synthesis was performed by the same method as described in Example 1, except that Step 6 and Step 7 were modified as follows.

N-ethyl-2-(5-(isopropylamino)-1,2,4-oxadiazole-3-yl)-1-methyl-N-(pyridin-3-yl)-1H-imidazole-5-carboxamide (0.328 mmol), ethyl chloroformate (0.03 mL, 0.328 mmol, 1.0 equiv.) and DIPEA (0.06 mL, 0.328 mmol, 1.0 equiv.) were dissolved in acetone (1.0 mL), and allowed to reflux. The completion of the reaction was confirmed, and then the resulting solution was concentrated under reduced pressure and purified by silica gel column chromatography, thereby obtaining a compound represented by Formula Ia-1-1-42 (86.5 mg, 61.6%, yellow liquid).

$^1$H-NMR (500 MHz): CDCl$_3$ (δ) 8.53-8.52 (m, 1H), 8.39 (d, 1H), 7.52-7.50 (m, 1H), 7.34-7.31 (m, 1H), 6.46 (s, 1H), 4.84-4.79 (m, 1H), 4.30 (q, 2H), 4.21 (s, 3H), 3.95 (q, 2H), 1.39 (s, 3H), 1.38 (s, 3H), 1.31 (t, 3H), 1.24 (t, 3H)

Example 43

Synthesis of Compound of Formula Ia-1-1-43

Synthesis was performed by the same method as described in Example 1, except that Step 6 and Step 7 were modified as follows.

Step 6: 2-(Ethylthio)benzoic acid (0.315 mmol), EDCI·HCl (72.85 mg, 0.380 mmol, 1.2 equiv.) and HOBt (58 mg, 0.380 mmol, 1.2 equiv.) were dissolved in DCM (2 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (100 mg, 0.347 mmol) in DCM (1 mL) was slowly added, and allowed to react overnight at room temperature. The completion of the reaction was confirmed, and then the resulting product was washed with water, and subjected to extraction with DCM. After layer separation, an organic layer was dried with anhydrous MgSO$_4$, filtered, concentrated under reduced pressure and purified by silica gel column chromatography, thereby obtaining a desired compound (107.0 mg, 75.1%, light yellow solid).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-43 (28.3 mg, 20.7%, colorless oil).

$^1$H-NMR (500 MHz): CDCl$_3$ (δ) 8.55-8.54 (m, 1H), 8.44-8.43 (m, 1H), 8.17-8.15 (m, 1H), 7.54-7.50 (m, 2H), 7.44-7.43 (m, 1H), 7.35-7.33 (m, 1H), 7.29-7.28 (m, 1H), 6.52 (s, 1H), 4.32 (s, 3H), 3.98 (q, 2H), 3.03 (q, 2H), 1.38 (t, 3H), 1.27 (t, 3H)

Example 44

Synthesis of Compound of Formula Ia-1-1-44

Synthesis was performed by the same method as described in Example 1, except that Step 6 and Step 7 were modified as follows.

The Ia-1-1-43 compound (0.046 mmol) and mCPBA (19.86 mg, 0.115 mmol, 2.5 equiv.) were dissolved in DCM (1 mL), and then reacted overnight at room temperature. The resulting product was washed with water, and subjected to layer separation, and then an organic layer was dried with anhydrous $MgSO_4$, filtered and concentrated under reduced pressure and purified by silica gel column chromatography, thereby obtaining a compound represented by Formula Ia-1-1-44 (16 mg, 74.5%, colorless oil).

$^1$H-NMR (500 MHz): $CDCl_3$ (δ) 8.23-8.21 (m, 1H), 8.14-8.13 (m, 2H), 7.92-7.90 (m, 1H), 7.84-7.82 (m, 2H), 7.30-7.27 (m, 1H), 7.10-7.08 (m, 1H), 6.82 (s, 1H), 4.26 (s, 3H), 3.95 (q, 2H), 3.64 (q, 2H), 1.35 (t, 3H), 1.27 (t, 3H)

Example 45

Synthesis of Compound of Formula Ia-1-1-45

N-ethyl-2-(N'-hydroxycarbamimidoyl)-1-methyl-N-(pyridin-3-yl)-1H-imidazole-5-carboxamide (100 mg) was dissolved in 1,4-dioxane (5 ml) and N-methyl-2-pyrrolidone (0.5 mL), and then cooled using ice water. Pyridine (0.06 mL) and 4-(dimethylamino)benzoyl chloride (76.4 mg) were slowly added dropwise to the cooled solution. Afterward, the temperature was raised to room temperature, followed by stirring overnight. After the reaction, the resulting product was concentrated under reduced pressure and purified by silica gel column chromatography, thereby obtaining an intermediate (116.2 mg, 80.3%, white solid).

The intermediate was dissolved in toluene (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-45 (8.9 mg, 7.9%, white solid).

$^1$H-NMR (500 MHz): $CDCl_3$ (δ) 8.54-8.53 (m, 1H), 8.44 (d, 1H), 8.07 (s, 1H), 8.06 (s, 1H), 7.52-7.50 (m, 1H), 7.34-7.31 (m, 1H), 6.74 (s, 1H), 6.72 (s, 1H), 6.49 (s, 1H), 4.28 (s, 3H), 3.98 (q, 2H), 3.08 (s, 6H), 1.26 (t, 3H)

Example 46

Synthesis of Compound of Formula Ia-1-1-46

N-ethyl-2-(N'-hydroxycarbamimidoyl)-1-methyl-N-(pyridin-3-yl)-1H-imidazole-5-carboxamide (100 mg) was dissolved in 1,4-dioxane (5 ml) and N-methyl-2-pyrrolidone (0.5 mL), and then cooled using ice water. Pyridine (0.06 mL) and 2-ethoxybezoyl chloride (0.06 mL) are slowly added dropwise to the cooled solution. Afterward, the temperature was raised to room temperature, followed by stirring overnight. After the reaction, the resulting solution was concentrated under reduced pressure and purified by silica gel column chromatography, thereby obtaining an intermediate (339.6 mg, NMP mixture, colorless liquid). The intermediate was dissolved in toluene (1 mL), and allowed to reflux overnight. The completion of the reaction was confirmed, and then the resulting solution was concentrated under reduced pressure and purified by silica gel column chromatography, thereby obtaining a compound represented by Formula Ia-1-1-46 (37.2 mg, 25.6%, white solid).

$^1$H-NMR (500 MHz): $CDCl_3$ (δ) 8.56 (d, 1H), 8.50 (br s, 1H), 8.23 (d, 1H), 7.68 (br s, 1H), 7.54 (t, 1H), 7.47 (br s, 1H), 7.08-7.05 (m, 1H), 6.61 (s, 1H), 4.31 (s, 3H), 4.2 (q, 2H), 4.01 (q, 2H), 1.53 (t, 3H), 1.28 (t, 3H)

Example 47

Synthesis of Compound of Formula Ia-1-1-47

Synthesis was performed by the same method as described in Example 1, except that Step 6 and Step 7 were modified as follows.

Step 6: 1-(tert-butoxycarbonyl)pyrrolidine-3-carboxylic acid (135.7 mg), EDCI·HCl (145.1 mg, 0.757 mmol, 1.2 equiv.) and HOBt (102.3 mg, 0.757 mmol, 1.2 equiv.) were dissolved in DCM (3 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (200 mg, 0.694 mmol, 1.1 equiv.) in DCM (1 mL) was slowly added, and reacted overnight at room temperature. The completion of the reaction was confirmed, and then the resulting product was washed with water, and subjected to extraction with DCM. After layer separation, an organic layer was dried with anhydrous $MgSO_4$, filtered, concentrated under reduced pressure and purified by silica gel column chromatography, thereby obtaining a desired compound (295.4 mg, 96.5%, colorless oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-47 (212.4 mg, 74.7%, yellow liquid).

$^1$H-NMR (500 MHz): $CDCl_3$ (δ) 8.47 (d, 1H), 8.34 (s, 1H), 7.49-7.47 (m, 1H), 7.30-7.27 (m, 1H), 6.41 (s, 1H), 4.16 (s, 3H), 3.90 (q, 2H), 3.80-3.37 (m, 6H), 2.35-2.31 (m, 2H), 1.39 (s, 9H), 1.19 (t, 3H)

Example 48

Synthesis of Compound of Formula Ia-1-1-48

The tert-butyl 3-(3-(5-(ethyl(pyridin-3-yl)carbamoyl)-1-methyl-1H-imidazol-2-yl)-1,2,4-oxadiazole-5-yl)pyrrolidine-1-carboxylate prepared according to Example 47 (82.2 mg) and triethylamine (TEA, 1.5 mL) were dissolved in DCM (1.5 mL) and reacted at room temperature for 3 hours. After the reaction, the resulting solution was neutralized with a $NaHCO_3$ aqueous solution and concentrated under reduced pressure and purified by silica gel column chromatography, thereby obtaining a compound represented by Formula Ia-1-1-48 (44.7 mg, 69.2%, pale yellow oil).

$^1$H-NMR (500 MHz): $CDCl_3$ (δ) 8.52-8.51 (m, 1H), 8.37 (d, 1H), 7.53-7.51 (m, 1H), 7.34-7.32 (m, 1H), 6.45 (s, 1H), 4.19 (s, 3H), 3.96 (q, 2H), 3.86-3.82 (m, 1H), 3.73-3.69 (m, 1H), 3.46 (t, 2H), 2.61-2.54 (m, 1H), 2.40-2.33 (m, 1H), 1.24 (t, 3H)

Example 49

Synthesis of Compound of Formula Ia-1-1-49

Synthesis was performed by the same method as described in Example 1, except that Step 6 and Step 7 were modified as follows.

Step 6: 1-(tert-butoxycarbonyl)piperidine-4-carboxylic acid (144.67 mg), EDCI·HCl (145.1 mg, 0.757 mmol, 1.2 equiv.) and HOBt (102.3 mg, 0.757 mmol, 1.2 equiv.) were dissolved in DCM (3 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (200 mg, 0.694 mmol, 1.1 equiv.) in DCM (1 mL) was slowly added, and reacted at room temperature overnight. The completion of the reaction was confirmed, and then the resulting product was washed with water, and subjected to extraction with DCM. After layer separation, an organic layer was dried with anhydrous $MgSO_4$, filtered, concentrated under reduced pressure and purified by silica gel column chromatography, thereby obtaining a desired compound (265.7 g, 84.3%, colorless oil).

Step 7: The compound obtained in Step 6 was dissolved in toluene (1 mL) and allowed to reflux overnight. The completion of the reaction was confirmed, and then the resulting solution was concentrated under reduced pressure and purified by silica gel column chromatography, thereby obtaining a compound represented by Formula Ia-1-1-49 (214.8 mg, 70.7%, yellow oil).

$^1$H-NMR (500 MHz): $CDCl_3$ (δ) 8.53-8.52 (m, 1H), 8.41 (d, 1H), 7.56-7.54 (m, 1H), 7.37-7.34 (m, 1H), 6.48 (s, 1H), 4.21 (s, 3H), 4.08 (br s, 2H), 3.96 (q, 2H), 3.19-3.13 (m, 1H), 2.97-2.93 (m, 2H), 2.01-2.07 (m, 2H), 1.91-1.83 (m, 2H), 1.44 (s, 9H), 1.24 (t, 3H)

Example 50

Synthesis of Compound of Formula Ia-1-1-50

The tert-butyl 4-(3-(5-(ethyl(pyridin-3-yl)carbamoyl)-1-methyl-1H-imidazole-2-yl)-1,2,4-oxadiazole-5-yl)piperidine-1-carboxylate prepared according to Example 49 (118.2 mg) and TEA (2.0 mL) were dissolved in DCM (2.0 mL), and reacted at room temperature for 3 hours. After the reaction, the resulting solution was neutralized with a $NaHCO_3$ aqueous solution, concentrated under reduced pressure and purified by silica gel column chromatography, thereby obtaining a compound represented by Formula Ia-1-1-50 (35.0 mg, 37.4%, yellow oil).

$^1$H-NMR (500 MHz): $CDCl_3$ (δ) 8.52-8.51 (m, 1H), 8.37 (d, 1H), 7.53-7.52 (m, 1H), 7.34-7.32 (m, 1H), 6.45 (s, 1H), 4.21 (s, 3H), 3.95 (q, 2H), 3.44-3.32 (m, 3H), 3.11-3.06 (m, 2H), 2.36-2.33 (m, 2H), 2.26-2.19 (m, 2H), 1.24 (t, 3H)

Example 51

Synthesis of Compound of Formula Ia-1-1-51

Synthesis was performed by the same method as described in Example 1, except that Step 6 and Step 7 were modified as follows.

Step 6: (tert-butoxycarbonyl)proline (135.78 mg), EDCI·HCl (145.1 mg, 0.757 mmol, 1.2 equiv.) and HOBt (102.3 mg, 0.757 mmol, 1.2 equiv.) were dissolved in DCM (3 mL), and reacted at room temperature for 1 hour. A solution prepared by dissolving N-ethyl-2-(N'-hydroxycarbamimidoyl)-1-methyl-N-(pyridin-3-yl)-1H-imidazole-5-carboxamide (200 mg, 0.694 mmol, 1.1 equiv.) in DCM (1 mL) was slowly added, and allowed to react overnight at room temperature. After the reaction, the resulting product was washed with water, followed by extraction with DCM. After layer separation, an organic layer was dried with anhydrous $MgSO_4$, filtered, concentrated under reduced pressure and purified by silica gel column chromatography, thereby obtaining a desired compound (225.1 g, 73.5%, white oil).

Step 7: The compound obtained in Step 6 was dissolved in toluene (1 mL), and allowed to reflux overnight. The completion of the reaction was confirmed, and then the resulting product was concentrated under reduced pressure and purified by silica gel column chromatography, thereby obtaining a compound represented by Formula Ia-1-1-51 (191.6 mg, 65.0%, yellow oil).

$^1$H-NMR (500 MHz): $CDCl_3$ (δ) 8.50 (br s, 1H), 8.38 (d, 1H), 7.54-7.47 (m, 1H), 7.34-7.31 (m, 1H), 6.44 (s, 1H), 5.16-5.04 (m, 1H), 4.18 (d, 3H), 3.93 (q, 2H), 3.65-3.61 (m, 1H), 3.53-3.39 (m, 1H), 2.38-2.30 (m, 1H), 2.14-2.05 (m, 2H), 1.97-1.92 (m, 1H), 1.40 (s, 4H), 1.26 (s, 5H), 1.229 (t, 3H)

Example 52

Synthesis of Compound of Formula Ia-1-1-52

The tert-butyl 2-(3-(5-(ethyl(pyridin-3-yl)carbamoyl)-1-methyl-1H-imidazole-2-yl)-1,2,4-oxadiazole-5-yl)pyrrolidine-1-carboxylate prepared according to Example 51 (93.3 mg) and TEA (1.5 mL) were dissolved in DCM (1.5 mL), and reacted at room temperature for 3 hours. After the reaction, the resulting solution was neutralized with a $NaHCO_3$ aqueous solution, concentrated under reduced pressure and purified by silica gel column chromatography, thereby obtaining a compound represented by Formula Ia-1-1-52 (60.2 mg, 82.1%, yellow oil).

$^1$H-NMR (500 MHz): $CDCl_3$ (δ) 8.53-8.52 (m, 1H), 8.39 (d, 1H), 7.50-7.48 (m, 1H), 7.33-7.31 (m, 1H), 6.49 (s, 1H), 4.76-4.74 (m, 1H), 4.21 (s, 3H), 3.96 (q, 2H), 3.31-3.19 (m, 2H), 2.44-2.37 (m, 1H), 2.26-2.19 (m, 1H), 2.05-1.96 (m, 2H), 1.24 (t, 3H)

Example 53

Synthesis of Compound of Formula Ia-1-2-1

1-Methylthiourea (71 mg, 0.7835 mmol) was dissolved in dimethyl sulfoxide (DMSO, 0.5 mL), potassium tert-butoxide (88 mg, 0.7835 mmol) was added, and then stirred at room temperature for 5 minutes, followed by addition of the 2-cyano-N-ethyl-1-methyl-N-(pyridin-3-yl)-1H-imidazole-5-carboxamide (100 mg, 0.3917 mmol) obtained by sequentially performing Steps 1, 2, 3 and 4 of Example 1. The resulting product was stirred at room temperature for 3 hours, and $H_2O$ (5.0 mL) was added to terminate the reaction. The resulting product was extracted with ethyl acetate (5.0 mL×2), and a combined organic layer was dried with anhydrous $MgSO_4$ and then filtered. A filtrate was concentrated under reduced pressure, thereby obtaining an intermediate compound (110 mg) for the use of a subsequent reaction without additional purification.

The intermediate compound obtained thereby (110 mg, 0.3184 mmol) was dissolved in DMSO (0.5 mL), followed by addition of $H_2O$ (0.05 mL). Iodine (178 mg, 0.7006 mmol) and potassium hydroxide (36 mg, 0.6368 mmol) were added, and stirred at room temperature for 24 hours. After the reaction is completed, the reaction was terminated by adding a saturated $Na_2S_2O_3$ aqueous solution (5.0 mL), and extraction was performed with ethyl acetate (5.0 mL×2). A combined organic layer was dried with anhydrous $MgSO_4$, filtered, concentrated under reduced pressure and purified by silica gel column chromatography, thereby obtaining a compound represented by Formula Ia-1-2-1 (30.5 mg, 28%, white solid).

$^1$H-NMR (500 MHz): $CDCl^3$ (δ) 8.51-8.50 (m, 1H), 8.42 (d, 1H), 7.66 (s, 1H), 7.49-7.46 (m, 1H), 7.31-7.29 (m, 1H), 6.39 (s, 1H), 4.28 (s, 3H), 3.96 (q, 2H), 2.96 (d, 3H), 1.25 (t, 3H)

Example 54

Synthesis of Compound of Formula Ia-1-2-2

1-Ethyl thiourea (41 mg, 0.3917 mmol) was dissolved in DMSO (0.3 mL), potassium tert-butoxide (44 mg, 0.3917 mmol) was added, the resulting solution was stirred at room temperature for 10 minutes, and then the 2-cyano-N-ethyl-1-methyl-N-(pyridin-3-yl)-1H-imidazole-5-carboxamide (50 mg, 0.1959 mmol) obtained by sequentially performing Steps 1, 2, 3 and 4 of Example 1 was added. The resulting product was stirred at room temperature for 3 hours, and the reaction was terminated by adding $H_2O$ (0.5 mL). Extraction was performed with ethyl acetate (5.0 mL×2), and a combined organic layer was dried with anhydrous $MgSO_4$ and then filtrated. The filtrate was concentrated under reduced pressure, thereby obtaining an intermediate compound, which was used for a subsequent reaction without additional purification.

The intermediate compound obtained thereby was dissolved in DMSO (0.5 mL), followed by addition of $H_2O$ (0.05 mL). Iodine (109 mg, 0.4310 mmol) and potassium hydroxide (22 mg, 0.3917 mmol) were added, followed by stirring at room temperature for 24 hours. After the reaction is completed, the reaction was terminated by adding a saturated $Na_2S_2O_3$ aqueous solution (5.0 mL), and extraction was performed with ethyl acetate (5.0 mL×2). A combined organic layer was dried with anhydrous $MgSO_4$, filtered, concentrated under reduced pressure and purified by silica gel column chromatography, thereby obtaining a compound represented by Formula Ia-1-2-2 (19.5 mg, 28%, ivory solid).

$^1$H-NMR (500 MHz): $CDCl_3$ (δ) 8.50-8.49 (m, 1H), 8.40 (d, 1H), 7.48-7.46 (m, 1H), 7.40 (s, 1H), 7.30-7.27 (m, 1H), 6.36 (s, 1H), 4.25 (s, 3H), 3.95 (q, 2H), 3.30-3.24 (m, 2H), 1.23 (t, 3H), 1.17 (t, 3H)

Example 55

Synthesis of Compound of Formula Ia-1-2-3

1-(2-Bromophenyl)thiourea (91 mg, 0.3917 mmol) was dissolved in DMSO (0.3 mL), potassium tert-butoxide (44 mg, 0.3917 mmol) was added, the resulting product was stirred at room temperature for 10 minutes, and the 2-cyano-N-ethyl-1-methyl-N-(pyridin-3-yl)-1H-imidazole-5-carboxamide (50 mg, 0.1959 mmol) obtained by sequentially performing Steps 1, 2, 3 and 4 of Example 1 was added. The resulting product was stirred at room temperature for 3 hours, and the reaction was terminated by adding $H_2O$ (0.5 mL). Extraction was performed with ethyl acetate (5.0 mL×2), and a combined organic layer was dried with anhydrous $MgSO_4$ and filtered. A filtrate was concentrated under reduced pressure, thereby obtaining an intermediate compound, which was used for a subsequent reaction without additional purification.

The intermediate compound obtained thereby was dissolved in DMSO (0.5 mL), followed by addition of $H_2O$ (0.05 mL). Iodine (109 mg, 0.4310 mmol) and potassium hydroxide (22 mg, 0.3917 mmol) were added, followed by stirring at room temperature for 24 hours. After the reaction is completed, the reaction was terminated by adding a saturated $Na_2S_2O_3$ aqueous solution (5.0 mL), and extraction was performed with ethyl acetate (5.0 mL×2). A combined organic layer was dried with anhydrous $MgSO_4$, filtered, concentrated under reduced pressure and purified by silica gel column chromatography, thereby obtaining a compound represented by Formula Ia-1-2-3 (33.4 mg, 35%, ivory solid).

$^1$H-NMR (500 MHz): $CDCl_3$ (δ) 8.51-8.49 (m, 1H), 8.40 (d, 1H), 7.60-7.58 (m, 1H), 7.53-7.51 (m, 1H), 7.49-7.46 (m, 1H), 7.40-7.36 (m, 1H), 7.31-7.28 (m, 1H), 7.04-7.01 (m, 1H), 6.33 (s, 1H), 4.29 (s, 3H), 3.95 (q, 2H), 3.45 (s, 1H), 1.23 (t, 3H)

Example 56

Synthesis of Compound of Formula Ia-1-3-1

A 1-methyl-1H-imidazole-5-carbonyl chloride HCl salt (2.01 g) was dissolved in DCM (20 mL). A solution prepared by dissolving N-methylpyridine-3-amine (1.0 g) and N,N-diisopropylethylamine (DIPEA, 6.44 mL) in DCM (10 mL) was slowly added dropwise to a solution cooled using ice water. Afterward, the temperature was raised to room temperature, followed by a reaction at room temperature for 30 minutes. The reaction was further performed for 2 hours after increasing the temperature to 50° C., followed by cooling to room temperature. After the reaction was completed, the resulting product was quenched with water, and extracted with DCM. An organic layer was dried with anhydrous $MgSO_4$, filtered, concentrated, and purified by silica gel column chromatography, thereby obtaining a desired compound (816.4 mg, 40.8%, brown liquid).

N,1-dimethyl-N-(pyridin-3-yl)-1H-imidazole-5-carboxamide (816 mg) and paraformaldehyde (3.67 g) were dissolved in methanol (2 mL). The temperature was raised to 140° C., followed by a reaction for 3 days. After the termination of the reaction, the resulting solution was cooled to room temperature, concentrated under reduced pressure and purified by silica gel column chromatography, thereby obtaining a desired compound (572 mg, 58.2%, brown liquid).

2-(Hydroxymethyl)-N,1-dimethyl-N-(pyridin-3-yl)-1H-imidazole-5-carboxamide (480.0 mg) was dissolved in THF (50 mL). $MnO_2$ (802.4 mg) was slowly added dropwise, followed by stirring overnight at room temperature. After the termination of the reaction, the resulting solution was filtered, concentrated under reduced pressure and purified by silica gel column chromatography, thereby obtaining a desired compound (198.9 mg, 42.2%, yellow liquid).

2-Formyl-N,1-dimethyl-N-(pyridin-3-yl)-1H-imidazole-5-carboxamide (100 mg) and cyclopropane carbohydrazide (45.1 mg) were dissolved in ethanol (1 mL), and allowed to react overnight at room temperature. After the completion of the reaction was confirmed, the resulting product was concentrated under reduced pressure and purified by silica gel column chromatography, thereby obtaining a desired compound (99.3 mg, 74.3%, colorless oil).

(E)-2-((2-(cyclopropanecarbonyl)hydrazinylidene)methyl)-N,1-dimethyl-N-(pyridin-3-yl)-1H-imidazole-5-carboxamide (40 mg), $I_2$ (37.33 mg) and $K_2CO_3$ (50.82 mg) were dissolved in 1,4-dioxane (1 mL), followed by stirring overnight at 80° C. After the termination of the reaction, a 5% $NaS_2O_3$ aqueous solution was added, followed by extraction with DCM. An organic layer was dried with anhydrous $MgSO_4$, filtered, concentrated and purified by silica gel column chromatography, thereby obtaining a compound represented by Formula Ia-1-3-1 (31.0 mg, 78.1%, yellow liquid).

$^1$H-NMR (500 MHz): $CDCl_3$ (δ) 8.52-8.51 (m, 1H), 8.42 (d, 1H), 7.53-7.51 (m 1H), 7.33-7.30 (m, 1H), 6.43 (s, 1H), 4.30 (s, 3H), 3.49 (s, 3H), 2.24-2.18 (m, 1H), 1.23-1.15 (m, 4H)

Example 57

Synthesis of Compound of Formula Ia-1-3-2

N-ethyl-1-methyl-N-(pyridin-3-yl)-1H-imidazole-5-carboxamide (2.0 g) and paraformaldehyde (9.0 g) were dissolved in methanol (20 mL). The temperature was raised to 140° C., followed by a reaction for 3 days. After the termination of the reaction, the resulting solution was cooled to room temperature, concentrated under reduced pressure and purified by silica gel column chromatography, thereby obtaining a desired compound (1.97 g, 43.6%, yellow liquid).

N-ethyl-2-(hydroxymethyl)-1-methyl-N-(pyridin-3-yl)-1H-imidazole-5-carboxamide (400 mg) was dissolved in THF (10 mL). $MnO_2$ (667.8 mg) was slowly added dropwise, followed by stirring overnight at room temperature. After the termination of the reaction, the resulting solution was filtered, concentrated under reduced pressure and purified by silica gel column chromatography, thereby obtaining a desired compound (310.2 mg, 78.2%, white solid).

N-ethyl-2-formyl-1-methyl-N-(pyridin-3-yl)-1H-imidazole-5-carboxamide (150 mg) and cyclopropanecarbohydrazide (64.0 mg) were dissolved in ethanol (1 mL), and allowed to react overnight at room temperature. After the completion of the reaction was confirmed, the resulting product was concentrated under reduced pressure and purified by silica gel column chromatography, thereby obtaining a compound (104.8 mg, 53.0%, white solid).

(E)-2-((2-(cyclopropanecarbonyl)hydrazinylidene)methyl)-N-ethyl-1-methyl-N-(pyridin-3-yl)-1H-imidazole-5-carboxamide (82.3 mg), $I_2$ (73.64 mg) and $K_2CO_3$ (100.25 mg) was dissolved in 1,4-dioxane (1 mL), followed by stirring overnight at 80° C. After the termination of the reaction, a 5% $NaS_2O_3$ aqueous solution was added, followed by extraction with DCM. An organic layer was dried with anhydrous $MgSO_4$, filtered, concentrated under reduced pressure and purified by silica gel column chromatography, thereby obtaining a compound of Formula Ia-1-3-2 (66.7 mg, 81.5%, yellow liquid).

$^1$H-NMR (500 MHz): $CDCl_3$ (δ) 8.53-8.51 (m, 1H), 8.38 (d, 1H), 7.51-7.48 (m 1H), 7.33-7.31 (m, 1H), 6.39 (s, 1H), 4.29 (s, 3H), 3.94 (q, 2H), 2.23-2.17 (m, 1H), 1.23 (t, 3H), 1.21-1.14 (m, 4H)

Example 58

Synthesis of Compound of Formula Ia-1-3-3

N-ethyl-1-methyl-N-(pyridin-3-yl)-1H-imidazole-5-carboxamide (2.0 g) and paraformaldehyde (9.0 g) were dissolved in methanol (20 mL). The temperature was raised to 140° C., followed by a reaction for 3 days. After the completion of the reaction, the resulting solution was cooled to room temperature, concentrated under reduced pressure and purified by silica gel column chromatography, thereby obtaining a desired compound (1.97 g, 43.6%, yellow liquid).

N-ethyl-2-(hydroxymethyl)-1-methyl-N-(pyridin-3-yl)-1H-imidazole-5-carboxamide (400 mg) was dissolved in THF (10 mL). $MnO_2$ (667.8 mg) was slowly added dropwise, followed by stirring overnight at room temperature. After the termination of the reaction, the resulting solution was filtered, concentrated under reduced pressure and purified by silica gel column chromatography, thereby obtaining a desired compound (310.2 mg, 78.2%, white solid).

N-ethyl-2-formy-1-methyl-N-(pyridin-3-yl)-1H-imidazole-5-carboxamide (150 mg) and acetohydrazide (47.3 mg) were dissolved in ethanol (1 mL), and allowed to react overnight at room temperature. After the completion of the reaction was confirmed, the resulting product was concentrated under reduced pressure and purified by silica gel column chromatography, thereby obtaining a desired compound (169.1 mg, 92.6%, colorless oil).

(E)-2-((2-acetylhydrazinylidene)methyl)-N-ethyl-1-methyl-N-(pyridin-3-yl)-1H-imidazole-5-carboxamide (132.2 mg), $I_2$ (128.1 mg) and $K_2CO_3$ (174.4 mg) were dissolved in 1,4-dioxane (1 mL), followed by stirring overnight at 80° C. After the termination of the reaction, a 5% $NaS_2O_3$ aqueous solution was added, followed by extraction with DCM. An organic layer was dried with anhydrous $MgSO_4$, filtered, concentrated and purified by silica gel column chromatography, thereby obtaining a compound of Formula Ia-1-3-3 (108.9 mg, 83.1%, yellow liquid).

$^1$H-NMR (500 MHz): $CDCl_3$ (δ) 8.54-8.53 (m, 1H), 8.39 (d, 1H), 7.52-7.50 (m 1H), 7.34-7.32 (m, 1H), 6.41 (s, 1H), 4.31 (s, 3H), 3.95 (q, 2H), 2.58 (s, 3H), 1.24 (t, 3H)

Example 59

Synthesis of Compound of Formula Ia-1-4-1

Step 1: After 1-methyl-1H-imidazole-5-carboxylic acid (37.80 g, 300.0 mmol) was dissolved in acetonitrile (400 mL) under ice-bath cooling, oxalyl chloride (30.5 mL, 360.0 mmol) was added dropwise for 10 minutes, and then N,N-dimethylformamide (0.5 mL, mmol) was added dropwise. The temperature of reaction mixture was raised to room temperature, followed by stirring at room temperature for 5 hours. After the reaction was completed, the reaction mixture was concentrated under reduced pressure, and a residue was dispersed in isopropyl ether (200 mL), followed by stirring for 15 minutes. The produced solid was filtered, washed with isopropyl ether (100 mL) and dried, thereby obtaining a desired compound (1) (53.92 g, 99%, ivory solid). 3-Bromopyridine (40.0 g, 253.2 mmol), ethylamine (66.0-72.0% $H_2O$ solution, 107 mL, 1265.8 mmol) and Cu powder (805 mg, 12.66 mmol) were sequentially added to a sealed tube, followed by stirring at 100° C. for 3 days. After the completion of the reaction, the resulting product was cooled to room temperature, and extracted with ethyl acetate (100 mL×5). A combined organic layer was dried with anhydrous $MgSO_4$, filtered and concentrated, thereby obtaining a desired compound (2) (29.61 g, 96%, light brown liquid). The compound (1) (52.65 g, 290.8 mmol) was dispersed in dichloromethane (300 mL), a solution prepared by dissolving the compound (2) (29.61 g, 242.3 mmol) in dichloromethane (100 mL) under ice-bath cooling was added dropwise for 10 minutes, and N,N-diisopropylethylamine (169 mL, 969.2 mmol) was added dropwise for 15 minutes. The temperature of the reaction mixture was raised to room temperature, stirred at room temperature for 30 minutes and then stirred while refluxing for 2 hours. After the completion of the reaction, the resulting product was cooled to room temperature, $H_2O$ (200 mL) was added to terminate the reaction. The mixture was extracted with dichloromethane (100 mL×4). A combined organic layer was dried with anhydrous $MgSO_4$, filtered, concentrated and purified by silica gel column chromatography, thereby obtaining a desired compound (3) (48.97 g, 88%, brown oil).

Step 2: The compound (3) obtained in Step 1 (10.0 g, 43.4 mmol) was dissolved in tetrahydrofuran (THF; 100 mL), and toluene (150 mL) was added. The resulting solution was cooled to minus 78° C. using acetone and dry ice under a N2 condition. While a reaction temperature was maintained at minus 70° C. or less, n-butyl lithium (n-BuLi; 2.5M n-hexane solution, 17.7 mL, 44.2 mmol) was slowly added dropwise, followed by stirring at minus 78° C. for 40 minutes. A solution prepared by dissolving p-toluenesulfonyl cyanide (9.44 g, 52.1 mmol) in THF (50 mL) was slowly added dropwise. Afterward, stirring was performed at minus 78° C. for 1 hour, the temperature was raised to room temperature, followed by additional stirring for 4 hours. Methanol was added to terminate the reaction, followed by concentration under reduced pressure. The residue was purified by silica gel column chromatography, thereby obtaining a desired compound (4) (4.29 g, 39%, brown liquid).

Step 3: The compound (4) (4.29 g, 16.8 mmol) was dissolved in ethanol (30 mL), $NH_2OH$ (50% $H_2O$ solution, 2.06 mL, 33.6 mmol) was slowly added dropwise, followed by stirring at room temperature for 1 hour. After the completion of the reaction, the resulting product was concentrated under reduced pressure, and purified by silica gel column chromatography, thereby obtaining a desired compound (5) (3.87 g, 80%, light yellow solid). The prepared compound (5) (30 mg, 0.1041 mmol) was dissolved in acetic acid (0.3 mL), and then acetone (0.012 mL, 0.1561 mmol, 1.5 equiv.) was added as the compound (6), followed by stirring at room temperature for 5 days. After the completion of the reaction, the resulting product was neutralized with a saturated $NaHCO_3$ aqueous solution, and extracted with EtOAc (5 mL×2). A combined organic layer was dried with anhydrous $MgSO_4$, filtered, concentrated under reduced pressure and purified by silica gel column chromatography, thereby obtaining a desired compound (Ia-1-4-1; 11.5 mg, 34%, white solid).

$^1$H-NMR: $CDCl_3$ (δ) 8.53 (d, 1H), 8.39 (d, 1H), 7.50-7.47 (m, 1H), 7.34-7.32 (m, 1H), 6.29 (s, 1H), 5.64 (s, 1H), 4.12 (s, 3H), 3.94 (q, 2H), 1.51 (s, 6H), 1.23 (t, 3H)

Example 60

Synthesis of Compound of Formula Ia-1-4-2

The compound (Ia-1-4-1; 50 mg, 0.1523 mmol) was dissolved in THF (0.5 mL), and NaH (9 mg, 0.2284 mmol) was added under ice-bath cooling, followed by stirring for 30 minutes. Iodomethane (0.028 mL, 0.4569 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$ and filtered, thereby obtaining a mixture including the compound of Formula Ia-1-4-2 and the compound of Formula Ia-1-5-1. The mixture was concentrated under reduced pressure and purified by silica gel column chromatography, thereby obtaining a desired compound (Formula Ia-1-4-2; 19.6 mg, 38%, yellow solid).

$^1$H-NMR: $CDCl_3$ (δ) 8.54-8.53 (m, 1H), 8.38 (d, 1H), 7.51-7.49 (m, 1H), 7.35-7.32 (m, 1H), 6.36 (s, 1H), 4.17 (s, 3H), 3.96 (q, 2H), 3.25 (s, 3H), 1.55 (s, 6H), 1.25 (t, 3H)

Example 61

Synthesis of Compound of Formula Ia-1-4-3

The compound (Ia-1-4-1) (30 mg, 0.0914 mmol) was dissolved in THF (0.3 mL), and NaH (3 mg, 0.1370 mmol) was added under ice-bath cooling, followed by stirring for 30 minutes. Cyclopropanecarbonyl chloride (0.025 mL, 0.2741 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$, filtered, concentrated under reduced pressure and purified by silica gel column chromatography, thereby obtaining a desired compound (Formula Ia-1-4-3; 24.3 mg, 67%, colorless liquid).

$^1$H-NMR: $CDCl_3$ (δ) 8.55-8.53 (m, 1H), 8.43 (d, 1H), 7.50-7.47 (m, 1H), 7.34-7.31 (m, 1H), 6.32 (s, 1H), 3.99 (s, 3H), 3.93 (q, 2H), 2.17-2.12 (m, 1H), 1.61 (s, 6H), 1.22 (t, 3H), 1.05-1.03 (m, 2H), 0.94-0.92 (m, 2H)

Example 62

Synthesis of Compound of Formula Ia-1-4-4

The compound (5) obtained in Step 3 of Example 59 (50 mg, 0.1734 mmol) was dissolved in acetic acid (0.3 mL), and 3-pentanone (0.037 mL, 0.3468 mmol, 2 equiv.) was added as the compound (6), followed by stirring at room temperature for 6 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-4; 12.5 mg, 20%, colorless oil).

$^1$H-NMR: $CDCl_3$ (δ) 8.54-8.53 (m, 1H), 8.39 (d, 1H), 7.51-7.49 (m, 1H), 7.34-7.32 (m, 1H), 6.29 (s, 1H), 5.30 (s, 1H), 4.11 (s, 3H), 3.94 (q, 2H), 1.77-1.68 (m, 4H), 1.23 (t, 3H), 0.94 (t, 6H)

Example 63

Synthesis of Compound of Formula Ia-1-4-5

The compound (Ia-1-4-4; 9.5 mg, 0.0267 mmol) was dissolved in THF (0.2 mL), and NaH (2.1 mg, 0.05331 mmol) was added under ice-bath cooling, followed by stirring for 30 minutes. Iodomethane (0.005 mL, 0.0800 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (3.0 mL×2). A combined organic layer was dried with anhydrous $MgSO_4$, filtered, concentrated under reduced pressure and purified by silica gel column chromatography, thereby obtaining a desired compound (Formula Ia-1-4-5; 3.4 mg, 34%, yellow oil).

$^1$H-NMR: $CDCl_3$ (δ) 8.55-8.53 (m, 1H), 8.39 (d, 1H), 7.53-7.51 (m, 1H), 7.35-7.33 (m, 1H), 6.36 (s, 1H), 4.18 (s, 3H), 3.96 (q, 2H), 3.21 (s, 3H), 1.84-1.72 (m, 4H), 1.25 (t, 3H), 0.95 (t, 6H)

Example 64

Synthesis of Compound of Formula Ia-1-4-6

The compound (5) obtained in Step 3 of Example 59 (50 mg, 0.1734 mmol) was dissolved in acetic acid (0.3 mL), and cyclopentanone (0.031 mL, 0.3468 mmol, 2 equiv.) was added as the compound (6), followed by stirring at room temperature for 6 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Ia-1-4-6; 35.8 mg, 58%, yellow solid).

¹H-NMR: CDCl₃ (δ) 8.55-8.54 (m, 1H), 8.39 (d, 1H), 7.50-7.48 (m, 1H), 7.34-7.32 (m, 1H), 6.30 (s, 1H), 5.32 (s, 1H), 4.13 (s, 3H), 3.95 (q, 2H), 2.15-2.11 (m, 2H), 1.79-1.73 (m, 4H), 1.68-1.66 (m, 2H), 1.24 (t, 3H)

Example 65

Synthesis of Compound of Formula Ia-1-4-7

The compound (Ia-1-4-6; 10.9 mg, 0.0308 mmol) was dissolved in THF (0.5 mL), and NaH (2.5 mg, 0.0615 mmol) was added under ice-bath cooling, followed by stirring for 30 minutes. Iodomethane (0.006 mL, 0.0923 mmol) was added, and the temperature was raised to room temperature, followed by stirring at room temperature for 24 hours. After the completion of the reaction, H₂O (5.0 mL) was added to terminate the reaction, followed by extraction with ethyl acetate (5.0 mL×2). A combined organic layer was dried with anhydrous MgSO₄ and filtered, thereby obtaining a mixture including the compound of Formula Ia-1-4-7 and the compound of Formula Ia-1-5-11. The mixture was concentrated under reduced pressure and purified by silica gel column chromatography, thereby obtaining a desired compound (Formula Ia-1-4-7; 4.1 mg, 36%, white solid).

¹H-NMR: CDCl₃ (δ) 8.54-8.53 (m, 1H), 8.38 (d, 1H), 7.51-7.49 (m, 1H), 7.34-7.32 (m, 1H), 6.36 (s, 1H), 4.18 (s, 3H), 3.95 (q, 2H), 3.22 (s, 3H), 1.98-1.96 (m, 4H), 1.79-1.77 (m, 4H), 1.24 (t, 3H)

Example 66

Synthesis of Compound of Formula Ia-1-4-8

The compound (5) obtained in Step 3 of Example 59 (50 mg, 0.1734 mmol) was dissolved in acetic acid (0.3 mL), and cyclohexanone (0.027 mL, 0.2601 mmol, 1.5 equiv.) was added as the compound (6), followed by stirring at room temperature for 2 days. After the completion of the reaction, the resulting product was neutralized with a saturated NaHCO₃ aqueous solution, and extracted with EtOAc (5.0 mL×2). A combined organic layer was dried with anhydrous MgSO₄, filtered, concentrated under reduced pressure and purified by silica gel column chromatography, thereby obtaining a desired compound (Formula Ia-1-4-8; 33 mg, 52%, white solid).

¹H-NMR: CDCl₃ (δ) 8.53-8.52 (m, 1H), 8.38 (d, 1H), 7.50-7.47 (m, 1H), 7.34-7.31 (m, 1H), 6.29 (s, 1H), 5.47 (s, 1H), 4.12 (s, 3H), 3.94 (q, 2H), 1.89-1.85 (m, 2H), 1.75-1.64 (m, 2H), 1.55-1.44 (m, 3H), 1.40-1.34 (m, 1H), 1.23 (t, 3H)

Example 67

Synthesis of Compound of Formula Ia-1-4-9

The compound of Formula Ia-1-4-8 (12.5 mg, 0.0339 mmol) was dissolved in THF (0.4 mL), and NaH (2 mg, 0.0509 mmol) was added under ice-bath cooling, followed by stirring for 30 minutes. Iodomethane (0.003 mL, 0.0509 mmol) was added, and the temperature was raised to room temperature, followed by stirring at room temperature for 24 hours. After the completion of the reaction, H₂O (5.0 mL) was added to terminate the reaction, followed by extraction with ethyl acetate (5.0 mL×2). A combined organic layer was dried with anhydrous MgSO₄, filtered, concentrated under reduced pressure and purified by silica gel column chromatography, thereby obtaining a desired compound (Formula Ia-1-4-9; 4.2 mg, 32%, white solid).

¹H-NMR: CDCl₃ (δ) 8.54-8.53 (m, 1H), 8.37 (d, 1H), 7.52-7.49 (m, 1H), 7.34-7.32 (m, 1H), 6.36 (s, 1H), 4.18 (s, 3H), 3.95 (q, 2H), 3.24 (s, 3H), 1.84-1.76 (m, 4H), 1.71-1.65 (m, 4H), 1.49-1.46 (m, 2H), 1.24 (t, 3H)

Example 68

Synthesis of Compound of Formula Ia-1-4-10

The compound (5) obtained in Step 3 of Example 59 (30 mg, 0.1041 mmol) was dissolved in acetic acid (0.3 mL), and tetrahydro-4H-pyran-4-one (0.014 mL, 0.1561 mmol, 1.5 equiv.) was added as the compound (6), followed by stirring at room temperature for 4 days. After the completion of the reaction, the resulting product was neutralized with a saturated NaHCO₃ aqueous solution, and extracted with EtOAc (5.0 mL×2). A combined organic layer was dried with anhydrous MgSO₄, filtered, concentrated under reduced pressure and purified by silica gel column chromatography, thereby obtaining a desired compound (Ia-1-4-10; 21.9 mg, 57%, white solid).

¹H-NMR: CDCl₃ (δ) 8.53-8.52 (m, 1H), 8.36 (d, 1H), 7.50-7.47 (m, 1H), 7.34-7.31 (m, 1H), 6.27 (s, 1H), 5.86 (s, 1H), 4.11 (s, 3H), 3.93 (q, 2H), 3.79-3.77 (m, 4H), 1.97-1.94 (m, 2H), 1.83-1.77 (m, 2H), 1.22 (t, 3H)

Example 69

Synthesis of Compound of Formula Ia-1-4-11

The compound of Formula Ia-1-4-10 (50 mg, 0.1350 mmol) was dissolved in THF (0.5 mL), and NaH (8 mg, 0.2025 mmol) was added under ice-bath cooling, followed by stirring for 30 minutes. Iodomethane (0.025 mL, 0.4050 mmol) was added, and the temperature was raised to room temperature, followed by stirring at room temperature for 24 hours. After the completion of the reaction, H₂O (5.0 mL) was added to terminate the reaction, followed by extraction with ethyl acetate (5.0 mL×2). A combined organic layer was dried with anhydrous MgSO₄ and filtered, thereby obtaining a mixture of the compound of Formula Ia-1-4-11 and the compound of Formula Ia-1-5-2. The mixture was concentrated under reduced pressure and purified by silica gel column chromatography, thereby obtaining a desired compound (Formula Ia-1-4-11; 25.6 mg, 49%, white solid).

¹H-NMR: CDCl₃ (δ) 8.54-8.53 (m, 1H), 8.36 (d, 1H), 7.53-7.51 (m, 1H), 7.35-7.33 (m, 1H), 6.38 (s, 1H), 4.19 (s, 3H), 3.96 (q, 2H), 3.87-3.84 (m, 4H), 3.29 (s, 3H), 1.97-1.88 (m, 4H), 1.25 (t, 3H)

Example 70

Synthesis of Compound of Formula Ia-1-4-12

The compound of Formula Ia-1-4-10 (18.8 mg, 0.0508 mmol) was dissolved in THF (0.3 mL), and NaH (4.1 mg, 0.1015 mmol) was added under ice-bath cooling, followed by stirring for 30 minutes. Cyclopropanecarbonyl chloride (0.014 mL, 0.1523 mmol) was added, and the temperature was raised to room temperature, followed by stirring at room temperature for 24 hours. After the completion of the reaction, H₂O (5.0 mL) was added to terminate the reaction, followed by extraction with ethyl acetate (5.0 mL×2). A combined organic layer was dried with anhydrous MgSO₄, filtered, concentrated under reduced pressure and purified by silica gel column chromatography, thereby obtaining a desired compound (Formula Ia-1-4-12; 17.4 mg, 78%, white solid).

¹H-NMR: CDCl₃ (δ) 8.56-8.55 (m, 1H), 8.44 (d, 1H), 7.50-7.48 (m, 1H), 7.34-7.32 (m, 1H), 6.33 (s, 1H), 4.00 (s,

3H), 3.95-3.84 (m, 6H), 2.20-2.17 (m, 1H), 2.83-1.93 (m, 4H), 1.23 (t, 3H), 1.06-1.04 (m, 2H), 0.96-0.94 (m, 2H)

Example 71

Synthesis of Compound of Formula Ia-1-4-13

The compound of Formula Ia-1-4-10 (33.3 mg, 0.0899 mmol) was dissolved in THF (0.4 mL), and NaH (7.2 mg, 0.1798 mmol) was added under ice-bath cooling, followed by stirring for 30 minutes. Benzylbromide (0.032 mL, 0.2697 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$, filtered, concentrated under reduced pressure and purified by silica gel column chromatography, thereby obtaining a desired compound (Formula Ia-1-4-13; 15.8 mg, 38%, colorless liquid).

$^1$H-NMR: $CDCl_3$ (δ) 8.56-8.55 (m, 1H), 8.40 (d, 1H), 7.56-7.53 (m, 1H), 7.37-7.35 (m, 1H), 7.27-7.26 (m, 3H), 7.01-6.99 (m, 2H), 6.46 (s, 1H), 4.75 (s, 2H), 4.03 (s, 3H), 3.98 (q, 2H), 3.75 (t, 4H), 1.69-1.59 (m, 4H), 1.27 (t, 3H)

Example 72

Synthesis of Compound of Formula Ia-1-4-14

The compound (5) obtained in Step 3 of Example 59 (300 mg, 1.041 mmol) was dissolved in acetic acid (2.0 mL), and 1-methylpiperidin-4-one (0.26 mL, 2.081 mmol, 2.0 equiv.) was added as the compound (6), followed by stirring at room temperature for 3 days. After the completion of the reaction, the resulting product was neutralized with a saturated $NaHCO_3$ aqueous solution, and extracted with EtOAc (10.0 mL×2). A combined organic layer was dried with anhydrous $MgSO_4$, filtered, concentrated under reduced pressure and purified by silica gel column chromatography, thereby obtaining a desired compound (Ia-1-4-14; 114.1 mg, 29%, ivory solid).

$^1$H-NMR: $CDCl_3$ (δ) 8.46-8.45 (m, 1H), 8.31 (d, 1H), 7.44-7.42 (m, 1H), 7.28-7.25 (m, 1H), 6.21 (s, 1H), 5.96 (s, 1H), 4.04 (s, 3H), 3.87 (q, 2H), 2.45-2.41 (m, 4H), 2.20 (s, 3H), 1.93-1.89 (m, 2H), 1.76-1.73 (m, 2H), 1.15 (t, 3H)

Example 73

Synthesis of Compound of Formula Ia-1-4-15

A compound synthesized in the following Example 78 (Formula Ia-1-4-20; 20 mg, 0.0522 mmol) was dissolved in THF (0.4 mL), and $K_2CO_3$ (22 mg, 0.1565 mmol) was added, followed by stirring for 30 minutes. Iodomethane (0.010 mL, 0.1565 mmol) was added, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$ and filtered, thereby obtaining a mixture of the compound of Formula Ia-1-4-15 and the compound of Formula Ia-1-4-16. The mixture was concentrated under reduced pressure and purified by silica gel column chromatography, thereby obtaining a desired compound (Formula Ia-1-4-15; 16 mg, 77%, white solid).

$^1$H-NMR: $CD_3OD$(δ) 9.27 (s, 1H), 8.85 (d, 1H), 8.61-8.59 (m, 1H), 8.01-8.07 (m, 1H), 6.99 (s, 1H), 4.47 (s, 3H), 4.21 (s, 3H), 4.13 (q, 2H), 3.75-3.62 (m, 4H), 3.32 (s, 3H), 2.40-2.35 (m, 2H), 2.30-2.27 (m, 2H), 1.30 (t, 3H)

Example 74

Synthesis of Compound of Formula Ia-1-4-16

A mixture including the compound of Formula Ia-1-4-15 and a compound of Formula Ia-1-4-16 was obtained by the same method as described in Example 73. The mixture was concentrated under reduced pressure and purified by silica gel column chromatography, thereby obtaining a desired compound (Formula Ia-1-4-16; 4 mg, 19%, colorless liquid).

$^1$H-NMR: $CD_3OD$(δ) 9.20 (s, 1H), 8.84 (d, 1H), 8.57-8.55 (m, 1H), 8.09-8.06 (m, 1H), 6.98 (s, 1H), 4.43 (s, 3H), 4.19 (s, 3H), 4.11 (q, 2H), 3.67-3.63 (m, 4H), 3.32 (s, 3H), 2.41-2.35 (m, 2H), 2.28-2.25 (m, 2H), 1.28 (t, 3H)

Example 75

Synthesis of Compound of Formula Ia-1-4-17

The compound (5) obtained in Step 3 of Example 59 (300 mg, 1.041 mmol) was dissolved in acetic acid (2.0 mL), and tert-butyl 4-oxopiperidine-1-carboxylate (415 mg, 2.081 mmol, 2.0 equiv.) was added as the compound (6), followed by stirring at room temperature for 2 days. After the completion of the reaction, the resulting product was neutralized with a saturated $NaHCO_3$ aqueous solution, and extracted with EtOAc (10.0 mL×2). A combined organic layer was dried with anhydrous $MgSO_4$, filtered, concentrated under reduced pressure and purified by silica gel column chromatography, thereby obtaining a desired compound (Formula Ia-1-4-17; 109 mg, 22%, white solid).

$^1$H-NMR: $CDCl_3$ (δ) 8.52-8.51 (m, 1H), 8.34 (d, 1H), 7.47-7.45 (m, 1H), 7.32-7.29 (m, 1H), 6.23 (s, 1H), 6.08 (s, 1H), 4.08 (s, 3H), 3.91 (q, 2H), 3.78-3.72 (m, 2H), 3.29-3.24 (m, 2H), 1.91-1.88 (m, 2H), 1.65-1.60 (m, 2H), 1.42 (s, 9H), 1.20 (t, 3H)

Example 76

Synthesis of Compound of Formula Ia-1-4-18

The compound of Formula Ia-1-4-17 (200 mg, 0.4259 mmol) was dissolved in THF (2.0 mL), and NaH (25.5 mg, 0.6389 mmol) was added under ice-bath cooling, followed by stirring for 30 minutes. Iodomethane (0.080 mL, 1.278 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (10.0 mL×2). A combined organic layer was dried with anhydrous $MgSO_4$ and filtered, thereby obtaining a mixture including the compound of Formula Ia-1-4-18 and the compound of Formula Ia-1-5-3. The mixture was concentrated under reduced pressure and purified by silica gel column chromatography, thereby obtaining a desired compound (Formula Ia-1-4-18; 111 mg, 57%, yellow solid).

$^1$H-NMR: $CDCl_3$ (δ) 8.54-8.53 (m, 1H), 8.36 (d, 1H), 7.53-7.50 (m, 1H), 7.35-7.32 (m, 1H), 6.37 (s, 1H), 4.17 (s, 3H), 3.95 (q, 2H), 3.62-3.55 (m, 4H), 3.28 (s, 3H), 1.87-1.80 (m, 4H), 1.47 (s, 9H), 1.24 (t, 3H)

Example 77

Synthesis of Compound of Formula Ia-1-4-19

The compound of Formula Ia-1-4-17 (30 mg, 0.0639 mmol) was dissolved in dichloromethane (0.5 mL), and trifluoroacetic acid (TFA; 0.5 mL) was slowly added dropwise, followed by stirring at room temperature for 30 minutes. After the completion of the reaction, the reaction mixture was concentrated under reduced pressure, neutralized with a saturated $NaHCO_3$ aqueous solution, and extracted with dichloromethane (5.0 mL×4). A combined organic layer was dried with anhydrous $MgSO_4$, filtered and concentrated under reduced pressure, thereby obtaining a desired compound (Formula Ia-1-4-19; 6.1 mg, 26%, white solid).

$^1$H-NMR: $CDCl_3$ (δ) 8.55-8.53 (m, 1H), 8.38 (d, 1H), 7.51-7.49 (m, 1H), 7.35-7.32 (m, 1H), 6.30 (s, 1H), 5.38 (s, 1H), 4.13 (s, 3H), 3.95 (q, 2H), 3.05-3.00 (m, 2H), 2.92-2.89 (m, 2H), 1.98-1.96 (m, 2H), 1.78-1.73 (m, 2H), 1.24 (t, 3H)

Example 78

Synthesis of Compound of Formula Ia-1-4-20

The compound of Formula Ia-1-4-18 (104 mg, 0.2151 mmol) was dissolved in dichloromethane (1.5 mL), and trifluoroacetic acid (TFA; 1.5 mL) was slowly added dropwise, followed by stirring at room temperature for 30 minutes. After the completion of the reaction, the reaction mixture was concentrated under reduced pressure, neutralized with a saturated $NaHCO_3$ aqueous solution, and extracted with dichloromethane (5.0 mL×4). A combined organic layer was dried with anhydrous $MgSO_4$, filtered and concentrated under reduced pressure, thereby obtaining a desired compound (Formula Ia-1-4-19; 70 mg, 85%, yellow solid).

$^1$H-NMR: $CDCl_3$ (δ) 8.55-8.53 (m, 1H), 8.36 (d, 1H), 7.54-7.42 (m, 1H), 7.36-7.33 (m, 1H), 6.39 (s, 1H), 4.18 (s, 3H), 3.97 (q, 2H), 3.39-3.36 (m, 2H), 3.34 (s, 3H), 3.32-3.30 (m, 2H), 2.23-2.19 (m, 2H), 2.11-2.07 (m, 2H), 1.26 (t, 3H)

Example 79

Synthesis of Compound of Formula Ia-1-4-21

The compound (5) obtained in Step 3 of Example 59 (30 mg, 0.1041 mmol) was dissolved in acetic acid (0.3 mL), and tetrahydro-4H-thiopyran-4-one (18 mg, 0.1561 mmol, 1.5 equiv.) was added as a compound (6-1), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-21; 29.6 mg, 67%, white solid).

$^1$H-NMR: $CDCl_3$ (δ) 8.53-8.52 (m, 1H), 8.36 (d, 1H), 7.50-7.47 (m, 1H), 7.34-7.31 (m, 1H), 6.28 (s, 1H), 5.73 (s, 1H), 4.10 (s, 3H), 3.93 (q, 2H), 2.97-2.91 (m, 2H), 2.60-2.57 (m, 2H), 2.25-2.21 (m, 2H), 1.93-1.87 (m, 2H), 1.22 (t, 3H)

Example 80

Synthesis of Compound of Formula Ia-1-4-22

The compound of Formula Ia-1-4-21 (50 mg, 0.1294 mmol) was dissolved in THF (0.5 mL), and NaH (8 mg, 0.1941 mmol) was added under ice-bath cooling, followed by stirring for 30 minutes. Iodomethane (0.019 mL, 0.3082 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$ and filtered, thereby obtaining a mixture including the compound of Formula Ia-1-4-22 and the compound of Formula Ia-1-5-5. The mixture was concentrated under reduced pressure and purified by silica gel column chromatography, thereby obtaining a desired compound (Formula Ia-1-4-22; 28.4 mg, 55%, white solid).

$^1$H-NMR: $CDCl_3$ (δ) 8.54-8.53 (m, 1H), 8.36 (d, 1H), 7.53-7.51 (m, 1H), 7.35-7.33 (m, 1H), 6.37 (s, 1H), 4.18 (s, 3H), 3.95 (q, 2H), 3.28 (s, 3H), 2.83-2.82 (m, 4H), 2.17-2.11 (m, 2H), 2.09-2.04 (m, 2H), 1.25 (t, 3H)

Example 81

Synthesis of Compound of Formula Ia-1-4-23

The compound of Formula Ia-1-4-21 (30 mg, 0.0776 mmol) was dissolved in THF (0.5 mL), and NaH (5 mg, 0.1164 mmol) was added under ice-bath cooling, followed by stirring for 30 minutes. Cyclopropanecarbonyl chloride (0.021 mL, 0.2329 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$, filtered, concentrated under reduced pressure and purified by silica gel column chromatography, thereby obtaining a desired compound (Formula Ia-1-4-23; 20.0 mg, 57%, white solid).

$^1$H-NMR: $CDCl_3$ (δ) 8.55-8.54 (m, 1H), 8.43 (d, 1H), 7.50-7.47 (m, 1H), 7.33-7.31 (m, 1H), 6.32 (s, 1H), 4.00 (s, 3H), 3.93 (q, 2H), 2.87-2.84 (m, 4H), 2.25-2.11 (m, 5H), 1.22 (t, 3H), 1.06-1.04 (m, 4H), 0.96-0.94 (m, 2H)

Example 82

Synthesis of Compound of Formula Ia-1-4-24

The compound (5) obtained in Step 3 of Example 59 (30 mg, 0.1041 mmol) was dissolved in acetic acid (0.3 mL), and 4-(trifluoromethyl)cyclohexan-1-one (0.021 mL, 0.1561 mmol, 1.5 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-24; 17.7 mg, 39%, colorless liquid).

$^1$H-NMR: $CDCl_3$ (δ) 8.53-8.52 (m, 1H), 8.36 (d, 1H), 7.50-7.48 (m, 1H), 7.34-7.31 (m, 1H), 6.27 (s, 1H), 5.69 (s, 1H), 4.11 (s, 3H), 3.94 (q, 2H), 2.17-2.14 (m, 2H), 2.03-1.98 (m, 1H), 1.92-1.89 (m, 2H), 1.82-1.73 (m, 2H), 1.50-1.44 (m, 2H), 1.23 (t, 3H)

Example 83

Synthesis of Compound of Formula Ia-1-4-25

The compound of Formula Ia-1-4-24 (50 mg, 0.1146 mmol) was dissolved in THF (0.5 mL), and NaH (7 mg, 0.1718 mmol) was added under ice-bath cooling, followed by stirring for 30 minutes. Iodomethane (0.021 mL, 0.3438 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous MgSO$_4$ and filtered, thereby obtaining a mixture including the compound of Formula Ia-1-4-25 and the compound of Formula Ia-1-5-6. The mixture was concentrated under reduced pressure and purified by silica gel column chromatography, thereby obtaining a desired compound (Formula Ia-1-4-25; 10.3 mg, 20%, white solid).

$^1$H-NMR: CDCl$_3$ (δ) 8.54-8.53 (m, 1H), 8.36 (d, 1H), 7.52-7.50 (m, 1H), 7.34-7.32 (m, 1H), 6.38-6.36 (m, 1H), 4.19 (s, 1H), 4.16 (s, 2H), 3.98-3.93 (m, 2H), 3.27 (l, 3H), 3.26 (s, 2H), 2.17-2.07 (m, 1H), 2.04-1.92 (m, 4H), 1.86-1.79 (m, 2H), 1.76-1.70 (m 2H), 1.24 (t, 3H)

Example 84

Synthesis of Compound of Formula Ia-1-4-26

The compound of Formula Ia-1-4-24 (30 mg, 0.0687 mmol) was dissolved in THF (0.5 mL), and NaH (4 mg, 0.1031 mmol) was added under ice-bath cooling, followed by stirring for 30 minutes. Cyclopropanecarbonyl chloride (0.019 mL, 0.2062 mmol) was added, and the temperature was raised to room temperature, followed by stirring at room temperature for 24 hours. After the completion of the reaction, H$_2$O (5.0 mL) was added to terminate the reaction, followed by extraction with ethyl acetate (5.0 mL×2). A combined organic layer was dried with anhydrous MgSO$_4$, filtered, concentrated under reduced pressure and purified by silica gel column chromatography, thereby obtaining a desired compound (Formula Ia-1-4-26; 16 mg, 46%, white solid).

$^1$H-NMR: CDCl$_3$ (δ) 8.55-8.54 (m, 1H), 8.43 (d, 1H), 7.49-7.47 (m, 1H), 7.33-7.31 (m, 1H), 6.32 (s, 1H), 3.99 (s, 3H), 3.93 (q, 2H), 2.21-2.18 (m, 2H), 2.06-2.02 (m, 4H), 1.95-1.88 (m, 2H), 1.76-1.67 (m, 2H), 1.22 (t, 3H), 1.07-1.04 (m, 2H), 0.99-0.96 (m, 2H)

Example 85

Synthesis of Compound of Formula Ia-1-4-27

The compound (5) obtained in Step 3 of Example 59 (200 mg, 0.6937 mmol) was dissolved in acetic acid (2.0 mL), and cyclohexane-1,4-dione (389 mg, 3.468 mmol, 5.0 equiv.) was added as the compound (6), followed by stirring at room temperature for 5 days. After the completion of the reaction, the resulting product was neutralized with a saturated NaHCO$_3$ aqueous solution, and extracted with EtOAc (10.0 mL×2). A combined organic layer was dried with anhydrous MgSO$_4$, filtered, concentrated under reduced pressure and purified by silica gel column chromatography, thereby obtaining a desired compound (Formula Ia-1-4-27; 124 mg, 46%, white solid).

$^1$H-NMR: CDCl$_3$ (δ) 8.54-8.53 (m, 1H), 8.36 (d, 1H), 7.50-7.48 (m, 1H), 7.34-7.32 (m, 1H), 6.26 (s, 1H), 6.06 (s, 1H), 4.13 (s, 3H), 3.94 (q, 2H), 2.78-2.71 (m, 2H), 2.38-2.30 (m, 4H), 2.02-1.96 (m, 2H), 1.23 (t, 3H)

Example 86

Synthesis of Compound of Formula Ia-1-4-28

The compound of Formula Ia-1-4-27 (50 mg, 0.1307 mmol) was dissolved in THF (0.3 mL), and NaH (8 mg, 0.1961 mmol) was added under ice-bath cooling, followed by stirring for 30 minutes. Iodomethane (0.016 mL, 0.2614 mmol) was added, and the temperature was raised to room temperature, followed by stirring at room temperature for 24 hours. After the completion of the reaction, H$_2$O (5.0 mL) was added to terminate the reaction, followed by extraction with ethyl acetate (5.0 mL×2). A combined organic layer was dried with anhydrous MgSO$_4$, filtered, concentrated under reduced pressure and purified by silica gel column chromatography, thereby obtaining a desired compound (Formula Ia-1-4-28; 5.0 mg, 10%, white solid).

$^1$H-NMR: CDCl$_3$ (δ) 8.55-8.54 (m, 1H), 8.36 (d, 1H), 7.54-7.52 (m, 1H), 7.36-7.34 (m, 1H), 6.39 (s, 1H), 4.19 (s, 3H), 3.97 (q, 2H), 3.33 (s, 3H), 2.65-2.54 (m, 4H), 2.26-2.15 (m, 4H), 1.25 (t, 3H)

Example 87

Synthesis of Compound of Formula Ia-1-4-29

The compound (5) obtained in Step 3 of Example 59 (30 mg, 0.1041 mmol) was dissolved in acetic acid (0.3 mL), and 4,5-dioxaspiro[4,5]decan-8-one (33 mg, 0.2081 mmol, 2.0 equiv.) was added as the compound (6), followed by stirring at room temperature for 5 days. After the completion of the reaction, the resulting product was neutralized with a saturated NaHCO$_3$ aqueous solution, and extracted with EtOAc (5.0 mL×2). A combined organic layer was dried with anhydrous MgSO$_4$, filtered, concentrated under reduced pressure and purified by silica gel column chromatography, thereby obtaining a desired compound (Formula Ia-1-4-29; 39.7 mg, 89%, white solid).

$^1$H-NMR: CDCl$_3$ (δ) 8.52-8.51 (m, 1H), 8.37 (d, 1H), 7.49-7.46 (m, 1H), 7.33-7.30 (m, 1H), 6.28 (s, 1H), 5.63 (s, 1H), 4.10 (s, 3H), 3.95-3.90 (m, 6H), 2.06-2.02 (m, 2H), 1.97-1.83 (m, 4H), 1.71-1.67 (m, 2H), 1.21 (t, 3H)

Example 88

Synthesis of Compound of Formula Ia-1-4-30

The compound (5) obtained in Step 3 of Example 59 (50 mg, 0.1734 mmol) was dissolved in acetic acid (0.3 mL), and 4,4-difluorocyclohexan-1-one (47 mg, 0.3468 mmol, 2.0 equiv.) was added as the compound (6), followed by stirring at room temperature for 5 days. After the completion of the reaction, the resulting product was neutralized with a saturated NaHCO$_3$ aqueous solution, and extracted with EtOAc (5.0 mL×2). A combined organic layer was dried with anhydrous MgSO$_4$, filtered, concentrated under reduced pressure and purified by silica gel column chromatography, thereby obtaining a desired compound (Formula Ia-1-4-30; 56.2 mg, 80%, light pink solid).

$^1$H-NMR: CDCl$_3$ (δ) 8.53-8.52 (m, 1H), 8.37 (d, 1H), 7.49-7.47 (m, 1H), 7.34-7.31 (m, 1H), 6.26 (s, 1H), 5.89 (s, 1H), 4.10 (s, 3H), 3.93 (q, 2H), 2.22-2.01 (m, 6H), 1.85-1.79 (m, 2H), 1.22 (t, 3H)

Example 89

Synthesis of Compound of Formula Ia-1-4-31

The compound (5) obtained in Step 3 of Example 59 (50 mg, 0.1734 mmol) was dissolved in acetic acid (0.3 mL), and 4-(tert-butyl)cyclohexan-1-one (54 mg, 0.3468 mmol, 2.0 equiv.) was added as the compound (6), followed by stirring at room temperature for 5 days. After the completion of the reaction, the resulting product was neutralized with a saturated NaHCO$_3$ aqueous solution, and extracted with EtOAc (5.0 mL×2). A combined organic layer was dried with anhydrous MgSO$_4$, filtered, concentrated under reduced pressure and purified by silica gel column chromatography, thereby obtaining a desired compound (Formula Ia-1-4-31; 71.2 mg, 97%, light yellow solid).

$^1$H-NMR: CDCl$_3$ (δ) 8.53-8.52 (m, 1H), 8.38 (d, 1H), 7.50-7.47 (m, 1H), 7.33-7.30 (m, 1H), 6.29-6.28 (m, 1H), 5.64 (s, 0.4H), 5.41 (s, 0.6H), 4.12 (s, 1.2H), 4.11 (s, 1.8H), 3.96-3.91 (m, 2H), 2.12-2.10 (m, 1H), 2.03-1.99 (m, 1H), 1.84-1.82 (m, 1H), 1.72-1.63 (m, 2H), 1.45-1.43 (m, 2H), 1.24-1.21 (m, 3H), 1.08-0.98 (m, 2H), 0.86 (s, 5.4H), 0.82 (s, 3.6H)

Example 90

Synthesis of Compound of Formula Ia-1-4-32

The compound of Formula Ia-1-4-31 (26 mg, 0.0612 mmol) was dissolved in THF (0.5 mL), and NaH (5 mg, 0.1225 mmol) was added under ice-bath cooling, followed by stirring for 30 minutes. Iodomethane (0.011 mL, 0.1837 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$ and filtered, thereby obtaining a mixture including the compound of Formula Ia-1-4-32 and the compound of Formula Ia-1-5-7. The mixture was concentrated under reduced pressure and purified by silica gel column chromatography, thereby obtaining a desired compound (Formula Ia-1-4-32; 7.4 mg, 28%, white solid).

$^1$H-NMR: $CDCl_3$ ($\delta$) 8.54-8.53 (m, 1H), 8.38 (d, 1H), 7.52-7.48 (m, 1H), 7.35-7.32 (m, 1H), 6.37-6.36 (m, 1H), 4.19 (s, 1.2H), 4.16 (s, 1.8H), 3.98-3.93 (m, 2H), 3.24 (s, 3H), 1.93-1.90 (m, 2H), 1.80-1.72 (m, 4H), 1.55-1.47 (m, 1H), 1.38-1.30 (m, 1H), 1.26-1.23 (m, 3H), 1.15-1.03 (m, 1H)

Example 91

Synthesis of Compound of Formula Ia-1-4-33

The compound (5) obtained in Step 3 of Example 59 (50 mg, 0.1734 mmol) was dissolved in acetic acid (0.3 mL), and 2-fluorobenzaldehyde (0.037 mL, 0.3468 mmol, 2.0 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-33; 57.9 mg, 85%, colorless liquid).

$^1$H-NMR: $CDCl_3$ ($\delta$) 8.53-8.52 (m, 1H), 8.37 (d, 1H), 7.59-7.55 (m, 1H), 7.49-7.47 (m, 1H), 7.35-7.31 (m, 2H), 7.16 (t, 1H), 7.05 (t, 1H), 6.79 (s, 1H), 6.27 (s, 1H), 5.97 (s, 1H), 4.14 (s, 3H), 3.94 (q, 2H), 1.23 (t, 3H)

Example 92

Synthesis of Compound of Formula Ia-1-4-34

The compound (5) obtained in Step 3 of Example 59 (150 mg, 0.5203 mmol) was dissolved in acetic acid (1.0 mL), and 2-fluoronicotine aldehyde (130 mg, 1.041 mmol, 2.0 equiv.) was added as the compound (6), followed by stirring at room temperature for 5 days. After the completion of the reaction, the resulting product was neutralized with a saturated $NaHCO_3$ aqueous solution, and extracted with EtOAc (10.0 mL×2). A combined organic layer was dried with anhydrous $MgSO_4$, filtered, concentrated under reduced pressure and purified by silica gel column chromatography, thereby obtaining a desired compound (Formula Ia-1-4-34; 130 mg, 63%, white solid).

$^1$H-NMR: $CDCl_3$ ($\delta$) 8.55-8.54 (m, 1H), 8.37 (d, 1H), 8.24-8.22 (m, 1H), 8.07-8.03 (m, 1H), 7.53-7.50 (m, 1H), 7.36-7.33 (m, 1H), 7.26-7.24 (m, 1H), 6.76 (s, 1H), 6.31 (s, 1H), 5.80 (s, 1H), 4.16 (s, 3H), 3.96 (q, 2H), 1.25 (t, 3H)

Example 93

Synthesis of Compound of Formula Ia-1-4-35

The compound of Formula Ia-1-4-34 (50 mg, 0.1265 mmol) was dissolved in THF (0.3 mL), and NaH (8 mg, 0.1898 mmol) was added under ice-bath cooling, followed by stirring for 30 minutes. Iodomethane (0.016 mL, 0.2529 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$ and filtered, thereby obtaining a mixture including the compound of Formula Ia-1-4-35 and the compound of Formula Ia-1-5-9. The mixture was concentrated under reduced pressure and purified by silica gel column chromatography, thereby obtaining a desired compound (Formula Ia-1-4-35; 3.9 mg, 8%, white solid).

$^1$H-NMR: $CDCl_3$ ($\delta$) 8.55-8.54 (m, 1H), 8.38 (d, 1H), 8.24-8.23 (m, 1H), 7.95-7.91 (m, 1H), 7.53-7.51 (m, 1H), 7.36-7.34 (m, 1H), 7.25-7.22 (m, 1H), 6.96 (s, 1H), 6.41 (s, 1H), 4.20 (s, 3H), 3.97 (q, 2H), 3.39 (s, 3H), 1.25 (t, 3H)

Example 94

Synthesis of Compound of Formula Ia-1-4-36

The compound (5) obtained in Step 3 of Example 59 (50 mg, 0.1734 mmol) was dissolved in acetic acid (0.3 mL), and 3-fluoroisonicotine aldehyde (43 mg, 0.3468 mmol, 2.0 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-36; 22.3 mg, 33%, white solid).

$^1$H-NMR: $CDCl_3$ ($\delta$) 8.53-8.52 (m, 1H), 8.47-8.45 (m, 2H), 8.36 (d, 1H), 7.52-7.49 (m, 2H), 7.35-7.32 (m, 1H), 6.78 (s, 1H), 6.40 (s, 1H), 6.27 (s, 1H), 4.14 (s, 3H), 3.94 (q, 2H), 1.23 (t, 3H)

Example 95

Synthesis of Compound of Formula Ia-1-4-37

The compound (5) obtained in Step 3 of Example 59 (60 mg, 0.2081 mmol) was dissolved in acetic acid (0.5 mL), and benzaldehyde (0.042 mL, 0.4162 mmol, 2.0 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-37; 42.9 mg, 55%, white solid).

$^1$H-NMR: $CDCl_3$ ($\delta$) 8.54-8.53 (m, 1H), 8.39 (d, 1H), 8.50 (d, 1H), 7.50-7.48 (m, 3H), 7.40-7.39 (m, 3H), 7.34-

7.32 (m, 1H), 6.48 (s, 1H), 6.28 (s, 1H), 5.81 (s, 1H), 4.16 (s, 3H), 3.96-3.94 (m, 2H), 1.24 (t, 3H)

Example 96

Synthesis of Compound of Formula Ia-1-4-38

The compound (5) obtained in Step 3 of Example 59 (60 mg, 0.2081 mmol) was dissolved in acetic acid (0.5 mL), and nicotine aldehyde (0.039 mL, 0.4162 mmol, 2.0 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-38; 47 mg, 60%, ivory solid).

$^1$H-NMR: $CDCl_3$ ($\delta$) 8.65-8.64 (m, 1H), 8.62-8.61 (m, 1H), 8.51-8.50 (m, 1H), 8.35 (d, 1H), 7.84-7.81 (m, 1H), 7.49-7.47 (m, 1H), 7.33-7.30 (m, 2H), 6.48 (s, 1H), 6.38 (s, 1H), 6.22 (s, 1H), 4.13 (s, 3H), 3.93-3.91 (m, 2H), 1.21 (t, 3H)

Example 97

Synthesis of Compound of Formula Ia-1-4-39

The compound (5) obtained in Step 3 of Example 59 (30 mg, 0.1041 mmol) was dissolved in acetic acid (0.3 mL), and isonicotine aldehyde (0.020 mL, 0.2081 mmol, 2.0 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-39; 18.3 mg, 47%, white solid).

$^1$H-NMR: $CDCl_3$ ($\delta$) 8.64-8.63 (m, 2H), 8.53-8.52 (m, 1H), 8.35 (d, 1H), 7.50-7.48 (m, 1H), 7.39-7.37 (m, 2H), 7.34-7.32 (m, 1H), 6.50 (s, 1H), 6.45 (s, 1H), 6.23 (s, 1H), 4.13 (s, 3H), 3.96-3.91 (m, 2H), 1.23 (t, 3H)

Example 98

Synthesis of Compound of Formula Ia-1-4-40

The compound (5) obtained in Step 3 of Example 59 (30 mg, 0.1041 mmol) was dissolved in acetic acid (0.3 mL), and 2-ethoxynicotine aldehyde (47 mg, 0.3122 mmol, 3.0 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-40; 36 mg, 82%, white solid).

$^1$H-NMR: $CDCl_3$ ($\delta$) 8.52-8.51 (m, 1H), 8.36 (d, 1H), 8.11-8.09 (m, 1H), 7.80-7.78 (m, 1H), 7.48-7.46 (m, 1H), 7.32-7.30 (m, 1H), 6.89-6.87 (m, 1H), 6.66 (s, 1H), 6.28 (s, 1H), 5.87 (s, 1H), 4.42-4.36 (m, 2H), 4.14 (s, 3H), 3.93 (q, 2H), 1.35 (t, 3H), 1.22 (t, 3H)

Example 99

Synthesis of Compound of Formula Ia-1-4-41

The compound (5) obtained in Step 3 of Example 59 (50 mg, 0.1734 mmol) was dissolved in acetic acid (0.4 mL), and cyclopropane carboxaldehyde (61 mg, 0.8671 mmol, 5.0 equiv.) was added as the compound (6), followed by stirring at room temperature for 5 days. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-41; 54 mg, 91%, white solid).

$^1$H-NMR: $CDCl_3$ ($\delta$) 8.52-8.51 (m, 1H), 8.36 (d, 1H), 7.49-7.46 (m, 1H), 7.32-7.30 (m, 1H), 6.28 (s, 1H), 5.82 (s, 1H), 5.04-5.03 (m, 1H), 4.09 (s, 3H), 3.94-3.90 (m, 2H), 1.21 (t, 3H), 0.61-0.56 (m, 1H), 0.53-0.47 (m, 1H), 0.45-0.40 (m, 1H), 0.32-0.27 (m, 1H)

Example 100

Synthesis of Compound of Formula Ia-1-4-42

The compound of Formula Ia-1-4-34 (25 mg, 0.0632 mmol) was dissolved in N,N-dimethylformamide (0.3 mL), and sodium ethanethiolate (16 mg, 0.1897 mmol, 3.0 equiv.) was added, followed by stirring at room temperature for 4 hours. After the completion of the reaction, $H_2O$ (5.0 mL) was added to terminate the reaction, followed by extraction with ethyl acetate (5.0 mL×3). A combined organic layer was dried with anhydrous $MgSO_4$, filtered, concentrated under reduced pressure and purified by silica gel column chromatography, thereby obtaining a desired compound (Formula Ia-1-4-42; 2.6 mg, 9%, white solid).

$^1$H-NMR: $CDCl_3$ ($\delta$) 8.54-8.53 (m, 1H), 8.43-8.41 (m, 1H), 8.38 (d, 1H), 7.82-7.80 (m, 1H), 7.51-7.49 (m, 1H), 7.35-7.32 (m, 1H), 7.06-7.03 (m, 1H), 6.71 (s, 1H), 6.30 (s, 1H), 5.83 (s, 1H), 4.16 (s, 3H), 3.95 (q, 2H), 3.26 (q, 2H), 1.37 (t, 3H), 1.24 (t, 3H)

Example 101

Synthesis of Compound of Formula Ia-1-4-43

The compound (5) obtained in Step 3 of Example 59 (30 mg, 0.1041 mmol) was dissolved in acetic acid (0.3 mL), and acetaldehyde (0.017 mL, 0.3123 mmol, 3.0 equiv.) was added as the compound (6), followed by stirring at room temperature for 1 day. After the completion of the reaction, the resulting product was neutralized with a saturated $NaHCO_3$ aqueous solution, and extracted with EtOAc (5.0 mL×2). A combined organic layer was dried with anhydrous $MgSO_4$, filtered, concentrated under reduced pressure and purified by silica gel column chromatography, thereby obtaining a desired compound (Formula Ia-1-4-43; 25.9 mg, 79%, colorless liquid).

$^1$H-NMR: $CDCl_3$ ($\delta$) 8.53-8.52 (m, 1H), 8.37 (d, 1H), 7.50-7.48 (m, 1H), 7.34-7.32 (m, 1H), 6.29 (s, 1H), 5.83 (s, 1H), 5.72 (q, 1H), 4.11 (s, 3H), 3.93 (q, 2H), 1.42 (d, 3H), 1.21 (t, 3H)

Example 102

Synthesis of Compound of Formula Ia-1-4-44

The compound (5) obtained in Step 3 of Example 59 (30 mg, 0.1041 mmol) was dissolved in acetic acid (0.3 mL), and propionaldehyde (0.022 mL, 0.3123 mmol, 3.0 equiv.) was added as the compound (6), followed by stirring at room temperature for 1 day. After the completion of the reaction, the resulting product was neutralized with a saturated NaHCO$_3$ aqueous solution, and extracted with EtOAc (5.0 mL×2). A combined organic layer was dried with anhydrous MgSO$_4$, filtered, concentrated under reduced pressure and purified by silica gel column chromatography, thereby obtaining a desired compound (Formula Ia-1-4-44; 30.1 mg, 88%, yellow liquid).

$^1$H-NMR: CDCl$_3$ (δ) 8.55-8.54 (m, 1H), 8.39 (d, 1H), 7.52-7.49 (m, 2H), 7.36-7.34 (m, 1H), 6.32 (s, 1H), 5.77 (s, 1H), 5.59 (t, 3H), 4.12 (s, 3H), 3.96-3.92 (m, 2H), 1.81-1.68 (m, 2H), 1.23 (t, 3H), 0.97 (t, 3H)

Example 103

Synthesis of Compound of Formula Ia-1-5-1

A mixture including the compound of Formula Ia-1-4-2 and the compound of Formula Ia-1-5-1 was obtained by the same method as described in Example 60. The mixture was concentrated under reduced pressure and purified by silica gel column chromatography, thereby obtaining a desired compound (Formula Ia-1-5-1; 5.1 mg, 10%, yellow solid).

$^1$H-NMR: CDCl$_3$ (δ) 8.54-8.53 (m, 1H), 8.40 (d, 1H), 7.50-7.47 (m, 1H), 7.34-7.32 (m, 1H), 6.38 (s, 1H), 4.08 (s, 3H), 3.95 (q, 2H), 2.95 (s, 3H), 1.50 (s, 6H), 1.24 (t, 3H)

Example 104

Synthesis of Compound of Formula Ia-1-5-2

A mixture including the compound of Formula Ia-1-4-11 and the compound of Formula Ia-1-5-2 was obtained by the same method as described in Example 69. The mixture was concentrated under reduced pressure and purified by silica gel column chromatography, thereby obtaining a desired compound (Ia-1-5-2; 5.3 mg, 10%, white solid).

$^1$H-NMR: CDCl$_3$ (δ) 8.55-8.54 (m, 1H), 8.39 (d, 1H), 7.51-7.49 (m, 1H), 7.35-7.32 (m, 1H), 6.38 (s, 1H), 4.08 (s, 3H), 3.99-3.93 (m, 4H), 3.79-3.75 (m, 2H), 2.97 (s, 3H), 2.06-2.00 (m, 2H), 1.83-1.80 (m, 2H), 1.24 (t, 3H)

Example 105

Synthesis of Compound of Formula Ia-1-5-3

A mixture including the compound of Formula Ia-1-4-18 and the compound of Formula Ia-1-5-3 was obtained by the same method as described in Example 76. The mixture was concentrated under reduced pressure and purified by silica gel column chromatography, thereby obtaining a desired compound (Ia-1-5-3; 21 mg, 10%, white solid).

$^1$H-NMR: CDCl$_3$ (δ) 8.54-8.53 (m, 1H), 8.38 (d, 1H), 7.50-7.48 (m, 1H), 7.34-7.32 (m, 1H), 6.37 (s, 1H), 4.21-4.06 (m, 5H), 3.95 (q, 2H), 3.12-3.08 (m, 2H), 2.94 (s, 3H), 1.84-1.83 (m, 4H), 1.46 (s, 9H), 1.23 (t, 3H)

Example 106

Synthesis of Compound of Formula Ia-1-5-4

The compound of Formula Ia-1-5-3 (15 mg, 0.0310 mmol) was dissolved in dichloromethane (0.2 mL), and trifluoroacetic acid (TFA; 0.2 mL) was slowly added dropwise, followed by stirring at room temperature for 30 minutes. After the completion of the reaction, the reaction mixture was concentrated under reduced pressure, neutralized with a saturated NaHCO$_3$ aqueous solution, and extracted with dichloromethane (5.0 mL×4). A combined organic layer was dried with anhydrous MgSO$_4$, filtered and concentrated under reduced pressure, thereby obtaining a desired compound (Formula Ia-1-5-4; 8.1 mg, 68%, white solid).

$^1$H-NMR: CDCl$_3$ (δ) 8.54-8.53 (m, 1H), 8.39 (d, 1H), 7.50-7.48 (m, 1H), 7.34-7.33 (m, 1H), 6.38 (s, 1H), 4.07 (s, 3H), 3.95 (q, 2H), 3.08-3.05 (m, 2H), 3.02-2.99 (m, 2H), 2.96 (s, 3H), 1.89-1.86 (m, 4H), 1.24 (t, 3H)

Example 107

Synthesis of Compound of Formula Ia-1-5-5

A mixture including the compound of Formula Ia-1-4-22 and the compound of Formula Ia-1-5-5 was obtained by the same method as described in Example 80. The mixture was concentrated under reduced pressure and purified by silica gel column chromatography, thereby obtaining a desired compound (Formula Ia-1-5-5; 4.1 mg, 8%, yellow solid).

$^1$H-NMR: CDCl$_3$ (δ) 8.55-8.54 (m, 1H), 8.39 (d, 1H), 7.51-7.49 (m, 1H), 7.35-7.33 (m, 1H), 6.38 (s, 1H), 4.07 (s, 3H), 3.95 (q, 2H), 3.14-3.08 (m, 2H), 2.97 (s, 3H), 2.59-2.56 (m, 2H), 2.24-2.21 (m, 2H), 2.05-2.01 (m, 2H), 1.24 (t, 3H)

Example 108

Synthesis of Compound of Formula Ia-1-5-6

A mixture including the compound of Formula Ia-1-4-25 and a compound of Formula Ia-1-5-6 was obtained by the same method as described in Example 83. The mixture was concentrated under reduced pressure and purified by silica gel column chromatography, thereby obtaining a desired compound (Formula Ia-1-5-6; 7.8 mg, 15%, yellow solid).

$^1$H-NMR: CDCl$_3$ (δ) 8.55-8.53 (m, 1H), 8.39 (d, 1H), 7.51-7.48 (m, 1H), 7.35-7.33 (m, 1H), 6.38 (s, 1H), 4.07 (s, 3H), 3.95 (q, 2H), 2.96 (s, 3H), 2.06-1.95 (m, 5H), 1.86-1.82 (m, 2H), 1.73-1.70 (m, 2H), 1.24 (t, 3H)

Example 109

Synthesis of Compound of Formula Ia-1-5-7

A mixture including the compound of Formula Ia-1-4-32 and the compound of Formula Ia-1-5-7 was obtained by the same method as described in Example 90. The mixture was concentrated under reduced pressure and purified by silica gel column chromatography, thereby obtaining a desired compound (Formula Ia-1-5-7; 2.3 mg, 9%, ivory solid).

$^1$H-NMR: CDCl$_3$ (δ) 8.54-8.53 (m, 1H), 8.40 (d, 1H), 7.50-7.48 (m, 1H), 7.34-7.32 (m, 1H), 6.38 (s, 1H), 4.07 (s, 3H), 3.95 (q, 2H), 2.93 (s, 3H), 1.99-1.96 (m, 2H), 1.78-1.75 (m, 2H), 1.69-1.63 (m, 2H), 1.53-1.47 (m, 2H), 1.24 (t, 3H), 1.02-0.97 (m, 1H), 0.88 (s, 9H), 0.89 (s, 3.6H), 0.88 (s, 5.4H)

Example 110

Synthesis of Compound of Formula Ia-1-5-8

The compound of Formula Ia-1-4-33 (16.2 mg, 0.0411 mmol) was dissolved in THF (0.3 mL), and NaH (3.3 mg, 0.0822 mmol) was added under ice-bath cooling, followed by stirring for 30 minutes. Iodomethane (0.008 mL, 0.1232 mmol) was added, and the temperature was raised to room temperature, followed by stirring at room temperature for 24 hours. After the completion of the reaction, H$_2$O (5.0 mL) was added to terminate the reaction, followed by extraction with ethyl acetate (5.0 mL×2). A combined organic layer was dried with anhydrous MgSO$_4$, filtered, concentrated under reduced pressure and purified by silica gel column chromatography, thereby obtaining a desired compound (Formula Ia-1-5-8; 1.8 mg, 11%, white solid).

$^1$H-NMR: CDCl$_3$ (δ) 8.56-8.54 (m, 1H), 8.41 (d, 1H), 7.61-7.58 (m, 1H), 7.52-7.50 (m, 1H), 7.40-7.34 (m, 2H), 7.22-1.19 (m, 1H), 7.12-7.08 (m, 1H), 6.52 (s, 1H), 6.41 (s, 1H), 4.14 (s, 3H), 3.97 (q, 2H), 2.93 (s, 3H), 1.25 (t, 3H)

Example 111

Synthesis of Compound of Formula Ia-1-5-9

A mixture including the compound of Formula Ia-1-4-35 and the compound of Formula Ia-1-5-9 was obtained by the same method as described in Example 93. The mixture was concentrated under reduced pressure and purified by silica gel column chromatography, thereby obtaining a desired compound (Formula Ia-1-5-9; 13.2 mg, 25%, orange solid).

$^1$H-NMR: $CDCl_3$ (δ) 8.56-8.55 (m, 1H), 8.40 (d, 1H), 8.27-8.26 (m, 1H), 8.07-8.04 (m, 1H), 7.54-7.51 (m, 1H), 7.37-7.34 (m, 1H), 7.29-7.27 (m, 1H), 6.46 (s, 1H), 6.40 (s, 1H), 4.13 (s, 3H), 4.00-3.95 (m, 2H), 2.99 (s, 3H), 1.26 (t, 3H)

Example 112

Synthesis of Compound of Formula Ia-1-5-10

The compound of Formula Ia-1-4-36 (15.5 mg, 0.0392 mmol) was dissolved in THF (0.2 mL), and NaH (3 mg, 0.0588 mmol) was added under ice-bath cooling, followed by stirring for 30 minutes. Iodomethane (0.005 mL, 0.0784 mmol) was added, and the temperature was raised to room temperature, followed by stirring at room temperature for 24 hours. After the completion of the reaction, $H_2O$ (5.0 mL) was added to terminate the reaction, followed by extraction with ethyl acetate (5.0 mL×2). A combined organic layer was dried with anhydrous $MgSO_4$, filtered, concentrated under reduced pressure and purified by silica gel column chromatography, thereby obtaining a desired compound (Formula Ia-1-5-10; 6.0 mg, 37%, colorless oil).

$^1$H-NMR: $CDCl_3$ (δ) 8.56-8.54 (m, 1H), 8.53 (d, 1H), 8.50 (d, 1H), 8.39 (d, 1H), 7.53-7.51 (m, 2H), 7.36-7.34 (m, 1H), 6.51 (s, 1H), 6.40 (s, 1H), 4.13 (s, 3H), 3.98-3.95 (m, 2H), 3.01 (s, 3H), 1.25 (t, 3H)

Example 113

Synthesis of Compound of Formula Ia-1-5-11

A mixture including the compound of Formula Ia-1-4-7 and the compound of Formula Ia-1-5-11 was obtained by the same method as described in Example 65. The mixture was concentrated under reduced pressure and purified by silica gel column chromatography, thereby obtaining a desired compound (Formula Ia-1-5-11; 2.0 mg, 18%, white solid).

$^1$H-NMR: $CDCl_3$ (δ) 8.54-8.53 (m, 1H), 8.40 (d, 1H), 7.50-7.47 (m, 1H), 7.34-7.31 (m, 1H), 6.38 (s, 1H), 4.07 (s, 3H), 3.95 (q, 2H), 2.97 (s, 3H), 1.95-1.93 (m, 4H), 1.81-1.78 (m, 2H), 1.71-1.66 (m, 2H), 1.24 (t, 3H)

Experimental Example 1

Insecticidal Activity Test 1 Against *Myzus persicae* (Sulzer)

Peppers were planted in plastic pots with a diameter of 8 cm and a height of 8 cm, *Myzus persicae* (Sulzer) was reproduced therein, and then the number of *Myzus persicae* (Sulzer) in each pot was investigated. Some of the compounds prepared in the examples were selected, the compound was dispersed in water to be diluted to approximately 5 ppm, thereby preparing a drug solution.

The drug solution was sprayed onto the foliage of the peppers planted in the pots using a hand sprayer and air-dried, and the pots were stored in a green house.

On day 5 after the drug spraying, the number of *Myzus persicae* (Sulzer) parasitic on each pepper was counted, a mortality rate was calculated from the following formula, and the rating of each compound was investigated.

Mortality Rate =

{(Initial number of Myzus persicae (Sulzer) − Number of Myzus persicae (Sulzer) after application of compound drug solution)

/Initial number of Myzus persicae (Sulzer)} * 100

A rating: 90% to 100% mortality
B rating: 80% or more and less than 90% mortality
C rating: less than 80% mortality As a result of the investigation, the compounds of Formulas Ia-1-1-1, Ia-1-1-8, Ia-1-1-12, Ia-1-1-25, Ia-1-1-26 Ia-1-1-27, Ia-1-1-36, Ia-1-1-43, Ia-1-3-2, Ia-1-3-3, Ia-1-4-2, Ia-1-4-22, Ia-1-4-36, Ia-1-4-41, Ia-1-4-43, Ia-1-4-44, Ia-1-5-2, and Ia-1-5-6 received an A rating. From this result, it can be seen that the present invention provides a novel compound that can effectively kill pests even at a relatively low concentration.

Experimental Example 2

Insecticidal Activity Test 2 Against *Myzus persicae* (Sulzer)

Peppers were planted in plastic pots with a diameter of 8 cm and a height of 8 cm, *Myzus persicae* (Sulzer) was reproduced therein, and then the number of *Myzus persicae* (Sulzer) in each pot was investigated. Some of the compounds prepared in the examples were selected, the compound was dispersed in water to be diluted to approximately 25 ppm, thereby preparing a drug solution.

The drug solution was sprayed onto the foliage of the peppers planted in the pots and air-dried, and the pots were stored in a green house.

On day 5 after the drug spraying, the number of *Myzus persicae* (Sulzer) parasitic on each pepper was counted, a mortality rate was calculated from the following formula, and the rating of each compound was investigated.

Mortality Rate =

{(Initial number of Myzus persicae (Sulzer) − Number of Myzus persicae (Sulzer) after application of compound drug solution)

/Initial number of Myzus persicae (Sulzer)} * 100

A rating: 90% to 100% mortality
B rating: 80% or more and less than 90% mortality
C rating: less than 80% mortality As a result of the investigation, in addition to the A-rated compounds listed in Experimental Example 1, the compounds of Formula Ia-1-1-2, Ia-1-1-5, Ia-1-1-6, Ia-1-1-7, Ia-1-1-16 Ia-1-1-21, Ia-1-1-22, Ia-1-1-23, Ia-1-1-24, Ia-1-1-30, Ia-1-1-31, Ia-1-1-33, Ia- 1-1-35, Ia-1-1-37, Ia-1-1-38, Ia-1-4-3, Ia-1-4-4, Ia-1-4-10, Ia-1-4-12, Ia-1-4-25, Ia-1-4-33, Ia-1-4-34, Ia-1-5-1, Ia-1-5-2, Ia-1-5-3, and Ia-1-5-9 also received an A rating. Meanwhile, most of the compounds whose effects were confirmed, except the listed compounds, received a B rating.

Putting all of the above-described experimental results together, it was clearly demonstrated that the present invention contributes to solving conventional problems by providing a compound that can express effective insecticidal activity even under a relatively low concentration.

INDUSTRIAL APPLICABILITY

A compound according to the present invention can have an effective pesticidal action against pests, for example, pests of the family Aphidoidea.

The control composition according to the present invention including the compound exhibits excellent mortality with a relatively low concentration.

The invention claimed is:

1. A compound represented by Formula I:

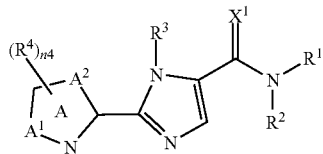

[Formula I]

wherein $X^1$ is oxygen or sulfur,
ring A is a substituted or unsubstituted, aliphatic or aromatic 5-membered heterocyclic group consisting of two carbon atoms and three hetero atoms, and $A^1$ and $A^2$ are each independently nitrogen, oxygen or sulfur,
$R^1$, $R^2$ and $R^3$ are each independently selected from hydrogen and the following substituent group I, and
n4 is an integer of 1 to 3, $R^4$ is the same or different when n4 is 2 or more and each independently selected from hydrogen and the following substituent group I, or the selected $R^4$ is fused together to form a substituted or unsubstituted $C_{3-8}$ carbocyclic group or substituted or unsubstituted 3 to 8-membered heterocyclic group with carbon bonded thereto, and
wherein the substituent group I consists of a substituted or unsubstituted $C_{1-10}$ alkyl group, a substituted or unsubstituted $C_{2-10}$ alkenyl group, a substituted or unsubstituted $C_{3-20}$ carbocyclic group, a substituted or unsubstituted $C_{3-20}$ cycloalkyl group, a substituted or unsubstituted $C_{6-30}$ aryl group, a substituted or unsubstituted 3 to 30-membered heterocyclic group, a substituted or unsubstituted $C_{1-10}$ alkoxy group, a substituted or unsubstituted $C_{2-10}$ alkenyloxy group, a substituted or unsubstituted $C_{3-10}$ cycloalkyloxy group, a substituted or unsubstituted $C_{6-30}$ aryloxy group, a substituted or unsubstituted 3 to 30-membered heterocyclic oxy group, a substituted or unsubstituted $C_{1-10}$ alkylcarbonyl group, a substituted or unsubstituted $C_{2-10}$ alkenylcarbonyl group, a substituted or unsubstituted $C_{3-10}$ cycloalkylcarbonyl group, a substituted or unsubstituted $C_{6-30}$ arylcarbonyl group, a substituted or unsubstituted 3 to 30-membered heterocyclic carbonyl group, a substituted or unsubstituted $C_{1-10}$ alkylthio group, a substituted or unsubstituted $C_{2-10}$ alkenylthio group, a substituted or unsubstituted $C_{3-10}$ cyclo alkylthio group, a substituted or unsubstituted $C_{6-30}$ arylthio group, a substituted or unsubstituted 3 to 30-membered heterocyclic thio group, an aldehyde group, a carboxyl group, a halogen group, a $C_{1-10}$ haloalkyl group, a hydroxyl group, a substituted or unsubstituted amino group, an imine group, a cyano group, a nitro group, an amide group, a thiol group, a sulfonyl group, a sulfino group and a phosphate group,
the $C_{1-10}$ alkyl group is optionally introduced by a hetero atom group selected from —O—, —S—, —SO—, —SO$_2$—, —NR$^a$— (R$^a$ is hydrogen or substituted or unsubstituted $C_{1-10}$ alkyl), —N=, =N—, —POR$^a$— and —PO$_4$R$^a$—, and
the heterocyclic group comprises at least one of sulfur, nitrogen, phosphorus and oxygen as a ring member.

2. The compound of claim 1, wherein $R^2$ and $R^3$ are each independently a substituted or unsubstituted $C_{1-4}$ alkyl group.

3. The compound of claim 1, wherein $X^1$ is oxygen.

4. The compound of claim 1, wherein, in the ring A,
$A^1$ is oxygen and $A^2$ is nitrogen;
$A^1$ is sulfur and $A^2$ is nitrogen; or
$A^1$ is nitrogen and $A^2$ is oxygen.

5. The compound of claim 1, wherein $R^4$ is selected from the following substituent group I-1, which is a subgroup of the substituent group I, or two of $R^4$ are fused together to form a substituted or unsubstituted $C_{3-8}$ carbocyclic group or substituted or unsubstituted 3 to 8-membered heterocyclic group with carbon bonded thereto, and
the substituent group I-1 consists of a halogen group, a substituted or unsubstituted $C_{1-10}$ alkyl group, $C_{1-10}$ haloalkyl group, a substituted or unsubstituted $C_{3-20}$ cycloalkyl group, a substituted or unsubstituted $C_{6-30}$ aryl group, a substituted or unsubstituted 3 to 30-membered heterocyclic group, a substituted or unsubstituted $C_{1-10}$ alkoxy group, a substituted or unsubstituted $C_{3-10}$ cycloalkylcarbonyl group and a substituted or unsubstituted amino group.

6. The compound of claim 1, wherein $R^1$ is a substituted or unsubstituted 3 to 30-membered heterocyclic group.

7. The compound of claim 1, wherein the compound of Formula I is represented by the following Formula I-1:

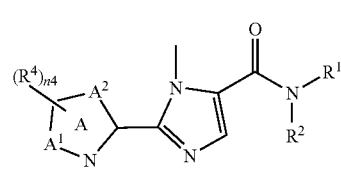

[Formula I-1]

wherein
$R^1$, $R^2$, $R^4$, n4, and ring A, $A^1$ and $A^2$ are defined as in claim 1.

8. The compound of claim 1, wherein the compound of Formula I is represented by any one of the following Formula I-1-1 to Formula I-1-5:

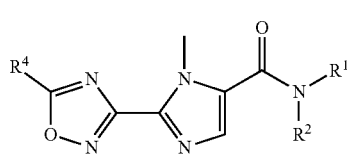

[Formula I-1-1]

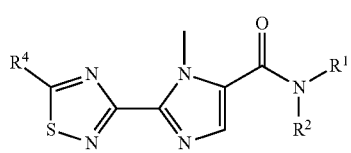

[Formula I-1-2]

-continued

[Formula I-1-3]
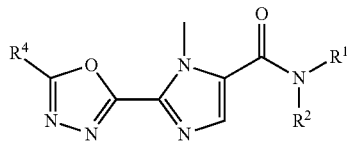

[Formula I-1-4]
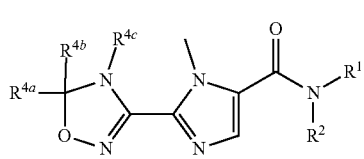

[Formula I-1-5]
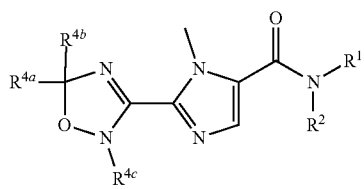

wherein R¹ is defined as in claim 1,
R² is a methyl group or an ethyl group,
R⁴ is selected from hydrogen and the substituent group I,
R⁴ᵃ and R⁴ᵇ are independently selected from hydrogen and the substituent group I, or are fused together to form a substituted or unsubstituted $C_{3-8}$ carbocyclic group or a substituted or unsubstituted 3 to 8-membered heterocyclic group with carbon bonded thereto, however, R⁴ᵃ and R⁴ᵇ are not hydrogen at the same time, and
R⁴ᶜ is selected from hydrogen and the substituent group I.

9. The compound of claim 1, wherein the compound of Formula I is represented by the following Formula Ia:

[Formula Ia]
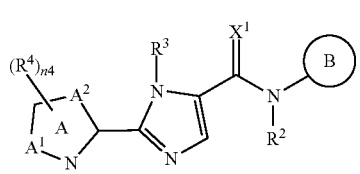

wherein ring B is a substituted or unsubstituted $C_{3-30}$ carbocyclic group or a substituted or unsubstituted 3 to 30-membered heterocyclic group including at least one of sulfur, nitrogen, phosphorus and oxygen as a ring member, and
ring A, R², R³, R⁴, n4, X¹, A¹ and A² are defined as in claim 1.

10. The compound of claim 9, wherein the compound of Formula Ia-is represented by the following Formula Ia-1:

[Formula Ia-1]
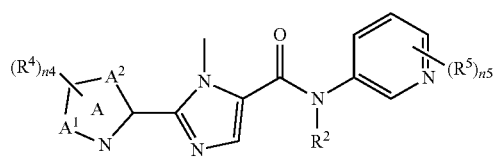

wherein R², R⁴, R⁵, ring A, A¹ and A², n4 and n5 are defined as in claim 1, n5 is an integer of 0 to 4, and R⁵ is different or the same when n5 is 2 or more and each independently selected from the substituent group I.

11. The compound of claim 1, wherein the compound of Formula I is represented by any one of the following Formulae Ia-1-1 to Ia-1-5:

[Formula Ia-1-1]
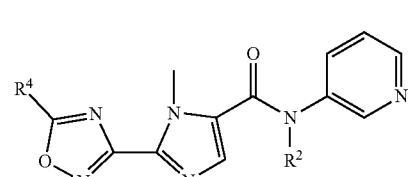

[Formula Ia-1-2]
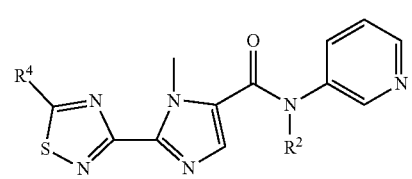

[Formula Ia-1-3]
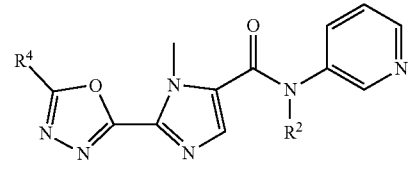

[Formula Ia-1-4]
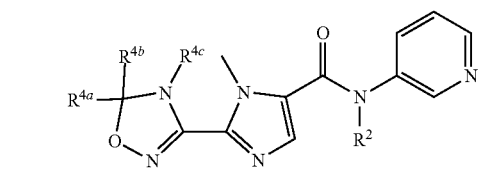

[Formula Ia-1-5]
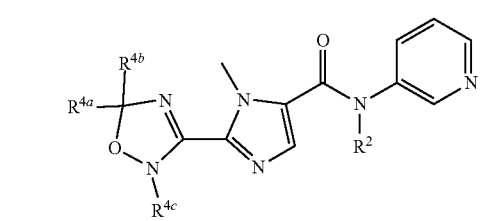

wherein R⁴ is selected from hydrogen and the substituent group I,
R² is a methyl group or an ethyl group, and
R⁴ᵃ and R⁴ᵇ are independently selected from hydrogen and the substituent group I, or fused together to form a substituted or unsubstituted $C_{3-8}$ carbocyclic group or substituted or unsubstituted 3 to 8-membered heterocyclic group with carbon bonded thereto, provided that R⁴ᵃ and R⁴ᵇ are not hydrogen at the same time, and
R⁴ᶜ is selected from hydrogen and the substituent group I.

12. The compound of claim 1, wherein the compound of Formula I is represented by any one selected from the following formula groups:

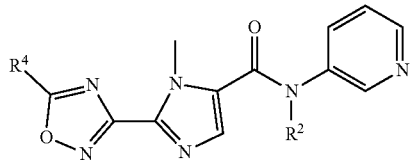

| Formula | R² | R⁴ |
|---|---|---|
| Ia-1-1-1 | Et | Me |
| Ia-1-1-2 | Et | CHF₂ |
| Ia-1-1-3 | Et | CF₃ |
| Ia-1-1-4 | Et | H |
| Ia-1-1-5 | Et | tert-butyl |
| Ia-1-1-6 | Et | isopropyl |
| Ia-1-1-7 | Et | n-propyl |
| Ia-1-1-8 | Et | ethyl |
| Ia-1-1-9 | Et | sec-pentyl |
| Ia-1-1-10 | Et | sec-butyl |
| Ia-1-1-11 | Et | neopentyl |
| Ia-1-1-12 | Et | cyclopropyl |
| Ia-1-1-13 | Et | cyclopentyl |
| Ia-1-1-14 | Et | cyclohexyl |
| Ia-1-1-15 | Et | cyclohexylmethyl |
| Ia-1-1-16 | Et | cyclopropylmethyl |
| Ia-1-1-17 | Et | adamantyl |
| Ia-1-1-18 | Et | 3-oxocyclobutyl |
| Ia-1-1-19 | Et | cyclobutyl |
| Ia-1-1-20 | Et | CCl₃ |
| Ia-1-1-21 | Et | phenyl |
| Ia-1-1-22 | Et | oxazol-4-yl |
| Ia-1-1-23 | Et | oxazol-5-yl |
| Ia-1-1-24 | Et | 2-fluorophenyl |
| Ia-1-1-25 | Et | tetrahydropyran-4-yl |

-continued

| Formula | R² | R⁴ |
|---|---|---|
| Ia-1-1-26 | Et | piperidin-1-yl |
| Ia-1-1-27 | Et | pyrrolidin-1-yl |
| Ia-1-1-28 | Et | pyrimidin-5-yl |
| Ia-1-1-29 | Et | pyrimidin-5-yl |
| Ia-1-1-30 | Et | pyridin-3-yl |
| Ia-1-1-31 | Et | pyridin-4-yl |
| Ia-1-1-32 | Et | 1-(pyridin-3-yl)cyclopropyl |
| Ia-1-1-33 | Et | isopropylamino |
| Ia-1-1-34 | Et | cyclohexylamino |
| Ia-1-1-35 | Et | ethylamino |
| Ia-1-1-36 | Et | dimethylamino |
| Ia-1-1-37 | Et | morpholin-4-yl |

-continued

| Formula | R² | R⁴ |
|---|---|---|
| Ia-1-1-38 | Et | N-isopropylacetamido |
| Ia-1-1-39 | Et | N-cyclohexylacetamido |
| Ia-1-1-40 | Et | 2-(ethylthio)pyridin-3-yl |
| Ia-1-1-41 | Et | N-isopropylpivalamido |
| Ia-1-1-42 | Et | ethyl isopropylcarbamate |
| Ia-1-1-43 | Et | 2-(ethylthio)phenyl |
| Ia-1-1-44 | Et | 2-(ethylsulfonyl)phenyl |
| Ia-1-1-45 | Et | 4-(dimethylamino)phenyl |
| Ia-1-1-46 | Et | 2-ethoxyphenyl |

| Formula | R² | R⁴ |
|---|---|---|
| Ia-1-1-47 | Et | 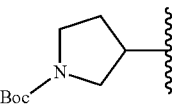 [SMILES: *C1CCN(C(=O)OC(C)(C)C)C1] |
| Ia-1-1-48 | Et | 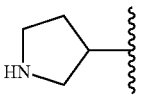 |
| Ia-1-1-49 | Et | 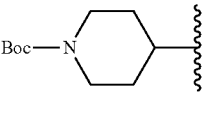 |
| Ia-1-1-50 | Et | 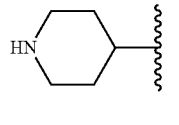 |
| Ia-1-1-51 | Et | 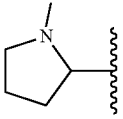 |
| Ia-1-1-52 | Et | 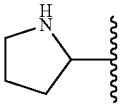 | wherein Me, Et and Boc respectively are a methyl group, an ethyl group and a tert-butoxycarbonyl group.

13. The compound of claim 1, wherein the compound of Formula I is represented by any one selected from the following formula groups:

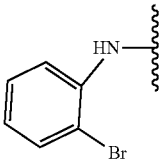 [SMILES: *Nc1ccccc1Br]

| Formula | R² | R⁴ |
|---|---|---|
| Ia-1-2-1 | Et | 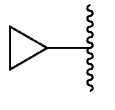 [SMILES: *C1CC1] |
| Ia-1-2-2 | Et | 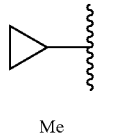 |
| Ia-1-2-3 | Et | 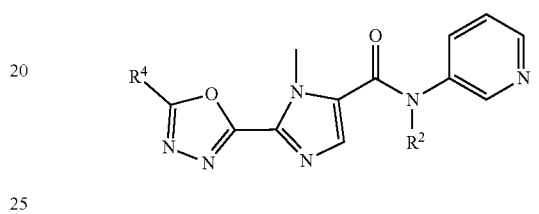 | wherein Et is an ethyl group.

14. The compound of claim 1, wherein the compound of Formula I is represented by any one selected from the following formula groups:

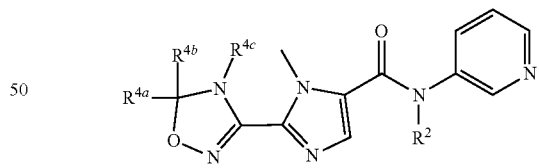

| Formula | R² | R⁴ |
|---|---|---|
| Ia-1-3-1 | Me | 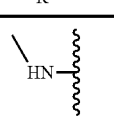 |
| Ia-1-3-2 | Et | 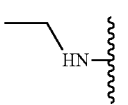 |
| Ia-1-3-3 | Et | Me | wherein Me and Et respectively are a methyl group and an ethyl group.

15. The compound of claim 1, wherein the compound of Formula I is represented by any one selected from the following Formula groups:

| Formula | R² | R⁴ᵃ | R⁴ᵇ | R⁴ᶜ |
|---|---|---|---|---|
| Ia-1-4-1 | Et | Me | Me | H |
| Ia-1-4-2 | Et | Me | Me | Me |
| Ia-1-4-3 | Et | Me | Me | 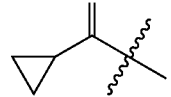 |

-continued
| Formula | R² | R4ᵃ | R⁴ᵇ | R⁴ᶜ |
|---|---|---|---|---|
| Ia-1-4-4 | Et | Et | Et | H |
| Ia-1-4-5 | Et | Et | Et | Me |
| Ia-1-4-6 | Et |  | | H |
| Ia-1-4-7 | Et |  | | Me |
| Ia-1-4-8 | Et |  | | H |
| Ia-1-4-9 | Et |  | | Me |
| Ia-1-4-10 | Et |  | | H |
| Ia-1-4-11 | Et |  | | Me |
| Ia-1-4-12 | Et |  | | 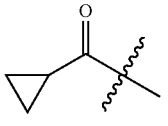 [SMILES: *C(=O)C1CC1] |
| Ia-1-4-13 | Et |  | | 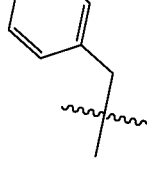 |
| Ia-1-4-14 | Et |  | | H |
| Ia-1-4-15 | Et |  | | Me |
| Ia-1-4-16 | Et |  | | Me |
-continued
| Formula | R² | R4ᵃ | R⁴ᵇ | R⁴ᶜ |
|---|---|---|---|---|
| Ia-1-4-17 | Et | 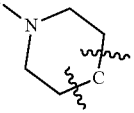 | | H |
| Ia-1-4-18 | Et | 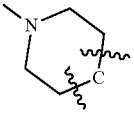 | | Me |
| Ia-1-4-19 | Et | 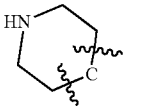 | | H |
| Ia-1-4-20 | Et | 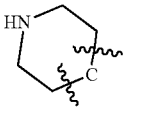 | | Me |
| Ia-1-4-21 | Et | 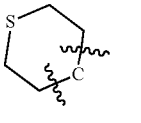 | | H |
| Ia-1-4-22 | Et | 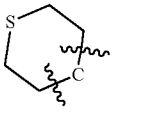 | | Me |
| Ia-1-4-23 | Et | 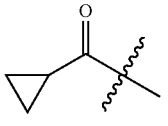 [SMILES: *C(=O)C1CC1] | | 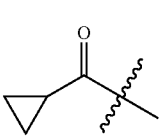 |
| Ia-1-4-24 | Et | 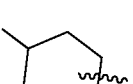 | | H |
| Ia-1-4-25 | Et | 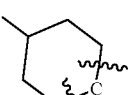 | | Me |
| Ia-1-4-26 | Et | 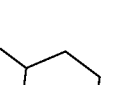 | | 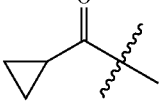 |
| Ia-1-4-27 | Et | 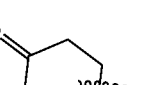 | | H |

-continued

| Formula | R² | R4ᵃ | R⁴ᵇ | R⁴ᶜ |
|---|---|---|---|---|
| Ia-1-4-28 | Et |  | | Me |
| Ia-1-4-29 | Et |  | | H |
| Ia-1-4-30 | Et | 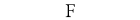 | | H |
| Ia-1-4-31 | Et |  | | H |
| Ia-1-4-32 | Et |  | | Me |
| Ia-1-4-33 | Et |  | H | H |
| Ia-1-4-34 | Et |  | H | H |
| Ia-1-4-35 | Et |  | H | Me |
| Ia-1-4-36 | Et |  | H | H |
| Ia-1-4-37 | Et |  | H | H |

-continued

| Formula | R² | R4ᵃ | R⁴ᵇ | R⁴ᶜ |
|---|---|---|---|---|
| Ia-1-4-38 | Et | 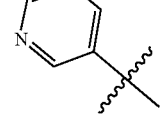 | H | H |
| Ia-1-4-39 | Et | 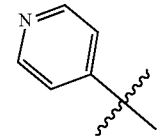 [SMILES: *c1ccncc1] | H | H |
| Ia-1-4-40 | Et | 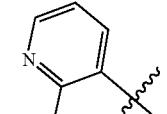 | H | H |
| Ia-1-4-41 | Et |  | H | H |
| Ia-1-4-42 | Et | 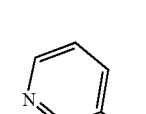 | H | H |
| Ia-1-4-43 | Et | Me | H | H |
| Ia-1-4-44 | Et | Et | H | H | wherein Me, Et and Boc respectively are a methyl group, an ethyl group and a tert-butoxycarbonyl group, and C shown as a ring member is carbon shared with ring A when forming a spiro ring by fusing $R^{4a}$ and $R^{4b}$ together.

16. The compound of claim 1, wherein the compound of Formula I is represented by any one selected from the following Formula groups:

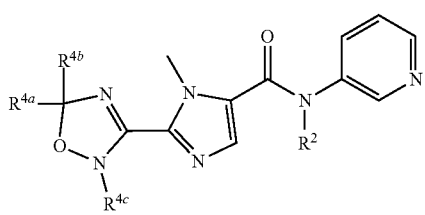

| Formula | R² | R⁴ᵃ | R⁴ᵇ | R⁴ᶜ |
|---|---|---|---|---|
| Ia-1-5-1 | Et | Me | Me | Me |
| Ia-1-5-2 | Et | 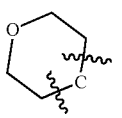 | | Me |
| Ia-1-5-3 | Et | 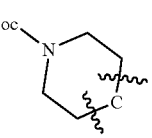 | | Me |
| Ia-1-5-4 | Et | 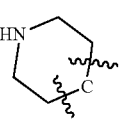 | | Me |
| Ia-1-5-5 | Et | 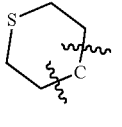 | | Me |
| Ia-1-5-6 | Et | 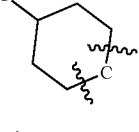 | | Me |
| Ia-1-5-7 | Et | 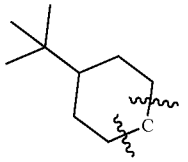 | | Me |
| Ia-1-5-8 | Et | 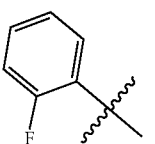 | H | Me |
| Ia-1-5-9 | Et | 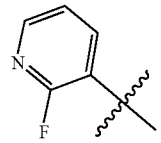 [SMILES: *c1cccnc1F] | H | Me |
| Ia-1-5-10 | Et | 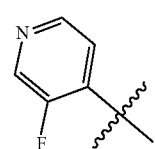 [SMILES: *c1ccncc1F] | H | Me |
| Ia-1-5-11 | Et | 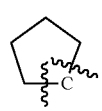 | | Me | wherein Me, Et and Boc respectively are a methyl group, an ethyl group and a tert-butoxycarbonyl group, and C shown as a ring member is carbon shared with ring A when forming a spiro ring by fusing $R^{4a}$ and $R^{4b}$ together.

17. An acceptable salt of the compound of claim 1, a solvate, enantiomer, diastereomer, geometric isomer or tautomer thereof.

18. A pest control composition comprising at least one compound of claim 1, an acceptable salt, solvate, enantiomer, diastereomer, geometric isomer or tautomer thereof as an active ingredient.

19. The composition of claim 18, wherein a mortality rate for pests of the family Aphidoidea is 30% or more.

20. The composition of claim 18, wherein the active ingredient is contained at a concentration of 0.1 to 1,000 ppm.

* * * * *